(12) United States Patent
Fujioka et al.

(10) Patent No.: US 7,700,065 B2
(45) Date of Patent: Apr. 20, 2010

(54) CARBON NANO-FIBROUS ROD, FIBROUS NANOCARBON, AND METHOD AND APPARATUS FOR PRODUCING FIBROUS NANOCARBON

(75) Inventors: Yuichi Fujioka, Nagasaki (JP); Akinori Yasutake, Nagasaki (JP); Toshihiko Setoguchi, Nagasaki (JP); Isao Mochida, 2-28-10, Kashii, Higashi-,ku, Fukuoka-shi, Fukuoka 813-0011 (JP); Seong-Ho Yoon, Seaside-Momochi-Southstage I-306, 4-3, Momochihama, Sawara-ku, Fukuoka-shi, Fukuoka 814-0001 (JP)

(73) Assignees: Mitsubishi Heavy Industries, Ltd., Tokyo (JP); Isao Mochida, Fukuoka (JP); Seong-ho Yoon, Fukuoka (JP)

(*) Notice: Subject to any disclaimer, the term of this patent is extended or adjusted under 35 U.S.C. 154(b) by 1012 days.

(21) Appl. No.: 10/537,151

(22) PCT Filed: Nov. 21, 2003

(86) PCT No.: PCT/JP03/14892

§ 371 (c)(1),
(2), (4) Date: May 31, 2005

(87) PCT Pub. No.: WO2005/049900

PCT Pub. Date: Jun. 2, 2005

(65) Prior Publication Data

US 2006/0057054 A1    Mar. 16, 2006

(51) Int. Cl.
*D01F 9/12* (2006.01)
*D01C 5/00* (2006.01)

(52) U.S. Cl. .............. 423/447.2; 423/447.1; 423/447.3

(58) Field of Classification Search .............. 432/447.3; 423/447.3, 447.1, 447.2
See application file for complete search history.

(56) References Cited

U.S. PATENT DOCUMENTS

| 4,855,091 A | | 8/1989 | Geus et al. |
| 5,618,875 A | * | 4/1997 | Baker et al. .................. 524/495 |
| 5,830,326 A | | 11/1998 | Iijima |
| 6,413,487 B1 | * | 7/2002 | Resasco et al. .......... 423/447.3 |
| 7,052,668 B2 | * | 5/2006 | Smalley et al. ........... 423/447.3 |
| 2002/0058139 A1 | | 5/2002 | Morita et al. |

FOREIGN PATENT DOCUMENTS

| CA | 1313732 | 2/1993 |
| DE | 36 88 209 T2 | 7/1993 |

(Continued)

OTHER PUBLICATIONS

Rodriguez, et al., Catalytic Engineering of Carbon Nanostructures, Langmuir 1995; 11: 3862-3866.*

(Continued)

*Primary Examiner*—Stanley Silverman
*Assistant Examiner*—Daniel C. McCracken
(74) *Attorney, Agent, or Firm*—Wenderoth, Lind & Ponack, L.L.P.

(57) ABSTRACT

A carbon nano-fibrous rod including a predetermined number of hexagonal carbon layers extending in one direction, and a fibrous nanoncarbon which includes a plurality of the carbon nano-fibrous rods three-dimensionally gathered are disclosed.

56 Claims, 50 Drawing Sheets

FOREIGN PATENT DOCUMENTS

| | | |
|---|---|---|
| EP | 0 198 558 A2 | 10/1986 |
| EP | 1 243 679 A2 | 9/2002 |
| JP | 61-239019 | 10/1986 |
| JP | 62-500943 | 4/1987 |
| JP | 1-260019 | 10/1989 |
| JP | 5-125619 | 5/1993 |
| JP | 2588626 | 12/1996 |
| JP | 2001-98430 | 4/2001 |
| JP | 2001-288624 | 10/2001 |
| JP | 2002-146634 | 5/2002 |
| JP | 2002-356317 | 12/2002 |
| JP | 2003-146635 | 5/2003 |
| WO | 86/03455 | 6/1986 |
| WO | 01/94260 | 12/2001 |

OTHER PUBLICATIONS

Choi, et al., Controlling the diameter, growth rate, and density of vertically aligned carbon nanotubes synthesized by microwave plasma-enhanced chemical vapor deposition, Applied Physics Letters 2000; 76(17): 2367-2369.*

Willems, et al., Control of the outer diameter of thin carbon nanotubes synthesized by catalytic decomposition of hydrocarbons, Chemical Physics Letters 2000; 317: 71-76.*

Kaatz, et al., Diameter control and emission properties of carbon nanotubes grown using chemical vapor deposition, Materials Science and Engineering C 2003; 23: 141-146.*

Dai, et al., Single-wall nanotubes produced by metal-catalyzed disproportionation of carbon monoxide, Chemical Physics Letters 1996; 260: 471-475.*

European Search Report No. 03 77 4132, dated Oct. 9, 2007.

European Office Action issued Aug. 19, 2008 in connection with European Patent Application No. 03 774 132.9-1217, which is a foreign counter part of the present application.

Luo: Guohua, Li: Zhifei, Wei: Fei, Xiang; Lan, Deng; Ziangyi and Jin; Yong, "Catalysts effect on morphology of carbon nanotubes prepared by catalytic chemical vapor deposition in a nano-agglomerate bed" Physica B. Condensed Matter, Elsevier, Amsterdam, vol. 323, No. 1-4, Mar. 10, 2001, pp. 314-317, XP002254673.

Boehm: H.P., "Carbon From Carbon Monozide Disproportionation on Nickel and Iron Catalysts: Morphological Studies and Possible Growth Mechanisms" Pregamon Press, Great Britain, Carbon, 1973, vol. 11, pp. 583-590.

Murayama: H. and Maeda: T., "A novel form of filamentous graphite" Nature, vol. 345, pp. 791-793, Jun. 28, 1990.

Rodriguez: N.M., "A review of catalytically grown carbon nanofibers", Journal Materials Research, vol. 8, No. 12, Dec. 1993, pp. 3233-3250.

Lijima: S, "Helical microtubles of graphitic carbon", Nature, vol. 354, Nov. 7, 1991, pp. 56-58.

Dictionary of Carbon Terminology, p. 226, The Carbon Society of Japan, edited by the Dictionary of Carbon Terminology Edition Committee, Agne Shofu-sha, Tokyo, 2000.

Best: Richard J. and Russell: W. Walker, "Nickel, Copper and Some of their Alloys as Catalysts for Ethylene Hydrogenation", J. American Society 1954. vol. 76, pp. 838-842.

Sinfelt: J.H., Carter: J.L. and Yates: D.J.C., "Catalytic Hydrogenolysis and Dehdrogenation over Copper-Nickel Alloys" Journal of Catalysis 1972, vol. 24, pp. 283-296.

* cited by examiner

FIG. 1
(a)
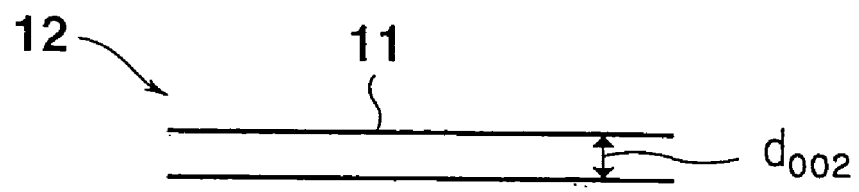
(b)
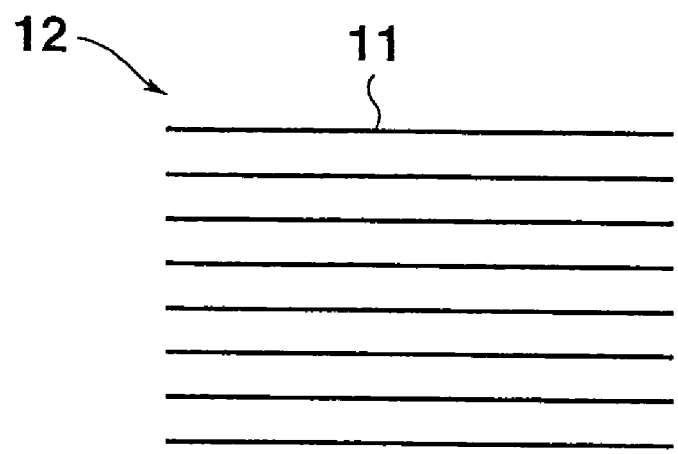

FIG. 2
(a)
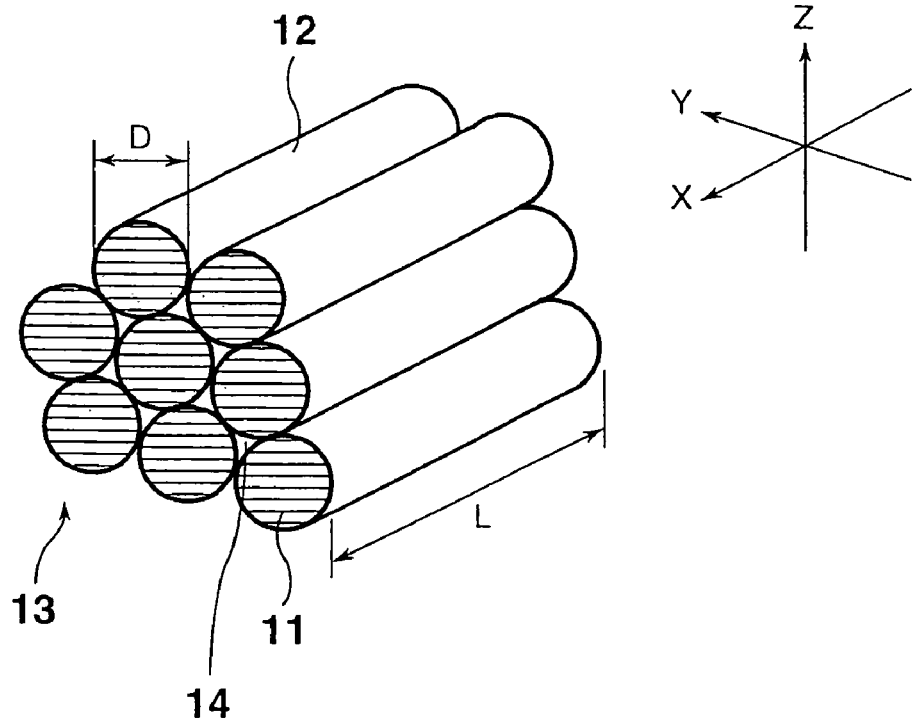
(b)
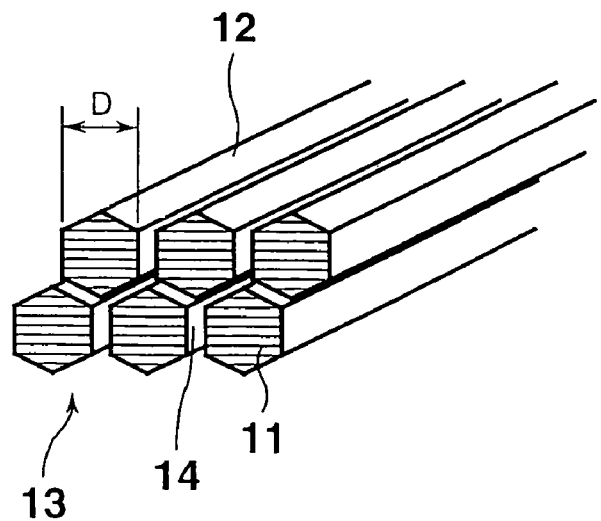

FIG. 6
High Resolution Transmission Electron Microscope
Photographs of Carbon Nano-Fibrous Rod
(a) As-Prepared State
(b) 2800° Heat-Treated State
(a)
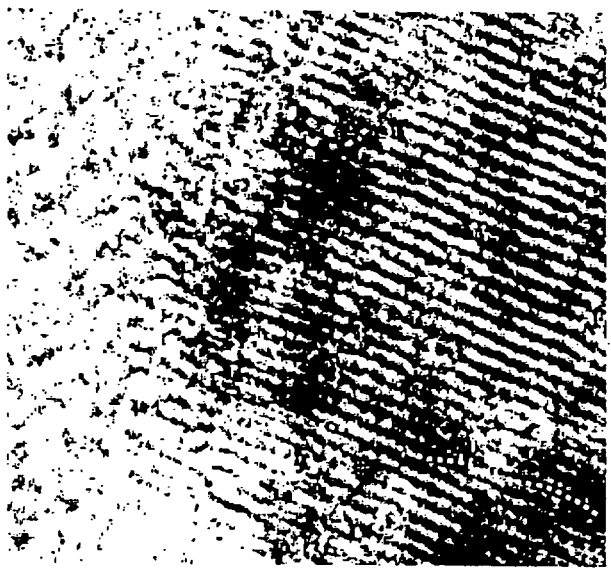
(b)
10nm

FIG. 7
High Resolution Electron Microscope Photographs of Carbon Nano-Fibrous Rod
(a) High Resolution Transmission Electron Microscope Photograph
(b) Scanning Tunneling Electron Microscope Photograph
(a)
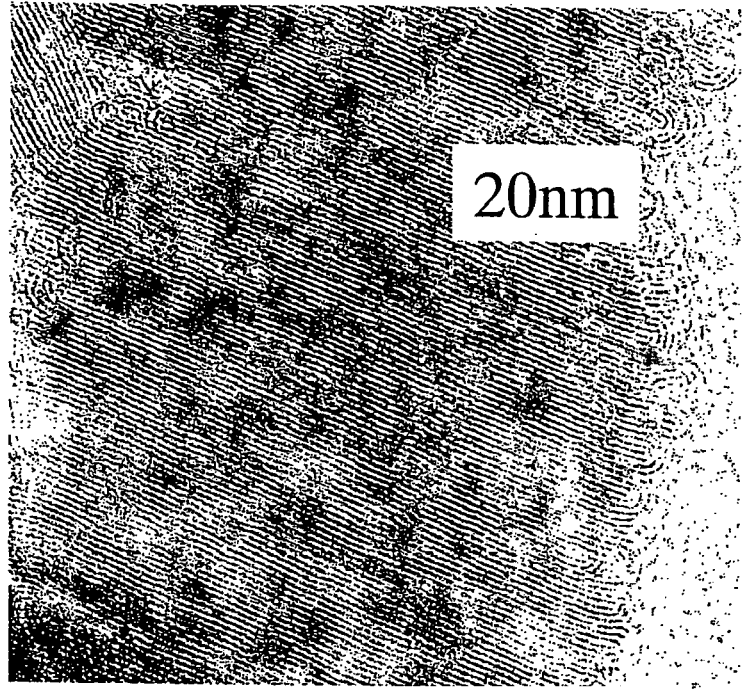
(b)
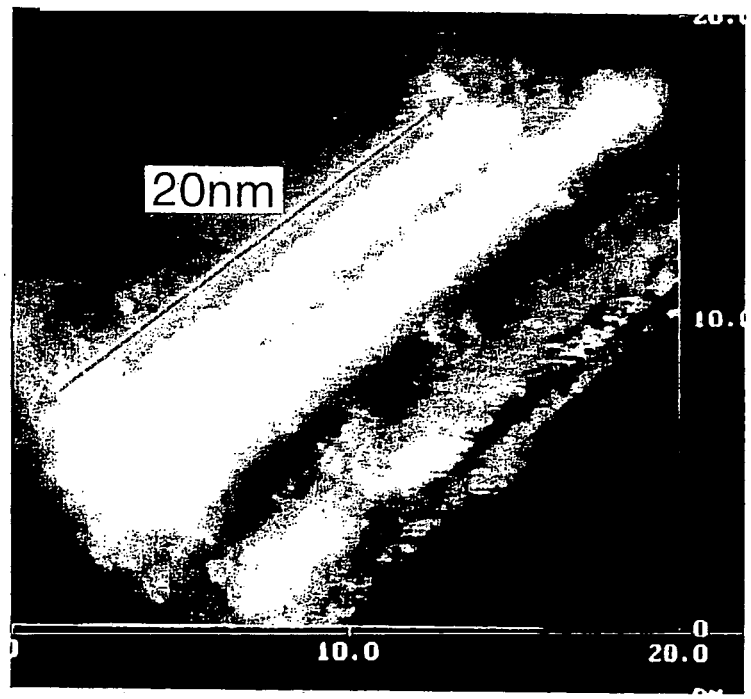

Scanning Tunneling Electron Microscope Photograph of Carbon Nano-Fibrous Rod

FIG. 10
High Resolution Transmission Electron Microscope
Photographs of Fibrous Nanocarbon of Columnar Structure
(a)
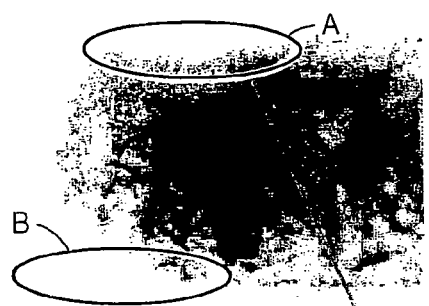
(b)
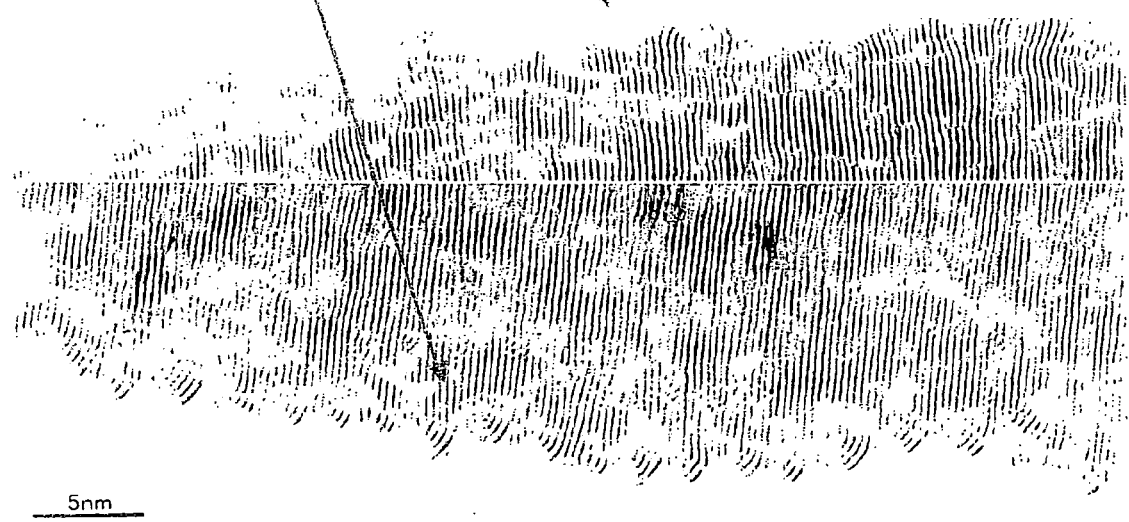

FIG. 11
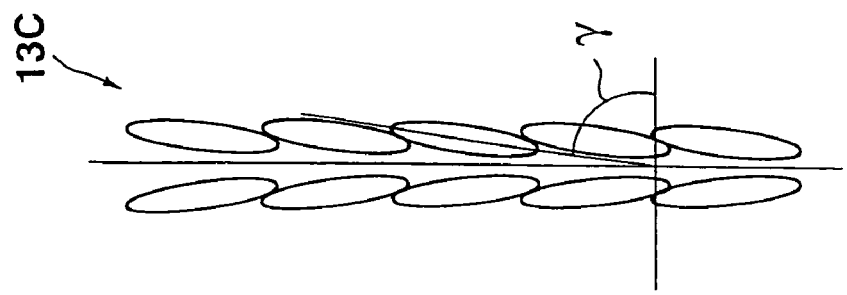
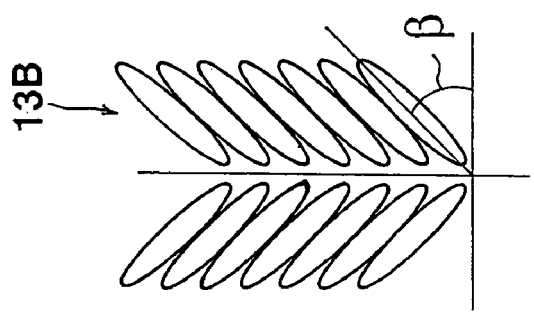
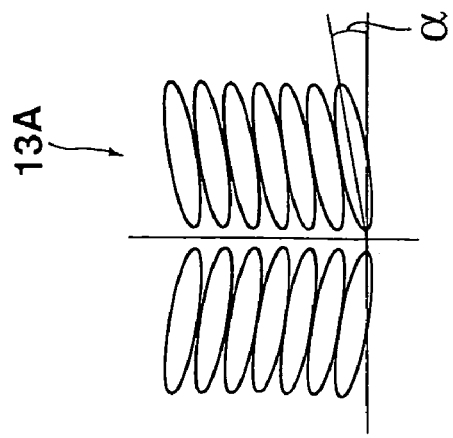

FIG. 12
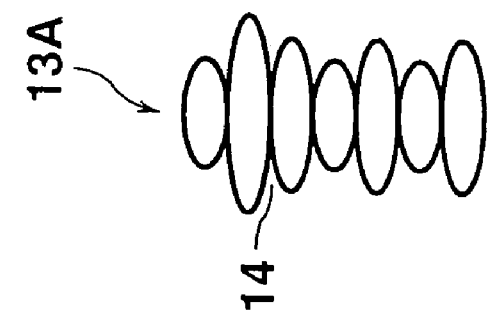
(a)
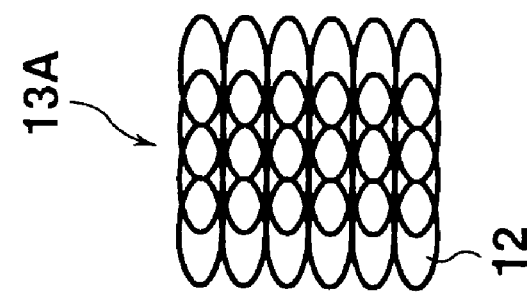
(b)
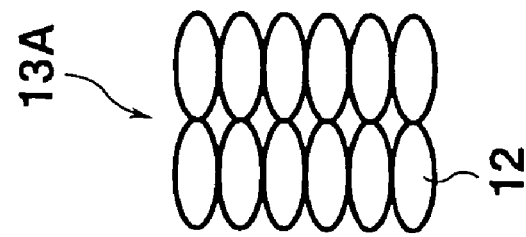
(c)
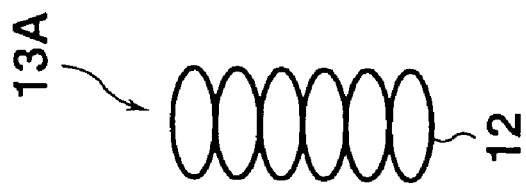
(d)

FIG. 13
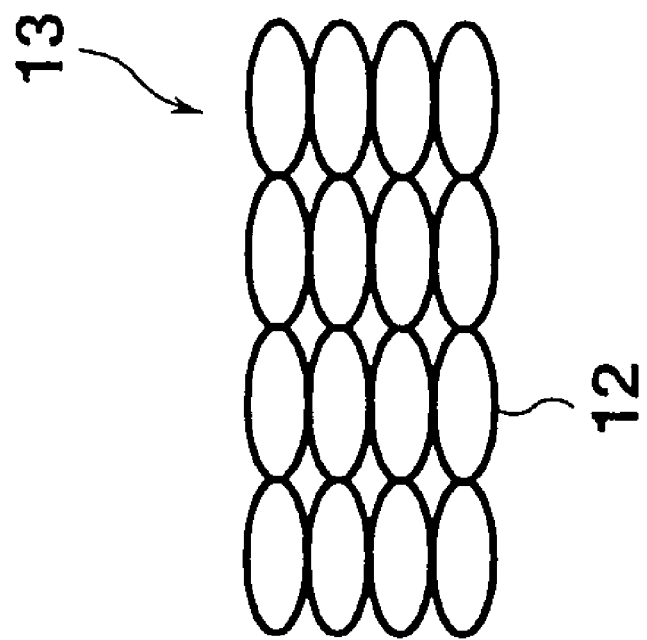
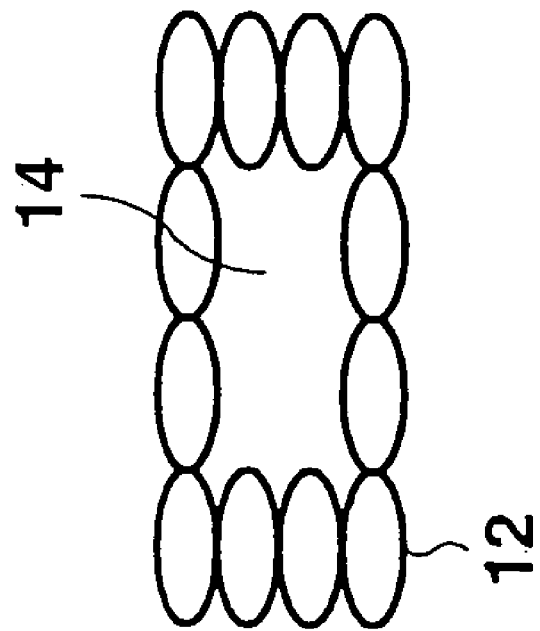

FIG. 14
(a)
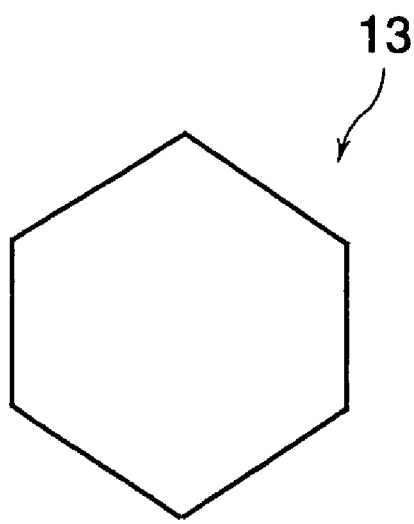
(b)
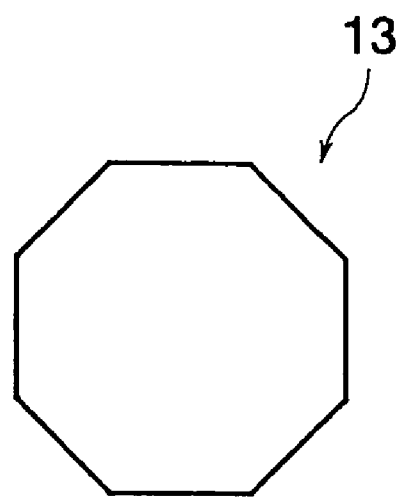
(c)
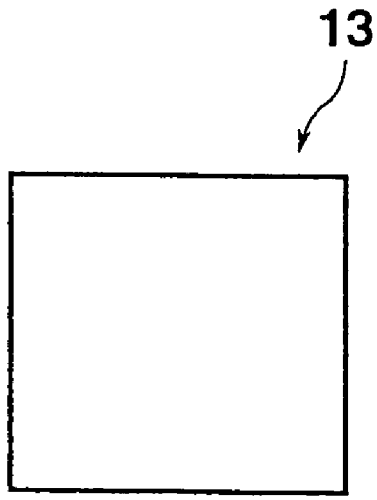
(d)
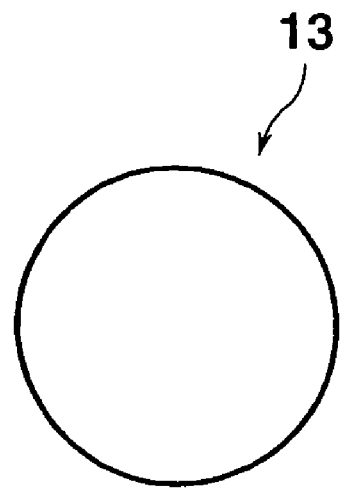

High Resolution Scanning Electron Microscope
Photographs of Fibrous Nanocarbon
(a) Fibrous Nanocarbon of Columnar Structure
(b) Fibrous Nanocarbon of Feather Structure
(c) Fibrous Nanocarbon of Tubular Structure High Resolution Scanning Electron Microscope
Photographs of Fibrous Nanocarbon
(a) Fibrous Nanocarbon of Columnar Structure
(b) Fibrous Nanocarbon of Feather Structure
(c) Fibrous Nanocarbon of Tubular Structure

FIG. 17
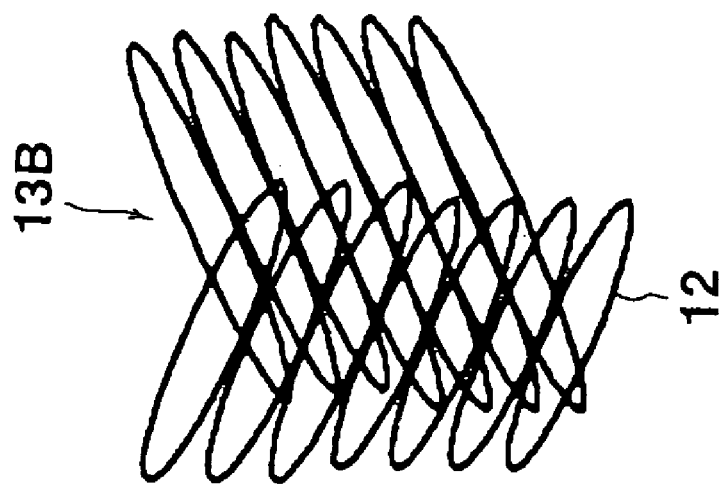
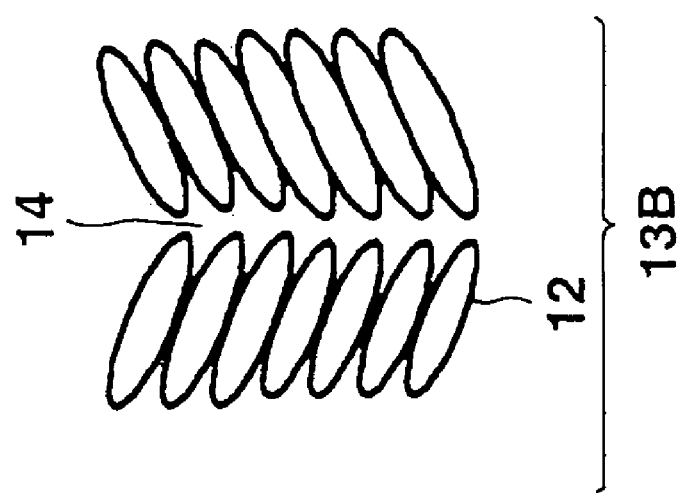

FIG. 18
High Resolution Transmission Electron Microscope
Photographs of Fibrous Nanocarbon of Feather Structure
(a)
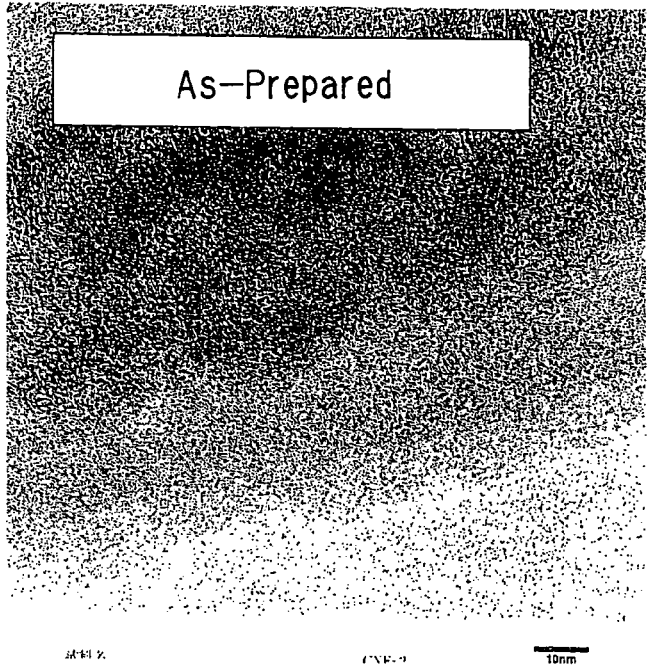
(b)
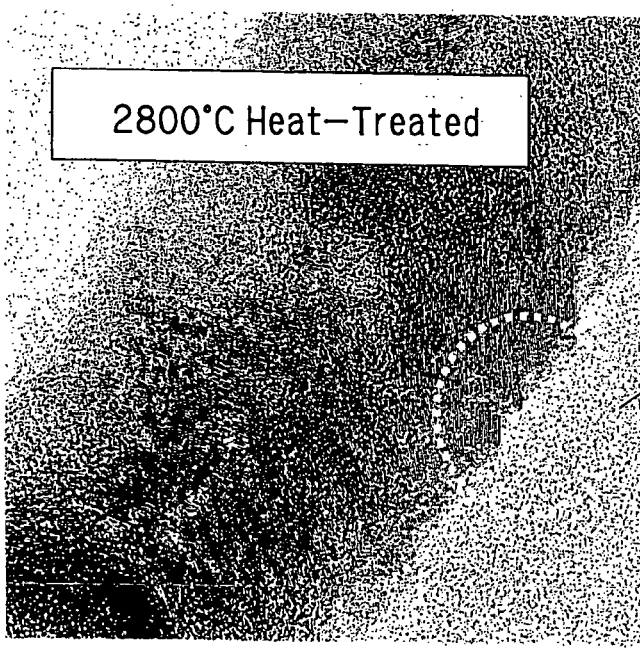
(c)
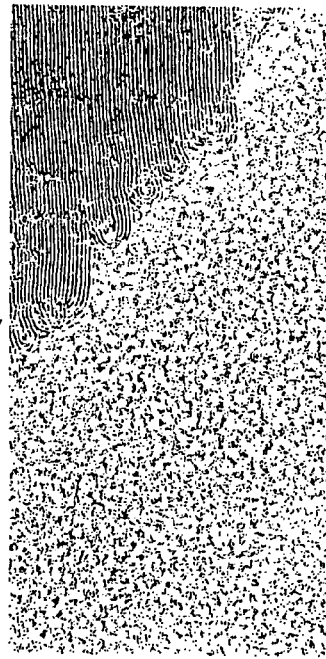

FIG. 19
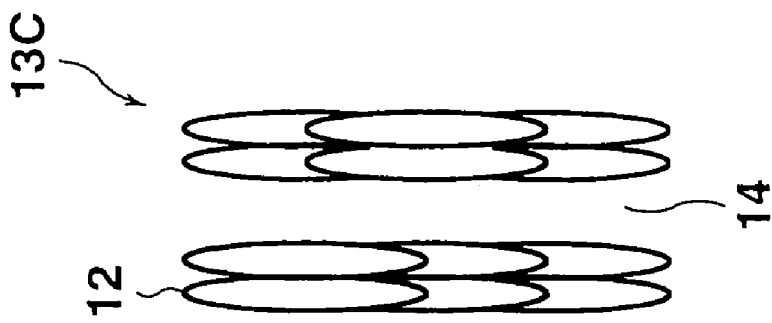
(a)
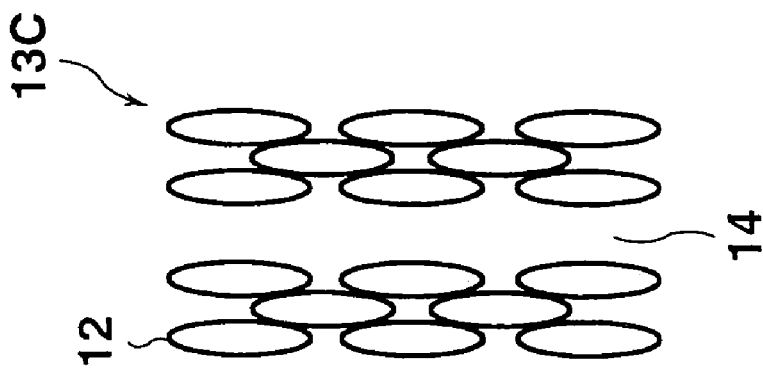
(b)
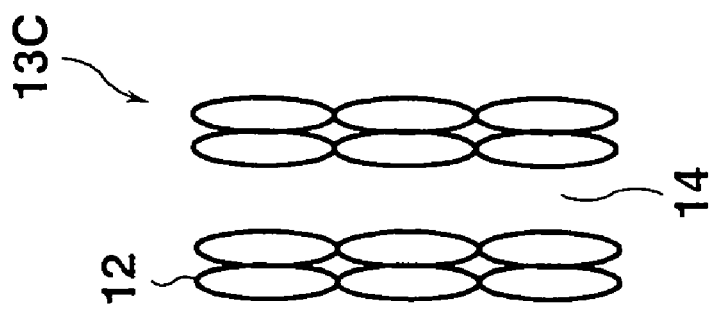
(c)

FIG. 21
High Resolution Transmission Electron Microscope
Photographs of Fibrous Nanocarbon of Columnar Structure
(a)
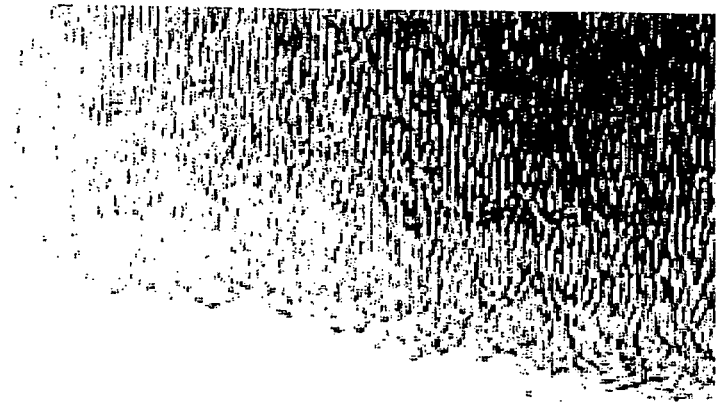
(−30 Degrees)
(b)
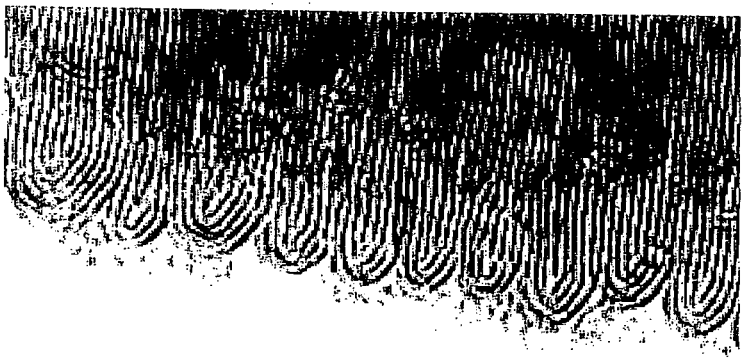
(0 Degrees)
(c)
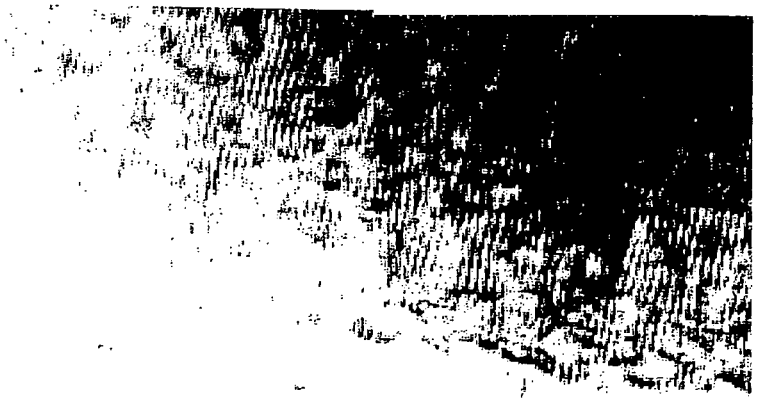
(+30 Degrees)

FIG. 29
High Resolution Scanning Electron Microscope
Photographs of Fibrous Nanocarbon
(a) Fibrous Nanocarbon of Columnar Structure
(b) Fibrous Nanocarbon of Feather Structure
(c) Fibrous Nanocarbon of Tubular Structure
As-prepared          2800°C heat-treated
(a) 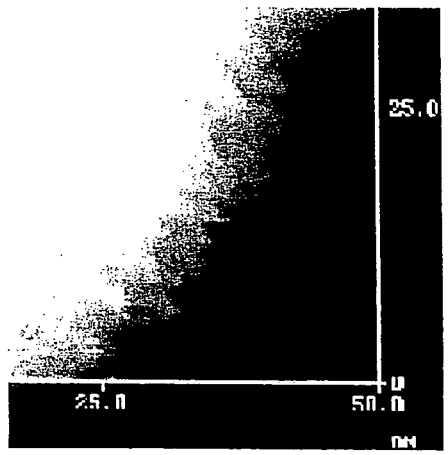 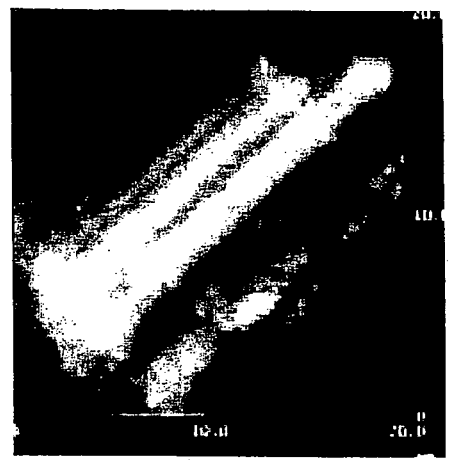
(b) 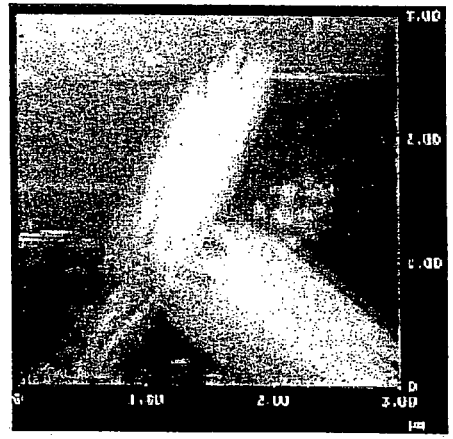 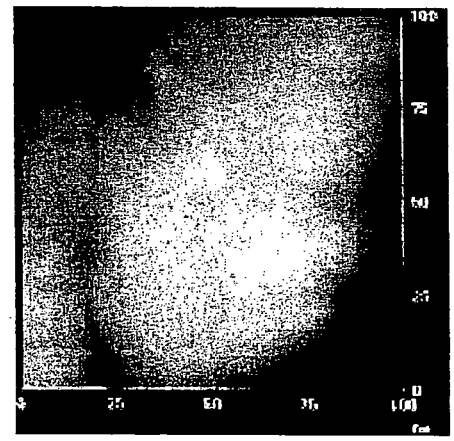
(c) 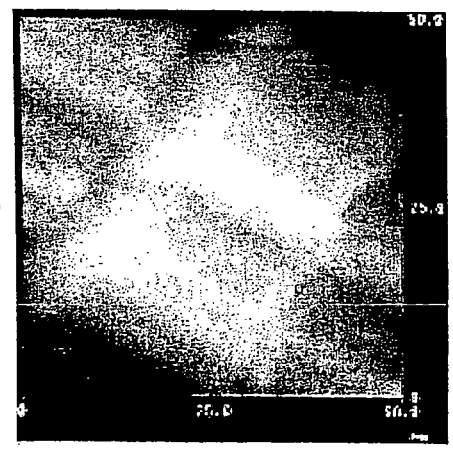 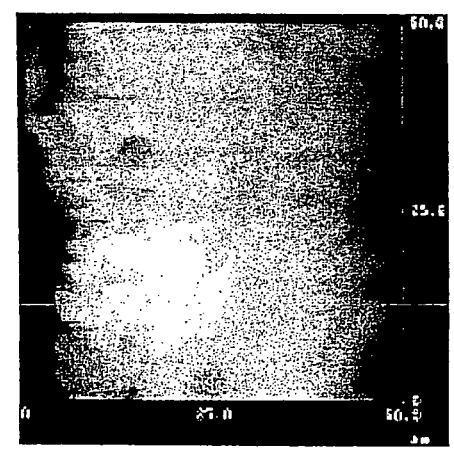

FIG. 30
High Resolution Transmission Electron Microscope
Photographs and Raman Spectra of Fibrous Nanocarbon
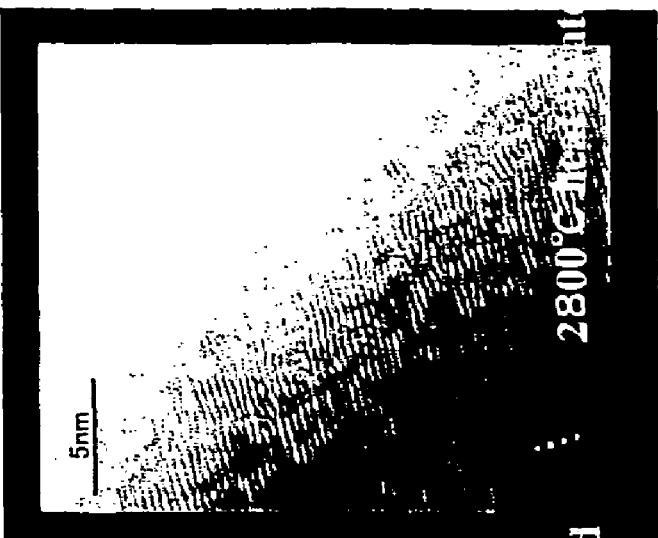
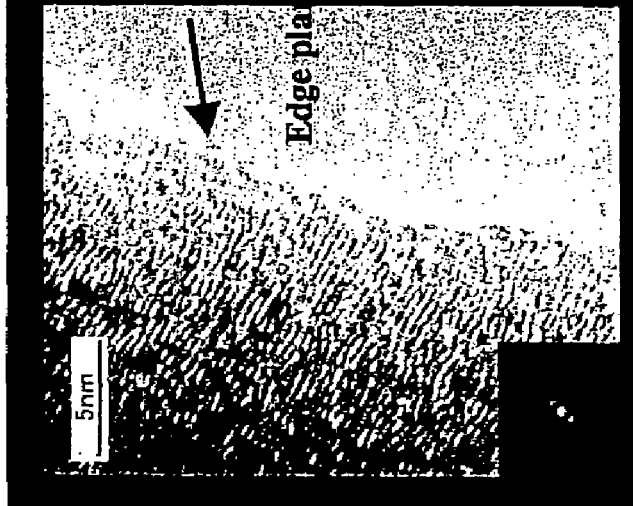

FIG. 46
(a)
└─┘ 1μm    ×10000
(b)
└─┘ 1nm    ×100000

FIG. 47
(a)
⊔ 1μm  ×10000
(b)
⊔ 100nm  ×50000

FIG. 48
(a)
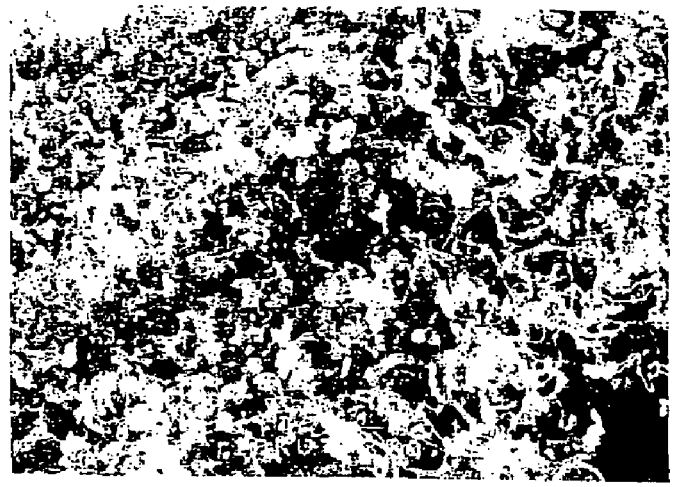
|⎵| 1μm    ×10000
(b)
|⎵ 100nm    ×100000

CARBON NANO-FIBROUS ROD, FIBROUS NANOCARBON, AND METHOD AND APPARATUS FOR PRODUCING FIBROUS NANOCARBON

BACKGROUND OF THE INVENTION

1. Field of the Invention

This invention relates to a carbon nano-fibrous rod (carbon nanorod), fibrous nanocarbon, and a method and apparatus for producing fibrous nanocarbon.

2. Description of the Related Art

In recent years, a carbon nanofiber (in 1983, United States of America, Hyperion Catalytic International, Japanese Patent Application Laid-Open No. 1987-5000943, Multi-walled Nanotube, The number of walls varies, with 8 to 15 being typical. The outside diameter of the tube is approximately 10 to 15 nanometers. The inside diameter is approximately 5 nanometers. Nanotubes are typically tens of microns in length. Aspect ratios on the order of 100 to 1000), (H. P. Boehm, Carbon, 11, 583 (1973), H. Murayama, T. Maeda, Nature, 245, 791, Rodriguez, N. M. 1993. J. Mater. Res. 8:3233), and carbon nanotube (S. Iijima, *Nature*, 354, 56 (1991), S. Iijima), for example, have been discovered as carbon materials on the order of nanometers (nm=one-billionth of a meter). These materials have attracted attention as fine carbon materials. Outlines of the structures of conventional carbon nanofibers are shown in FIGS. 49(*a*) to 49(*c*). In the conventional carbon nanofibers, three types of structures comprising a stack of plate-shaped hexagonal carbon layers have been proposed as shown in FIG. 49 (Rodriguez, N. M. 1993, J. Mater. Res. 8:3233). These carbon materials have been classified into a platelet structure in FIG. 49(*a*), a her-ringbone or fishbone structure in FIG. 49(*b*), and a tubular, ribbon or parallel structure in FIG. 49(*c*), as their three-dimensional structures. However, the conventional carbon nanofibers have no diversity because of their prescribed simple structures, and have not served as materials which fulfill diverse functions at the same time.

In recent years, application studies using carbon nanofibers have been conducted. For example, these studies cover occlusion or adsorption and desorption of hydrogen and lithium, catalytic action, and adsorption of nitrogen oxides. A high capacity of occluding target substances is required of carbon nanofibers for such uses, but preferred carbon nanofibers have not appeared yet.

Thus, there is a strong demand for the advent of fibrous nanocarbon substances which can impart a variety of characteristics at the same time by variously arranging or gathering carbon nano-fibrous rods of diverse dimensions and shapes so as to systematically prepare a fibrous nanocarbon having a wide variety of structures.

In the production of a carbon nanofiber, a basic reactor, as shown in FIG. 50, is utilized. As shown in FIG. 50, a conventional basic reactor is of a batch type in which a source gas 01, as a carbon source, is brought into contact with a catalyst 05 placed on a boat 04 within a reaction tube 03 provided with a heating means 02, whereby a carbon nanofiber 06 is grown on the catalyst 05. The conventional apparatus, as shown in FIG. 50, therefore, has posed the problem that mass production cannot be performed.

Hence, as shown in FIG. 51, for example, a vapor phase flow process for producing carbon nanofibers has been considered. In the vapor phase flow process, a source gas 01 is heated by a heating means 02, while being supplied into a reaction tube 03, to produce a carbon nanofiber.

However, with the basic reactor shown in FIG. 50 or the vapor phase flow process as shown in FIG. 51, the problem occurs that the interior of the reaction tube 03 tends to cause a temperature distribution and a non-uniform temperature. There is also the problem that the grown product is prone to deposit on the inner wall surface of the reaction tube 03, making it difficult to recover the product. This presents the problem that the production on an increased scale is difficult.

In the light of above-described circumstances, it is an object of the present invention to provide a carbon nano-fibrous rod which can show a high potential in the occlusion or adsorption and desorption of hydrogen and lithium, catalytic action, and adsorption of nitrogen oxides. In particular, the present invention includes a fibrous nanocarbon comprising carbon nano-fibrous rods which are arranged and gathered, and a method and apparatus for producing the fibrous nanocarbon.

SUMMARY OF THE INVENTION

A first embodiment of the present invention for attaining the above-mentioned object is a carbon nano-fibrous rod comprising a hexagonal carbon layer having a central axis extending in one direction.

A second embodiment is the carbon nano-fibrous rod according to the first invention, characterized in that the axial width (D) of the hexagonal carbon layer is 2.5±0.5 nm, and the length (L) of the hexagonal carbon layer is 17±15 nm.

A third embodiment is the carbon nano-fibrous rod according to the first or second embodiment, characterized in that 2 to 12 of the hexagonal carbon layers are stacked.

A fourth embodiment is a fibrous nanocarbon comprising a plurality of the carbon nano-fibrous rods of any one of the first to third embodiments gathered together.

A fifth embodiment is the fibrous nanocarbon according to the fourth embodiment, characterized in that the carbon nano-fibrous rods are stacked in a three-dimensionally close-packed state.

A sixth embodiment is the fibrous nanocarbon according to the fourth or fifth embodiment, characterized in that the plurality of the carbon nano-fibrous rods are stacked, with the central axes thereof parallel to each other, so as to constitute a carbon nano-fibrous rod cluster.

A seventh embodiment is the fibrous nanocarbon according to the sixth invention, characterized in that the carbon nano-fibrous rod cluster comprises the carbon nano-fibrous rods three-dimensionally stacked, with nano-gaps provided between carbon nano-fibrous rods comprising 2 to 12 hexagonal carbon layers stacked.

An eighth embodiment is the fibrous nanocarbon according to the fourth embodiment, characterized in that the carbon nano-fibrous rods are joined in series at axial end portions to constitute a carbon nano-fibrous rod cluster in the axial direction.

A ninth embodiment is the fibrous nanocarbon according to the eighth embodiment, characterized in that the axial end portions of the carbon nano-fibrous rods are joined by heat treatment.

A tenth embodiment is the fibrous nanocarbon according to the sixth embodiment, characterized in that the carbon nano-fibrous rod cluster is arranged at an arrangement angle of larger than 0 degree but smaller than 20 degrees with respect to an axis perpendicular to a fiber axis in the stacking direction of the carbon nano-fibrous rods, thereby forming a columnar shape.

An eleventh embodiment is the fibrous nanocarbon according to the sixth embodiment, characterized in that the carbon nano-fibrous rod cluster is arranged at an arrangement angle of larger than 20 degrees but smaller than 80 degrees with respect to an axis perpendicular to the fiber axis in the direction of stack of the carbon nano-fibrous rods, thereby forming a feather shape.

A twelfth embodiment is the fibrous nanocarbon according to the tenth or eleventh embodiment, characterized in that the carbon nano-fibrous rod cluster has a herringbone structure.

A thirteenth embodiment is the fibrous nanocarbon according to the tenth or eleventh embodiment, characterized in that the interplanar distance ($d_{002}$) between the hexagonal carbon layers is less than 0.500 nm under heat treatment conditions at 700° C. or lower.

A fourteenth embodiment is the fibrous nanocarbon according to any one of the tenth to twelfth embodiments, characterized in that the fiber width of an aggregate of the carbon nano-fibrous rods is 8 to 500 nm, and the fiber aspect ratio (fiber length/fiber width) of the aggregate is 10 or more.

A fifteenth embodiment is the fibrous nanocarbon according to the eighth embodiment n, characterized in that the carbon nano-fibrous rod cluster is arranged at an arrangement angle of 80 degrees to 88 degrees with respect to an axis perpendicular to the fiber axis in the stacking direction of the carbon nano-fibrous rods, thereby forming a tubular shape.

A sixteenth embodiment is the fibrous nanocarbon according to the fifteenth embodiment, characterized in that the fiber width of an aggregate of the carbon nano-fibrous rods is 8 to 80 nm, and the fiber aspect ratio (fiber length/fiber width) of the aggregate is 30 or more.

A seventeenth embodiment is the fibrous nanocarbon according to any one of the tenth to sixteenth embodiments, characterized in that the cross sectional structure in a direction perpendicular to the fiber axis is polygonal.

An eighteenth embodiment is the fibrous nanocarbon according to any one of the tenth to seventeenth embodiments, characterized by being heat-treated at a high temperature of 1,600° C. or higher, and characterized in that the ends of the carbon nano-fibrous rods on the surface of the fibrous nanocarbon are two-dimensionally loop-shaped and three-dimensionally dome-shaped.

A nineteenth embodiment for attaining the aforementioned object is a method for producing a fibrous nanocarbon comprising an aggregate of carbon nano-fibrous rods by reacting a carbon material in a high temperature fluidized bed with the use of a catalyst, characterized by using, as a fluid material, a dual-purpose catalyst/fluid material comprising a metal catalyst-supporting carrier bound via a binder. The method comprises performing a first gas supply step of supplying a reducing gas, a carbon material supply step of supplying the carbon material in a gaseous state to produce a carbon nano-fibrous rod in the presence of the metal catalyst of the dual-purpose catalyst/fluid material, and a second gas supply step of supplying a carbon-free gas to eliminate the fluidizing function of the dual-purpose catalyst/fluid material.

A twentieth embodiment is a method for producing fibrous nanocarbon according to the nineteenth embodiment, characterized in that the average particle diameter of the dual-purpose catalyst/fluid material is 0.2 to 20 mm.

A twenty-first embodiment is a method for producing fibrous nanocarbon according to the nineteenth embodiment, characterized in that the dual-purpose catalyst/fluid material comprises a product formed by supporting the catalyst on the surface of the carrier, or an agglomerate of the products.

A twenty-second embodiment is a method for producing fibrous nanocarbon according to the nineteenth embodiment, characterized in that the carrier of the dual-purpose catalyst/ fluid material is any one of carbon black, alumina, silica, silica sand, and aluminosilicate.

A twenty-third embodiment is the method for producing fibrous nanocarbon according to the nineteenth embodiment, characterized in that the metal catalyst of the dual-purpose catalyst/fluid material is any one of Fe, Ni, Co, Cu and Mo, or is a mixture of at least two of these metals.

A twenty-fourth embodiment is a method for producing fibrous nanocarbon according to the nineteenth embodiment, characterized in that the flow velocity in the fluidized bed is 0.02 to 2 m/s.

A twenty-fifth embodiment is a method for producing fibrous nanocarbon according to the nineteenth embodiment, characterized by controlling conditions for each of the first gas supply step, the carbon material supply step, and the second gas supply step independently of one another.

A twenty-sixth embodiment is a method for producing fibrous nanocarbon according to the twenty-fifth embodiment, characterized in that the conditions controlled are temperature, pressure, time, and gas atmosphere.

A twenty-seventh embodiment is a method for producing fibrous nanocarbon according to the nineteenth embodiment, characterized by bringing the catalyst of the dual-purpose catalyst/fluid material and the carbon material into contact with each other at a temperature of 300 to 1,300° C. in a gas mixture of hydrogen and an inert gas (hydrogen partial pressure 0 to 90%) at a pressure of 0.1 to 25 atmospheres, thereby producing the fibrous nanocarbon.

A twenty-eighth embodiment is the method for producing fibrous nanocarbon according to the nineteenth embodiment, characterized by metallizing and finely dividing the catalytic component of the dual-purpose catalyst/fluid material by a reducing action of the reducing gas in at least one of the first gas supply step and the carbon material supply step.

A twenty-ninth embodiment is a method for producing fibrous nanocarbon according to the twenty-eighth embodiment, characterized by controlling the particle diameter of the metal catalyst of the dual-purpose catalyst/fluid material and finely dividing the metal catalyst, thereby controlling the diameter of the fibrous nanocarbon obtained.

A thirtieth embodiment is a method for producing fibrous nanocarbon according to the nineteenth embodiment, characterized in that the second gas supply step forms a high velocity flow zone locally in the fluidized bed to promote the fine division and wear of the dual-purpose catalyst/fluid material by a collision between particles of the dual-purpose catalyst/fluid material, or a collision between the particles and a wall surface.

A thirty-first embodiment is a method for producing fibrous nanocarbon according to the thirtieth embodiment, characterized in that the high velocity flow zone in the fluidized bed is formed in a lower portion of the fluidized bed.

A thirty-second embodiment is a method for producing fibrous nanocarbon according to the thirtieth embodiment, characterized in that the high velocity flow zone is formed by flowing a high velocity gas into the fluidized bed.

A thirty-third embodiment is a method for producing fibrous nanocarbon according to the thirty-second embodiment, characterized by supplying particles, which have scattered from the fluidized bed back into the fluidized bed, while entraining the particles in the high velocity gas.

A thirty-fourth embodiment is a method for producing fibrous nanocarbon according to the nineteenth embodiment, characterized by separating the produced fibrous nanocarbon from the carrier or the catalyst.

A thirty-fifth embodiment is an apparatus for producing fibrous nanocarbon, which is used in performing the method for producing fibrous nanocarbon according to the nineteenth embodiment. The apparatus comprises a fluidized bed reactor charged with the dual-purpose catalyst/fluid material which has a heating means for heating the interior of the fluidized bed reactor, a first gas supply means for supplying the reducing gas into the fluidized bed reactor, a carbon material supply means for supplying the carbon material in a gaseous state into the fluidized bed reactor, a second gas supply means for supplying the gas free from carbon into the fluidized bed reactor, and a discharge line for discharging a gas and scattered particles from the fluidized bed reactor.

A thirty-sixth embodiment is the apparatus for producing fibrous nanocarbon according to the thirty-fifth embodiment, characterized in that recovery means for recovering the scattered particles is provided in the discharge line.

A thirty-seventh embodiment is the apparatus for producing fibrous nanocarbon according to the thirty-fifth embodiment, characterized in that a fluidized bed portion of the fluidized bed reactor has a high velocity flow portion and a low velocity flow portion.

A thirty-eighth embodiment is the apparatus for producing fibrous nanocarbon according to the thirty-seventh embodiment, characterized in that a collision portion is present in the high velocity flow portion.

A thirty-ninth embodiment is the apparatus for producing fibrous nanocarbon according to the thirty-fifth embodiment, characterized in that a high velocity gas blowing means for blowing a gas at a high velocity into the fluidized bed reactor is provided.

A fortieth embodiment is the apparatus for producing fibrous nanocarbon according to the thirty-ninth embodiment, characterized in that when the gas is blown at a high velocity, recovered particles are entrained in the gas.

A forty-first embodiment is the apparatus for producing fibrous nanocarbon according to the thirty-fifth embodiment, characterized in that: a first flow chamber, a second flow chamber, and a third flow chamber, wherein the fluid material flows, are formed within the fluidized bed reactor, the first gas supply means is connected to the first flow chamber, the carbon material supply means is connected to the second flow chamber, and the second gas supply means is connected to the third flow chamber.

A forty-second embodiment is an apparatus for producing fibrous nanocarbon according to the thirty-fifth embodiment, characterized in that a first flow chamber and a second flow chamber, wherein the fluid material flows, are formed within the fluidized bed reactor; another (second) fluidized bed reactor different from the (first) fluidized bed reactor is provided as a third flow chamber; transport means for transporting the fluid material from the second flow chamber to the third flow chamber is provided; the first gas supply means is connected to the first flow chamber; the carbon material supply means is connected to the second flow chamber; and the second gas supply means is connected to the third flow chamber.

A forty-fourth embodiment is an apparatus for producing fibrous nanocarbon, which is used in performing the method for producing fibrous nanocarbon according to the nineteenth embodiment. The apparatus comprises a first fluidized bed reactor charged interiorly with the dual-purpose catalyst/fluid material, having heating means for heating the interior of the first fluidized bed reactor, and having first gas supply means for supplying the reducing gas into the first fluidized bed reactor; a second fluidized bed reactor having transport means for transporting the fluid material from the first fluidized bed reactor, and having carbon material supply means for supplying the carbon material in a gaseous state into the second fluidized bed reactor; a third fluidized bed reactor having transport means for transporting the fluid material and a reaction product from the second fluidized bed reactor, and having second gas supply means for supplying the gas free from carbon into the third fluidized bed reactor, and a discharge line for discharging a gas and scattered particles from the third fluidized bed reactor.

A forty-fifth embodiment is an apparatus for producing fibrous nanocarbon according to the forty-fourth embodiment, characterized by including a plurality of the first fluidized bed reactors.

A forty-sixth embodiment is an apparatus for producing fibrous nanocarbon according to the forty-fourth embodiment, characterized by including a plurality of the second fluidized bed reactors.

A forty-seventh embodiment is an apparatus for producing fibrous nanocarbon according to the forty-fourth embodiment, characterized by including a plurality of the third fluidized bed reactors.

A forty-eighth embodiment is an apparatus for producing fibrous nanocarbon according to any one of the thirty-fifth to forty-seventh embodiments, characterized in that the average particle diameter of the dual-purpose catalyst/fluid material is 0.2 to 20 mm.

A forty-ninth embodiment is an apparatus for producing fibrous nanocarbon according to any one of the thirty-fifth to forty-seventh embodiments, characterized in that the dual-purpose catalyst/fluid material comprises a product formed by supporting the catalyst on the surface of the carrier, or an agglomerate of the products.

A fiftieth embodiment is an apparatus for producing fibrous nanocarbon according to any one of the thirty-fifth to forty-seventh embodiments, characterized in that the carrier of the dual-purpose catalyst/fluid material is any one of carbon black, alumina, silica, silica sand, and aluminosilicate.

A fifty-first embodiment is an apparatus for producing fibrous nanocarbon according to any one of the thirty-fifth to forty-seventh embodiments, characterized in that the metal catalyst of the dual-purpose catalyst/fluid material is any one of Fe, Ni, Co, Cu and Mo, or is a mixture of at least two of these metals.

A fifty-second embodiment is an apparatus for producing fibrous nanocarbon according to any one of the thirty-fifth to forty-seventh embodiments, characterized in that the flow velocity in the fluidized bed is 0.02 to 2 m/s.

A fifty-third embodiment is an apparatus for producing fibrous nanocarbon according to any one of the thirty-fifth to forty-seventh embodiments, characterized in that the catalyst of the dual-purpose catalyst/fluid material and the carbon material are brought into contact with each other for a certain period of time at a temperature of 300 to 1,300° C. in a gas mixture of hydrogen and an inert gas (hydrogen partial pressure 0 to 90%) at a pressure of 0.1 to 25 atmospheres, whereby the fibrous nanocarbon is produced.

BRIEF DESCRIPTION OF THE DRAWINGS

FIGS. 1(a) and 1(b) are schematic views of a carbon nano-fibrous rod according to the present invention.

FIGS. 2(a) and 2(b) are schematic views of a carbon nano-fibrous rod cluster according to the present invention.

FIGS. 6(a) and 6(b) are microscope photographs of the carbon nano-fibrous rod in the as-prepared state, and after heat treatment.

FIGS. 7(a) and 7(b) are a high resolution transmission microscope photograph and a scanning tunneling electron microscope photograph of the carbon nano-fibrous rod.

FIGS. 10(a) and 10(b) are high resolution transmission microscope photographs of fibrous nanocarbon of a columnar structure.

FIGS. 11(a) to 11(c) are schematic views of various forms of the carbon nano-fibrous rod cluster.

FIGS. 12(a) to 12(d) are schematic views of fibrous nanocarbon aggregates of columnar structures.

FIGS. 13(a) and 13(b) are schematic views of fibrous nanocarbon aggregates of other columnar structures.

FIGS. 14(a) to 14(d) are cross sectional schematic views of fibrous nanocarbon.

FIGS. 17(a) and 17(b) are schematic views of fibrous nanocarbon aggregates of a feather structure.

FIGS. 18(a) to 18(c) are high resolution transmission microscope photographs of fibrous nanocarbon of a feather structure.

FIGS. 19(a) to 19(c) are schematic views of fibrous nanocarbon aggregates of a tubular structure.

FIGS. 21(a) to 21(c) are photographs of structures after treatment at a high temperature of 2,800° C. for a carbon nano-fibrous rod cluster constituting fibrous nanocarbon of a columnar structure, the photographs being taken at varying angles (−30 degrees, 0 degree, +30 degrees) of a transmission electron beam of a high resolution transmission electron microscope.

FIGS. 29(a) to 29(c) are high resolution transmission microscope photographs of fibrous nanocarbon of a columnar structure, a feather structure, and a tubular structure.

FIGS. 30(a) to 30(c) are high resolution transmission electron microscope photographs of a carbon nano-fibrous rod cluster constituting fibrous nanocarbon of a columnar structure, which is in the as-prepared state (prepared at 600° C. using an iron catalyst), and its structures after heat treatment at high temperatures of 2,000° C. and 2,800° C.

FIGS. 46(a) and 46(b) are microphotographs of fibrous nanocarbon obtained in Example 1.

FIGS. 47(a) and 47(b) are microphotographs of fibrous nanocarbon obtained in Example 2.

FIGS. 48(a) and 48(b) are microphotographs of fibrous nanocarbon obtained in Example 3.

DETAILED DESCRIPTION OF THE INVENTION

Figure 3:
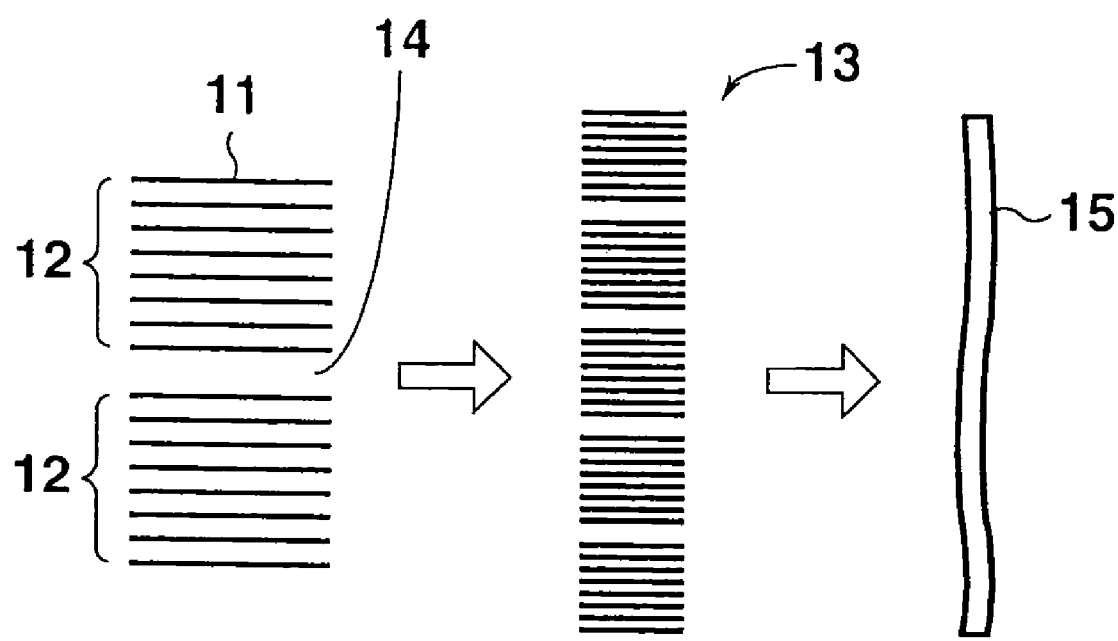
FIG. 3 is a schematic view of the carbon nano-fibrous rod and fibrous nanocarbon according to the present invention.
Figure 4:
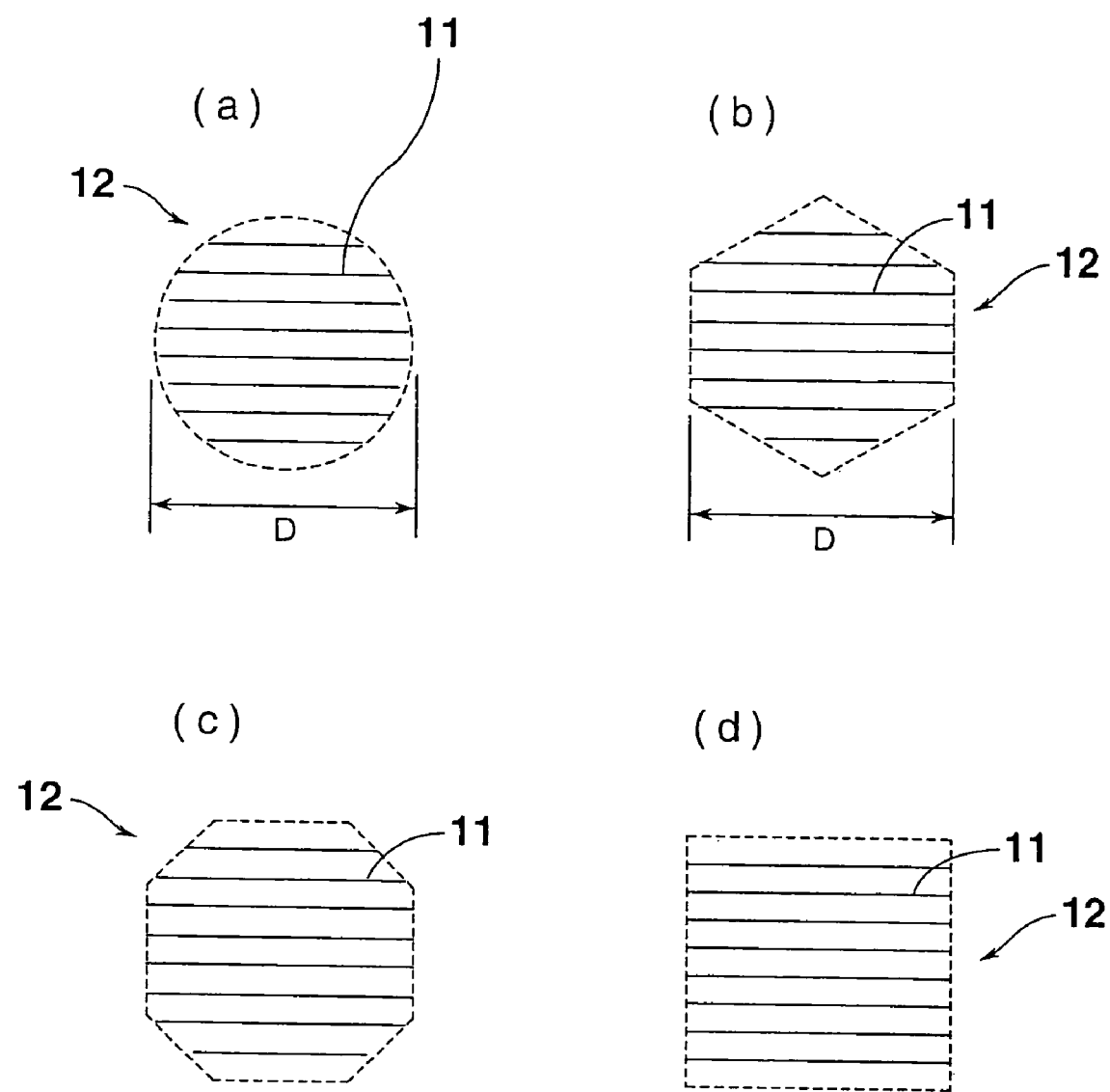
FIGS. 4(a) to 4(d) are sectional schematic views of the carbon nano-fibrous rod according to the present invention.

Embodiments of the carbon nano-fibrous rod, fibrous nanocarbon, and the method and apparatus for producing fibrous nanocarbon according to the present invention will be described below, but the present invention is not limited to these embodiments.

<Carbon Nano-Fibrous Rod and Fibrous Nanocarbon>

The fibrous nanocarbon of the present invention is composed of nano-constitutional units of fibrous nanocarbon (so-called "carbon nanofiber"). The fibrous nanocarbon composed of these nano-constitutional units has a polygonal cross-section, and shows a very high degree of graphitization, such that the interplanar distance ($d_{002}$) between hexagonal carbon layers is 0.500 nm or less, simply under manufacturing conditions involving a relatively low temperature of 700° C. or lower. The constitutional unit of the fibrous nanocarbon is an aggregate of independent carbon nano-fibrous rods.

The fibrous nanocarbons of the polygonal cross section gather to form fibrous nanocarbon of a polygonal cross section showing a surface area, measured by nitrogen BET, of 200 m$^2$ or more, for example, when having a fiber width of 100 nm on the average and an aspect ratio on the order of 30.

The hexagonal carbon layer (carbon hexagonal network), the carbon nano-fibrous rod which is a nano-aggregate of the hexagonal carbon layers, and the fibrous nanocarbon which is an array and stack of the carbon nano-fibrous rods will be described with reference to FIGS. 1(a) and 1(b) and FIGS. 2(a) and 2(b).

FIGS. 1(a) and 1(b) are diagrammatic views of a carbon nano-fibrous rod composed of a plurality of hexagonal carbon layers. FIGS. 2(a) and 2(b) are schematic views showing a gathered state of carbon nano-fibrous rods.

In the present embodiment, as shown in FIGS. 1(a), 1(b) and 2(a), 2(b), a carbon nano-fibrous rod 12 is constituted of hexagonal carbon layers 11 having a central axis extending in one direction. In the carbon nano-fibrous rod 12, a single hexagonal carbon layer 11 (one layer) can constitute a basic constitutional unit, but usually, 2 to 12 of the hexagonal carbon layers 11 are stacked to form one constitutional unit.

The number of the hexagonal carbon layers 11 stacked is preferably 4 to 10. The reason why the carbon nano-fibrous rod 12 serves as one unit made up of the stack of 2 to 12 of the hexagonal carbon layers 11 has not been elucidated yet. However, the reason is assumed to be concerned with the crystal lattice structure of a metal catalyst used for synthesis.

FIG. 1(a) is a diagrammatic view in which 2 of the hexagonal carbon layers 11 form one constitutional unit of the carbon nano-fibrous rod 12. FIG. 1(b) is a diagrammatic view in which 8 of the hexagonal carbon layers 11 form one constitutional unit of the carbon nano-fibrous rod 12. The hexagonal carbon layer 11 constituting the carbon nano-fibrous rod 12 has an axial width (D) of 2.5±0.5 nm, and an axial length (L) of 17±15 nm. If the above size is outside this range, a satisfactory carbon nano-fibrous rod 12 cannot be formed.

As shown in FIGS. 2(a) and 2(b), a plurality of the carbon nano-fibrous rods 12 are closely packed and stacked to constitute a carbon nano-fibrous rod cluster 13. As a result, many nano-gaps 14 are present along an axis (in an X-axis direction in FIGS. 2(a), 2(b)) formed by the carbon nano-fibrous rods 12. The nano-gap 14 serves as a space for taking in, for example, atoms such as hydrogen and lithium. The presence of the many nano-gaps 14 makes it possible to realize the effects of a novel functional material, such as catalytic activity, occlusion or absorption and desorption of a particular substance, and so on.

In FIG. 2(a), the carbon nano-fibrous rods 12 appear to be in contact, but these carbon nano-fibrous rods 12 may be in contact or out of contact. If they do not contact each other, the nano-gaps 14 increase. In FIG. 2(b), the carbon nano-fibrous rods 12 of a hexagonal cross section gather with a slight clearance. A plurality of the carbon nano-fibrous rod clusters 13 composed of the carbon nano-fibrous rods 12 gather three-dimensionally in a fibrous form to form fibrous nanocarbon (so-called carbon nanofiber) 15, as shown in FIG. 3.

The carbon nano-fibrous rod 12 has a cross sectional structure in a direction perpendicular to the axis. This cross sectional structure is circular in FIG. 2(a), and hexagonal in FIG. 2(b), but the present invention is not limited to the illustrated cross sectional structures. For example, as shown in FIGS. 4(a) to 4(d), it may be octagonal (see FIG. 4(c)) or tetragonal such as rectangular (see FIG. 4(d)), as well as circular (see FIG. 4(a)) or hexagonal (see FIG. 4(b)).

Representative structures of the fibrous nanocarbon 15 composed of a plurality of the carbon nano-fibrous rod clusters three-dimensionally gathered include, for example, a columnar structure, a feather structure, and a tubular structure (details will be described later). In the present embodiment, the fibrous nanocarbon 15 of a columnar structure will be explained as an example.

Figure 5:
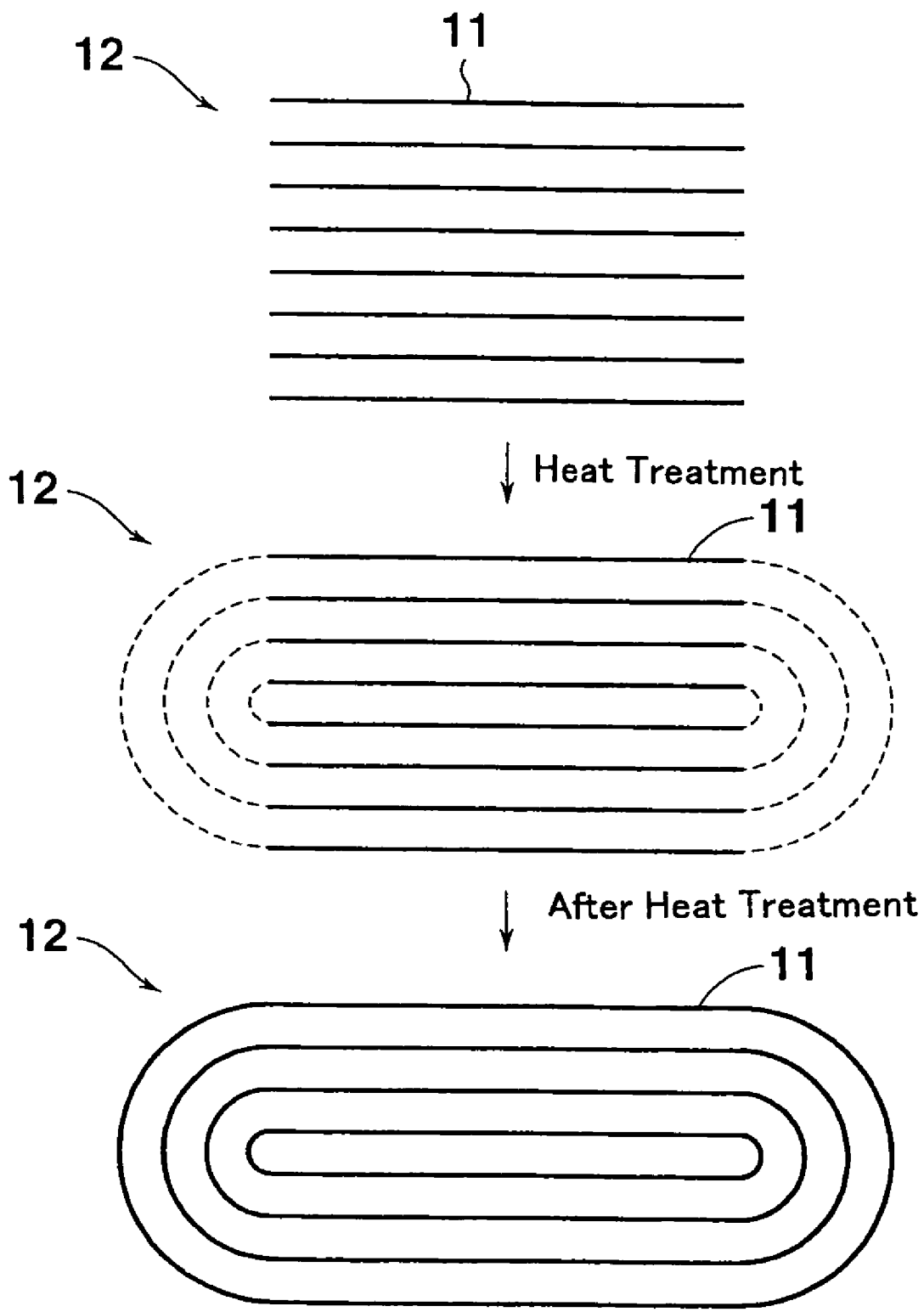
FIG. 5 is a schematic view of heat treatment of the carbon nano-fibrous rod according to the present invention.

The fact that the carbon nano-fibrous rod 12 according to the present invention is a constitutional unit is not clear in the as-prepared state of the carbon nano-fibrous rod 12, but will become clear by performing heat treatment (or carbonization) at 1,600° C. or higher after preparation of the carbon nano-fibrous rod 12. That is, the heat treatment at a high temperature of 1,600° C. or higher results in the construction of a carbon network in which the ends in the axial direction of the carbon nano-fibrous rod 12 form a loop two-dimensionally, or a dome three-dimensionally, as shown in FIG. 5. This makes it clear that the carbon nano-fibrous rod 12 is one constitutional unit.

In the following explanations, the carbon nano-fibrous rod 12, whose ends do not form a loop in the as-prepared state, will be described as the "as-prepared state", while the carbon nano-fibrous rod 12, which has been heat-treated at a high temperature of, say, 2,800° C., will be described as the "2,800° C. heat-treated state".

FIGS. 6(a) and 6(b) are photographs of the carbon nano-fibrous rod 12 taken under a high resolution transmission electron microscope, HRTEM). FIG. 6(a) is a photograph of an aggregate of the carbon nano-fibrous rods 12 obtained by the method of synthesis to be described later, and FIG. 6(b) is a photograph of an aggregate of the carbon nano-fibrous rods 12 improved in the degree of graphitization by heat treatment at 2,800° C. to be described later. In FIGS. 6(a), 6(b), a size of 10 nm is shown.

FIGS. 7(a) and 7(b) are photographs of the carbon nano-fibrous rod 12 (in the 2,800° C. heat-treated state) taken under an electron microscope. FIG. 7(a) is a high resolution transmission electron microscope (HRTEM) photograph, and FIG. 7(b) is a scanning tunneling electron microscope (STM) photograph. Arrows in the photographs show a size of 20 nm.

In FIGS. 6(a), 6(b) and FIGS. 7(a), 7(b), the stacked state of 6 to 7 of the hexagonal carbon layers 11 is represented, and these layers can be confirmed to constitute the carbon nano-fibrous rod 12. Accordingly, it can be confirmed that the carbon nano-fibrous rod 12 constitutes one constitutional unit, and a gathering of these constitutional units constitutes the fibrous nanocarbon 15. The unclearness of the above scanning tunneling electron microscope (STM) photograph is ascribable to a high magnification, and to the photographic capability of the STM, which prevents a clearer photograph from being obtained at the present time. However, it can be confirmed that the carbon nano-fibrous rod 12 is one constitutional unit.

Figure 8:
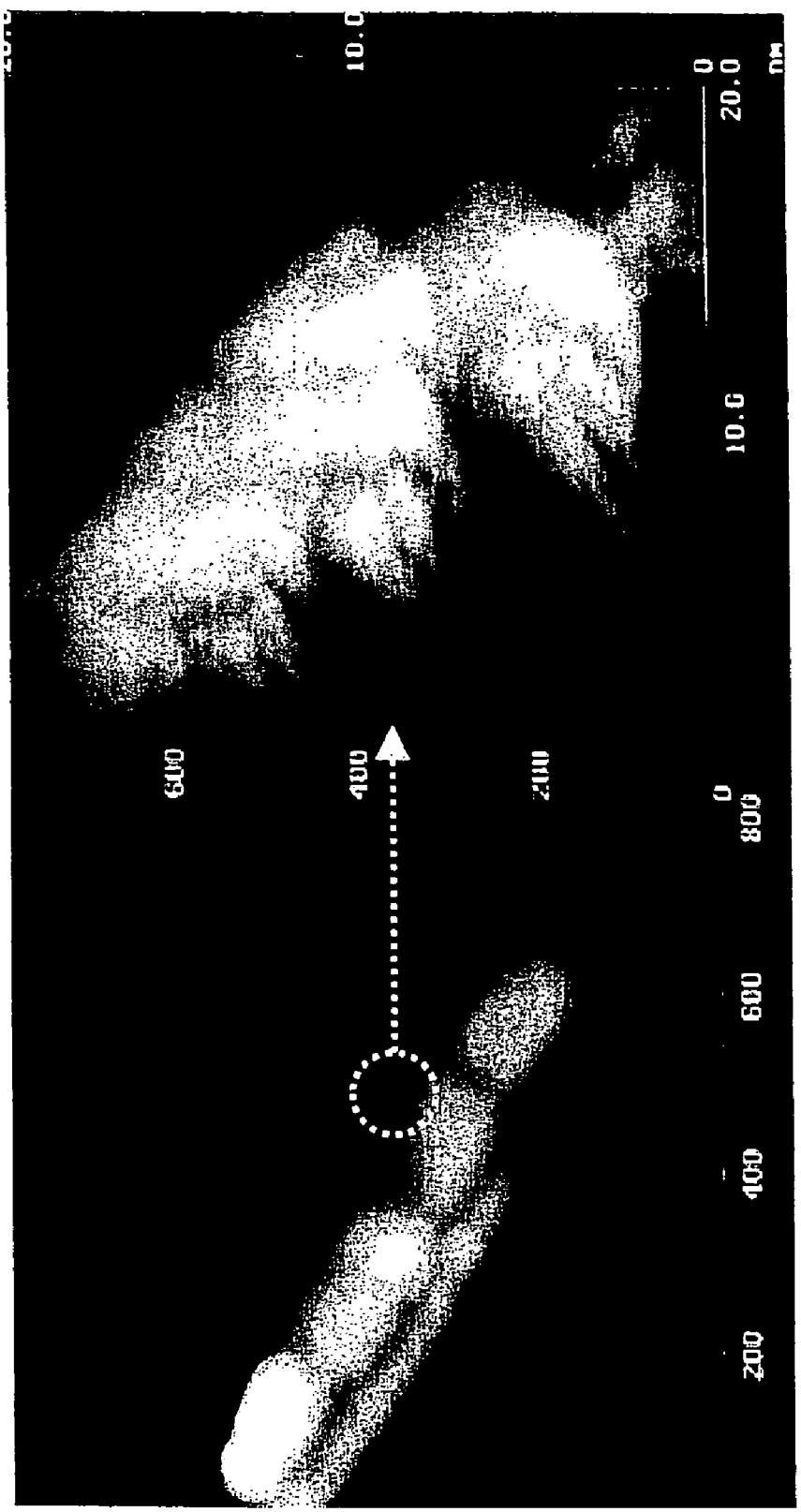
FIG. 8 is a scanning tunneling electron microscope photograph and its schematic view.

FIG. 8 is another scanning tunneling electron microscope (STM) photograph of the carbon nano-fibrous rod 12 (in the 2800° C. heat-treated state). In FIG. 8, the right-hand portion is an enlarged photograph of the left-hand portion. Based on the right-hand photograph in FIG. 8, a carbon network in which the axial end portions are looped is confirmed.

Figure 9:
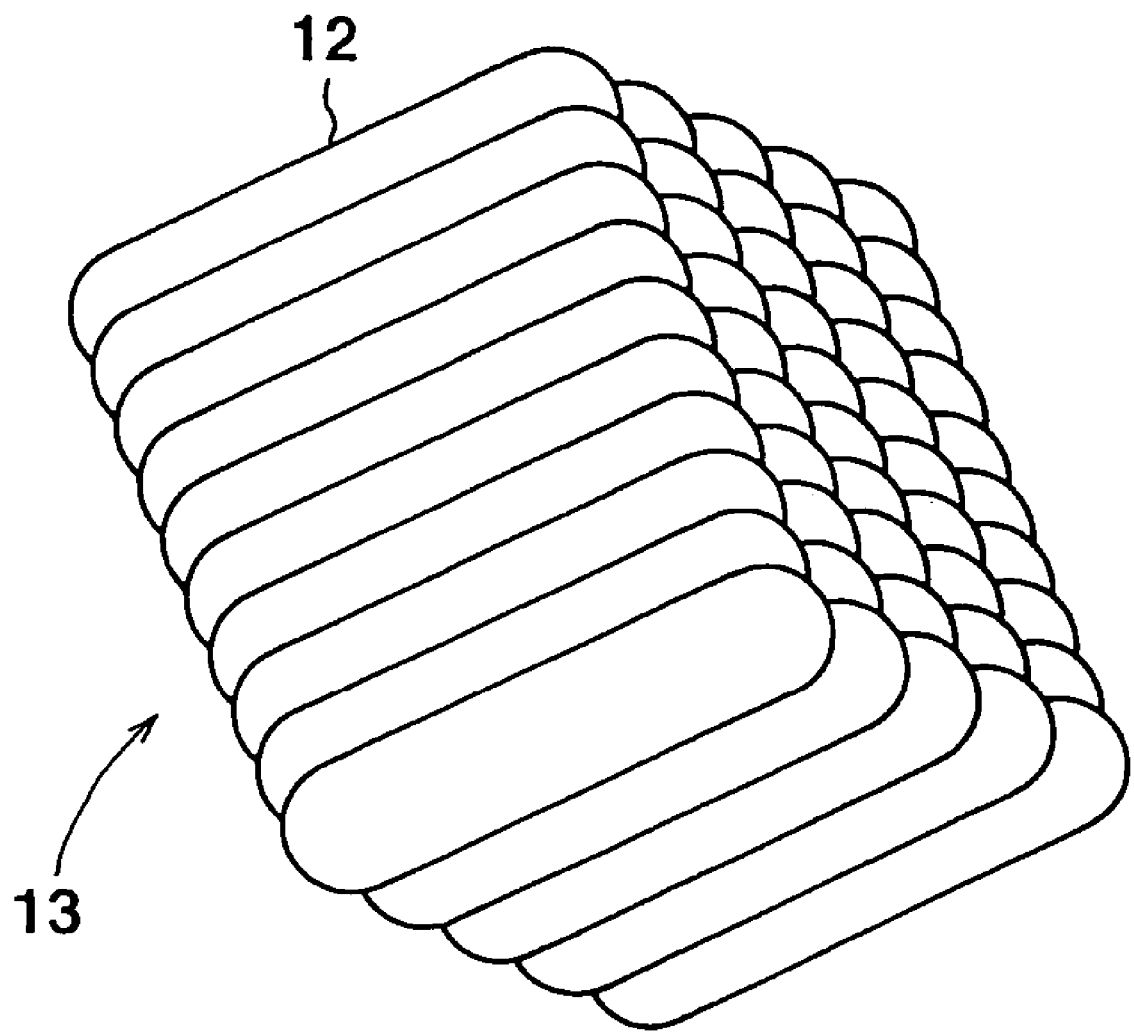
FIG. 9 is a schematic view showing a manner in which a carbon nano-fibrous rod cluster is formed.

FIG. 9 is a schematic view showing a manner in which the carbon nano-fibrous rods 12 shown in the right-hand portion of FIG. 8 gather to form a carbon nano-fibrous rod cluster 13.

The hexagonal carbon layer according to the present embodiment is the same as that in black materials accounting for most of the current carbon materials, and has a hexagonal layer of carbon atoms as the basic unit of its structure. The properties of these carbon materials are known to be determined basically by the completeness and size of the hexagonal carbon layer, the thickness of a stack of the hexagonal carbon layers, the regularity of the stack, and the mode and degree of selective orientation of the carbon layer (Dictionary of Carbon Terminology, p. 226, The Carbon Society of Japan, edited by the Dictionary of Carbon Terminology Edition Committee, Agne Shofu-sha, Tokyo, 2000).

The carbon nano-fibrous rod 12 according to the present invention has hexagonal layers of carbon atoms as basic units, and is established by 95% or more of carbon atoms. When the carbon nano-fibrous rod 12 is heat-treated at a high temperature of 2,000° C. or higher, it is established by 99% or more of carbon atoms. The interplanar spacing ($d_{002}$) of the nano-aggregate of the hexagonal carbon layers 11 of the carbon nano-fibrous rod 12 is less than 0.500 nm, and is similar to the magnitude (0.3354 nm) of the interplanar spacing ($d_{002}$) of pure graphite. Thus, the carbon nano-fibrous rod 12 according to the present invention has a high degree of graphitization.

This can be theoretically inferred from the fact that among the fibrous nanocarbons 15 composed of the close-packed stacked layers of only the carbon nano-fibrous rods 12, the fibrous nanocarbon 15 of the columnar structure is produced at 700° C. or lower, and the interplanar distance (spacing) ($d_{002}$) of its hexagonal carbon layers is less than 0.500 nm, as shown in Table 1 below.

TABLE 1

XRD properties of fibrous nanocarbons

| Structure | Heat treatment | $d_{002}$ (Å) | $Lc_{002}$ (nm) | $La_{110}$ (nm) |
|---|---|---|---|---|
| Columnar | Untreated | 3.363 | 30 | 20 |
| Columnar | 2000° C. | 3.366 | 34 | |
| Columnar | 2800° C. | 3.363 | 35 | 33 |
| Feather | Untreated | 3.432 | 4 | 3 |
| Feather | 2000° C. | 3.438 | 6 | |
| Feather | 2800° C. | 3.411 | 12 | 18 |
| Tubular | Untreated | 3.369 | 10 | 13 |
| Tubular | 2000° C. | 3.387 | 14 | 16 |
| Tubular | 2800° C. | 3.375 | 16 | 30 |

Models used: Rigaku Geigerflex/30 mA, 40 kV, Stepwise scan Calculation of XRD properties according to Gakushin Method The fibrous nanocarbon 15 according to the present invention comprises the aforementioned carbon nano-fibrous rods 12 closely packed in a three-dimensional direction. A schematic view of the stack of the carbon nano-fibrous rods 12, which is an example of this stacked state, is shown in FIG. 3. The stack shown in FIG. 3 represents a columnar stacked structure, in which a plurality of the carbon nano-fibrous rods 12 are stacked in a first direction (in the Z axis direction), with their central axes being parallel, to constitute a carbon nano-fibrous rod cluster 13, from which fibrous nanocarbon 15 is formed.

FIG. 10 is a high resolution transmission electron microscope photograph of the fibrous nanocarbon 15 of a columnar structure heat-treated at 2,800° C. As shown in FIG. 10, the carbon nano-fibrous rods 12 looped at the front ends are closely packed to constitute the carbon nano-fibrous rod cluster 13 which forms the fibrous nanocarbon 15. FIG. 10(a) is an enlarged view (×150,000 magnification) of the fibrous nanocarbon 15. FIG. 10(b) is an enlarged view of opposite end portions (at A and B in FIG. 10(a)) in a direction perpendicular to the axial direction (right-and-left direction in FIG. 10(a)) of the fibrous nanocarbon 15.

FIG. 10(b) clearly shows that the carbon nano-fibrous rods 12, which have been domed three-dimensionally at the front ends by heat treatment, are closely packed in a three-dimensional direction to constitute carbon nano-fibrous rod clusters 13, thereby forming the fibrous nanocarbon 15. The mode of gathering of the carbon nano-fibrous rods 12 varies, and the carbon nano-fibrous rods 12 are stacked or gathered in a direction perpendicular to, identical with, or intersecting with, the axes of the carbon nano-fibrous rods 12 to constitute the carbon nano-fibrous rod cluster 13.

Representative structures of the fibrous nanocarbon 15, which comprises a plurality of the carbon nano-fibrous rod clusters 13 gathered three-dimensionally, are classified, for example, into three forms, a feather structure, a tubular structure, and the columnar structure. Differences among these structures are not clear, but the shape of the fibrous nanocarbon 15 is assumed to change according to differences in the catalyst and the manufacturing conditions.

FIGS. 11(a) to 11(c) are schematic views of the above three forms of the carbon nano-fibrous rod cluster 13.

The first form is a form in which the carbon nano-fibrous rods are arranged at an angle ($\alpha$) of greater than 0 degree but smaller than 20 degrees with respect to an axis (X), which is perpendicular to an axis (Y) in the stacking direction (fiber axis direction). This is called the columnar fibrous nanocarbon cluster 13A (FIG. 11(a)).

The second form is a form in which the carbon nano-fibrous rods are arranged at an angle ($\beta$) of greater than 20 degrees but smaller than 80 degrees with respect to the axis (X), which is perpendicular to the axis (Y) in the stacking direction (fiber axis direction). This is called the feather-shaped fibrous nanocarbon cluster 13B (FIG. 11(b)).

As shown in FIG. 11(b), the feather-shaped fibrous nanocarbon cluster 13B takes a herringbone structure. The opposed arrangement of the adjacent rows is due to relationship with the catalyst. Thus, there may be an arrangement in which the adjacent rows are not opposed.

The third form is a form in which the carbon nano-fibrous rods are arranged at an angle ($\gamma$) of from 80 degrees to 88 degrees with respect to the axis (X), which is perpendicular to the axis (Y) in the stacking direction (fiber axis direction). This is called the tubular fibrous nanocarbon cluster 13C (FIG. 11(c)).

FIGS. 12(a) to 12(d) are schematic views of examples of the columnar carbon nano-fibrous rod cluster.

FIG. 12(a) shows that the carbon nano-fibrous rods 12 are stacked in a direction perpendicular to the axial direction of the carbon nano-fibrous rod 12 to constitute the carbon nano-fibrous rod cluster 13A of the columnar type.

FIGS. 12(b) and 12(c) show a state in which one or more carbon nano-fibrous rod clusters 13A are disposed parallel, and the central axes of the carbon nano-fibrous rods 12 are rendered parallel. That is, in FIG. 12(b), the parallel disposition is the parallel arrangement of the carbon nano-fibrous rod clusters 13A in two rows. In FIG. 12(c), the parallel disposition is the parallel arrangement of the carbon nano-fibrous rod clusters 13A in four rows. As shown in FIGS. 12(b) and 12(c), if the carbon nano-fibrous rod clusters 13A are disposed parallel just beside each other, the directions of the central axes of the carbon nano-fibrous rods 12 are identical.

As shown in FIG. 12(d), the carbon nano-fibrous rods 12 of different axial lengths may be stacked to constitute the carbon nano-fibrous rod cluster 13A, with nano-gaps 14 being formed in stacked portions of the respective carbon nano-fibrous rods 12.

As shown in FIGS. 13(a) and 13(b), moreover, it is also possible to form the carbon nano-fibrous rod cluster 13 of a rectangular tubular form in which the nano-gap 14 is present interiorly in a plane condition (see FIG. 13(a)) and is surrounded on all sides by the carbon nano-fibrous rods 12. As shown in FIGS. 14(a) to 14(d), the cross sectional shape of the carbon nano-fibrous rod cluster 13 in a direction perpendicular to the fiber axis of the carbon nano-fibrous rod cluster 13 can be various shapes, such as a hexagonal shape, an octagonal shape, a tetragonal shape, or a circular shape.

Figure 15:
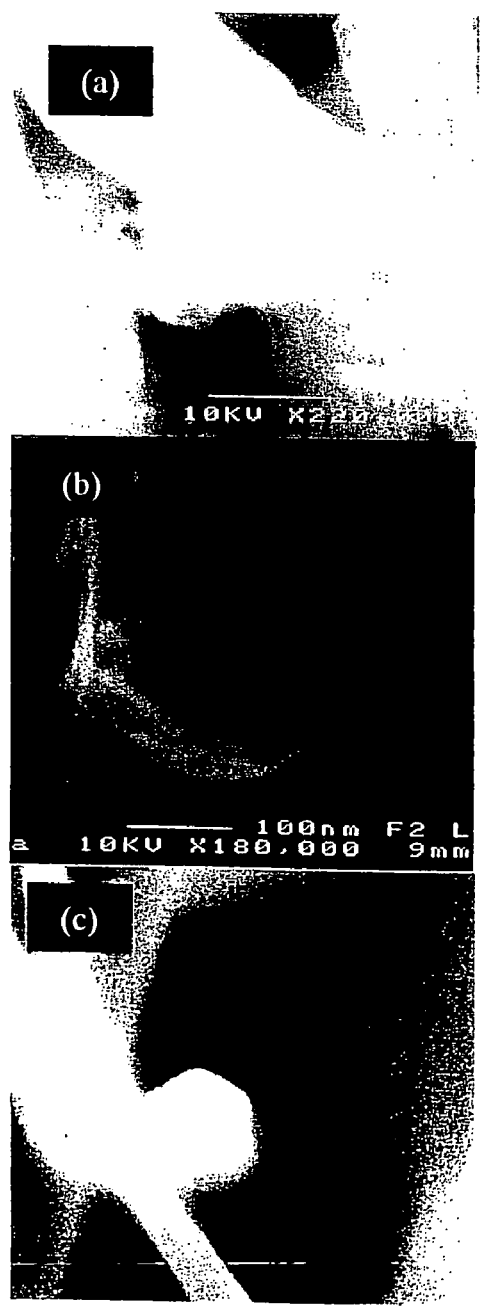
FIGS. 15(a) to 15(c) are scanning tunneling electron microscope photographs of various forms of carbon nano-fibrous rods.
Figure 16:
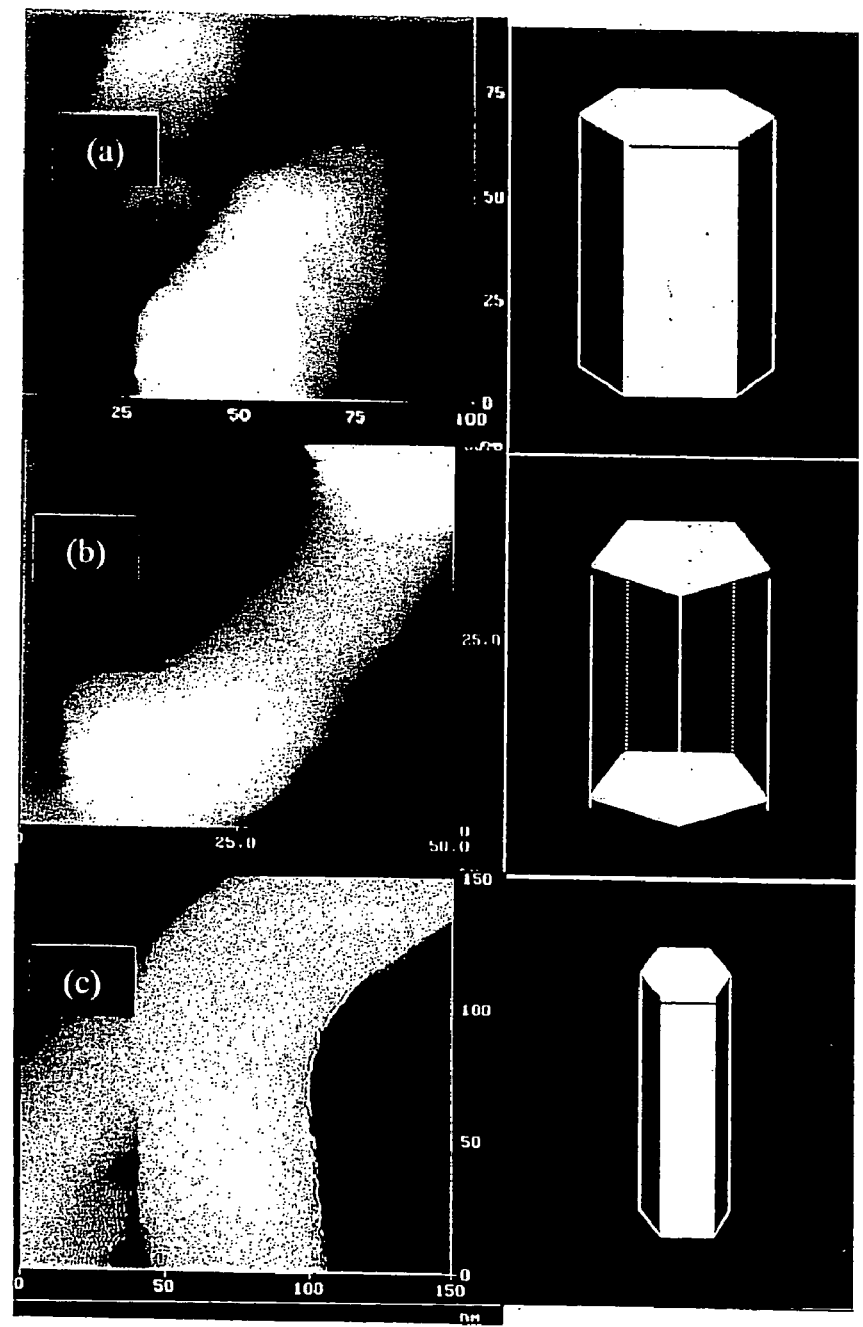
FIGS. 16(a) to 16(c) are scanning tunneling electron microscope photographs of various forms of carbon nano-fibrous rods.

FIGS. 15(a) to 15(c) are high resolution transmission microscope (HRTEM) photographs of the fibrous nanocarbon 15. FIGS. 16(a) to 16(c) are scanning tunneling electron microscope (STM) photographs of the fibrous nanocarbon 15. From these photographs, it is confirmed that the shape of the fibrous nanocarbon 15 structured in three modes, columnar structure, feather structure, and tubular structure, is nearly hexagonal or nearly pentagonal.

The carbon nano-fibrous rod cluster 13A of the columnar structure has an axial width of the order of 15 to 20 nm. Thus, the fibrous nanocarbon 15 of the columnar structure, which is constructed of the carbon nano-fibrous rod clusters 13A arranged sideways in four rows, has an axial width of 60 to 80 nm. Consequently, it follows that the fibrous nanocarbon 15 of the columnar structure with an axial width of 200 nm comprises the carbon nano-fibrous rod clusters 13A arranged laterally parallel in at least 10 rows.

Such fibrous nanocarbon 15 is synthesized by using a pure transition metal, typified by iron (Fe) cobalt (Co), or nickel (Ni), singly or as an alloy, as a catalyst, and bringing carbon monoxide or a hydrocarbon, such as methane ($CH_4$), ethylene ($C_2H_6$) or propane ($C_3H_8$), into contact with the catalyst for a certain period of time in a gas mixture with hydrogen (hydrogen partial pressure: 0 to 90%) at a temperature in the range of 400 to 1,200° C.

A preferred manufacturing example for the production of the fibrous nanocarbon 15 of the columnar structure is as follows:

An iron catalyst is prepared by the precipitation method (Best, R. J., Russell, W. W., *J. Amer. Soc.* 76, 838 (1954), Sinfelt, J. H., Carter, J. L., and Yates, D. J. C., *J Catal.* 24, 283 (1972)) with the use of iron nitrate.

The prepared iron catalyst (30 mg) is placed on a quartz boat (length 10 mm, width 2.5 mm, depth 1.5 mm (external values)), and is reduced for 0.5 to 10 hours at 500° C. in a quartz tube with an internal diameter of 4.5 cm, with a gas mixture of hydrogen and helium (hydrogen partial pressure: 20%) flowing therethrough at 100 sccm. Then, the reaction is performed for 0.25 to 3 hours at a temperature of 450 to 620° C., with a gas mixture of carbon monoxide and hydrogen (hydrogen partial pressure: 10-90%) flowing at 100 to 200 sccm. By so doing, fibrous nanocarbon 15 of a columnar structure is produced in a predetermined amount (2 to 1,500 mg).

Next, FIGS. 17(a) and 17(b) show an example of feather-structured fibrous nanocarbon in which the carbon nano-fibrous rods 12 are closely packed in a three-dimensional direction so as to have a certain angle with the axis, thereby constituting a carbon nano-fibrous rod cluster 13B. As shown in FIGS. 17(a), 17(b), the carbon nano-fibrous rod cluster 13B has a herringbone structure in which the carbon nano-fibrous rods 12 are opposed to each other at a predetermined angle. As shown in FIG. 17(a), for example, the nano-gaps 14 are present or, as shown in FIG. 17(b), the carbon nano-fibrous rods 12 intersect each other.

The feather-structured fibrous nanocarbon 15, as stated earlier, is configured such that the carbon nano-fibrous rods 12 are arranged at an angle ($\beta$) of greater than 20 degrees but less than 80 degrees with respect to an axis (X), which is perpendicular to the axis (Y) in the stacking direction (direction of the fiber axis) (see FIG. 11(b)). The carbon nano-fibrous rod 12 of such feather-structured carbon nano-fibrous rod cluster 13B has an axial width of 2.5±0.5 nm and an axial length of 4±2 nm at a stage when the carbon nano-fibrous rod 12 is synthesized. This is because the carbon nano-fibrous rod 12 is at a more acute angle than in the columnar fibrous nanocarbon cluster 13A, so that the axial length L of the carbon nano-fibrous rod 12, which is a constitutional unit, is shorter.

The hexagonal carbon layers 11 of the carbon nano-fibrous rod 12 of the carbon nano-fibrous rod cluster 13B have an interplanar spacing ($d_{002}$) therebetween of less than 0.500 nm, which is similar to the magnitude (0.3354 nm) of the interplanar spacing ($d_{002}$) of pure graphite. Thus, the carbon nano-fibrous rod 12 has a high degree of graphitization.

This can be inferred from the fact that based on high resolution transmission electron microscope photographs of fibrous nanocarbon 15 of the feather structure shown in FIGS. 18(a) to 18(c), the axial width of the carbon nano-fibrous rod 12, the number of the constituent hexagonal carbon layers 11, and the two-dimensional width of their nano-aggregate in the fibrous nanocarbon 15 of the feather structure are in practical agreement with those in the fibrous nanocarbon 15 comprising the packed stack of only the carbon nano-fibrous rods 12.

A concrete manufacturing example concerned with the production of the fibrous nanocarbon 15 of the feather structure is as follows:

The production of the fibrous nanocarbon cluster 13B of the feather structure is performed in the same manner as in the production of the fibrous nanocarbon 15 of the columnar structure, except that a nickel catalyst or a nickel-iron alloy catalyst (nickel content: 70-90% (weight ratio)) is prepared by the same precipitation method with the use of nickel nitrate or a mixture of nickel nitrate and iron nitrate instead of iron nitrate.

Then, the above catalyst is reduced for 0.5 to 10 hours at 500° C., with a gas mixture of hydrogen and helium (hydrogen partial pressure: 20%) flowing at 100 sccm, by the same method and by means of the same apparatus as in the aforementioned experiments. Then, the reaction is performed for 0.25 to 3 hours at a temperature of 450 to 620° C., with a gas mixture of ethylene and hydrogen (hydrogen partial pressure: 10-90%) flowing at 100 to 200 sccm. By so doing, fibrous nanocarbon 15 of a herringbone structure is produced in a predetermined amount (2 to 5,400 mg).

Next, FIGS. 19(a) to 19(c) show an example of tubular-structure fibrous nanocarbon 15 in which the carbon nano-fibrous rods 12 are joined together at the opposite ends in the axial direction so as to have a predetermined number of knots in the axial direction, thereby constituting a carbon nano-fibrous rod cluster 13C. As shown in FIGS. 19(a) to 19(c), the carbon nano-fibrous rod cluster 13C of the tubular structure comprises the carbon nano-fibrous rods 12 joined together at opposite end portions in the axial direction.

The tubular-structure fibrous nanocarbon cluster 13C, as stated earlier, is configured such that the carbon nano-fibrous rods 12 are arranged at an angle (γ) of from 80 degrees to 88 degrees with respect to the axis (X), which is perpendicular to the axis (Y) in the stacking direction (direction of the fiber axis) (see FIG. 11(c)). The carbon nano-fibrous rod 12 constituting this tubular-structure has an axial width of 2.5±0.5 nm and an axial length of 13±10 nm at a stage when the carbon nano-fibrous rod 12 is synthesized.

FIG. 19(a) shows the construction of the tubular-structure fibrous nanocarbon cluster 13C from the carbon nano-fibrous rods 12 joined together rectilinearly (in the same row) at axial end portions. FIG. 19(b) shows the construction of the tubular-structure fibrous nanocarbon cluster 13C from the carbon nano-fibrous rods 12 joined together such that the axial end portions of the paired carbon nano-fibrous rods 12 sandwich the axial end portion of the single carbon nano-fibrous rod 12. FIG. 19(c) shows the construction of the tubular-structure fibrous nanocarbon cluster 13C from the carbon nano-fibrous rods 12 joined together such that the axial end portions of the carbon nano-fibrous rods 12 overlap. The manner of joining is not limited to these manners. Anyway, joining is performed at the opposite end portions of the axis, so that the carbon nano-fibrous rod cluster 13C is formed with the knots.

The hexagonal carbon layers 11 of the carbon nano-fibrous rod 12 of the carbon nano-fibrous rod cluster 13C have an interplanar spacing ($d_{002}$) therebetween of less than 0.3400 nm, which is similar to the magnitude (0.3354 nm) of the interplanar spacing ($d_{002}$) of pure graphite. Thus, the carbon nano-fibrous rod 12 has a high degree of graphitization.

This can be theoretically inferred from the fact that among the fibrous nanocarbons 15 composed of the close-packed stack of only the carbon nano-fibrous rods 12, the fibrous nanocarbon 15 of the tubular structure, in the as-prepared stage (heat treatment at 700° C. or lower), gives an interplanar distance ($d_{002}$) of less than 0.3400 nm to the nano-aggregate composed of the hexagonal carbon layers 11.

A concrete working example concerned with the production of the fibrous nanocarbon 15 of the tubular structure is as follows:

An iron catalyst or a nickel-iron alloy (nickel content (weight ratio): 30-70%) catalyst is prepared by the same precipitation method in the aforementioned experiments with the use of iron nitrate or a mixture of nickel nitrate and iron nitrate. The prepared catalyst is reduced for 0.5 to 10 hours at 500° C., with a gas mixture of hydrogen and helium (hydrogen partial pressure: 20%) flowing at 100 sccm, by the same method and by means of the same apparatus as in the aforementioned experiments. Then, the reaction is performed for 0.25 to 3 hours at a temperature of 620 to 655° C., with a gas mixture of carbon monoxide and hydrogen (hydrogen partial pressure: 10-90%) flowing at 100 to 200 sccm. By so doing, fibrous nanocarbon 15 of a tubular structure is produced in a predetermined amount (2 to 1,500 mg).

Next, an explanation will be offered for the heat treatment of the fibrous nanocarbon 15, which comprises the carbon nano-fibrous rod cluster 13A of the columnar structure, at a temperature of 1,600° C. or higher under vacuum or in an atmosphere of an inert gas.

The fibrous nanocarbon 15 comprising the carbon nano-fibrous rod cluster 13 according to the present invention, as shown in the aforementioned Table 1, has a high degree of graphitization in the as-prepared state when taking a columnar structure or a tubular structure, and thus possesses adequate properties as an artificial graphite-based highly functional material; if this material is graphitized at 2,000° C. or higher, it has a high degree of graphitization when taking any of the structures, including a herringbone structure.

As for the heat treatment conditions, heat treatment is performed at a temperature of 1,600° C. or higher, preferably 2,000° C. or higher, more preferably 2,800° C. or higher. If the heat treatment temperature is lower than 1,600° C., the degree of graphitization is low.

Upon heat treatment, the ends of the carbon nano-fibrous rod 12 made of the hexagonal carbon layers 11 in the surface portion of the fibrous nanocarbon 15 are joined in a loop form two-dimensionally, or in a circular or hexagonal domic cross sectional shape three-dimensionally, thereby constituting one unit.

Figure 20:
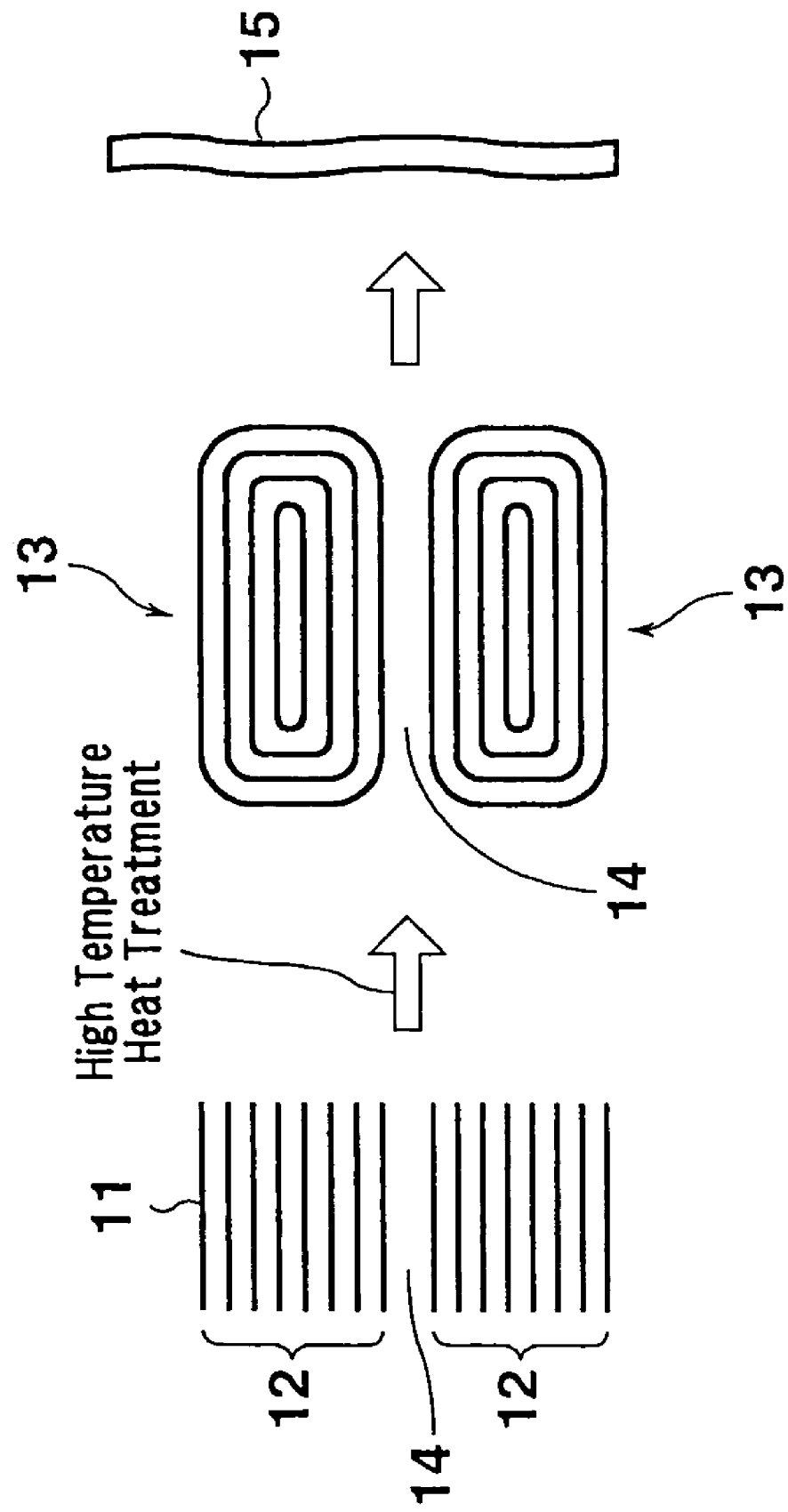
FIG. 20 shows a schematic view of heat treatment of a carbon nano-fibrous rod, and a schematic view of fibrous nanocarbon comprising heat-treated carbon nano-fibrous rods gathered.

FIG. 20 shows a schematic drawing of heat treatment of the carbon nano-fibrous rod 12. As shown in FIG. 20, the carbon nano-fibrous rod 12 composed of eight hexagonal carbon layers 11 constitutes one unit. When the one unit of the carbon nano-fibrous rod 12 is heat-treated at a high temperature (1,600° C. or higher), the end faces of the carbon nano-fibrous rods 12 comprising the hexagonal carbon layers 11 are joined to form the dome-shaped graphitized carbon nano-fibrous rod cluster 13. A plurality of the graphitized carbon nano-fibrous rod clusters 13 are stacked to form the fibrous nanocarbon 15.

From the aforementioned FIGS. 10(a), 10(b) showing the high resolution transmission electron microscope (HRTEM) photographs of the fibrous nanocarbon 15 of the columnar structure before and after graphitization, it can be confirmed that the end faces (edge surfaces) of the hexagonal carbon layers before high-temperature treatment are joined in a loop form two-dimensionally after high-temperature treatment.

FIGS. 21(a) to 21(c) are photographs of the carbon nano-fibrous rod cluster 13A constituting the fibrous nanocarbon 15 of the columnar structure, which was treated at a high temperature of 2,800° C., the photographs being taken at varying angles (−30 degrees, 0 degree, +30 degrees) of a transmission electron beam of a high resolution transmission electron microscope.

Figure 22:
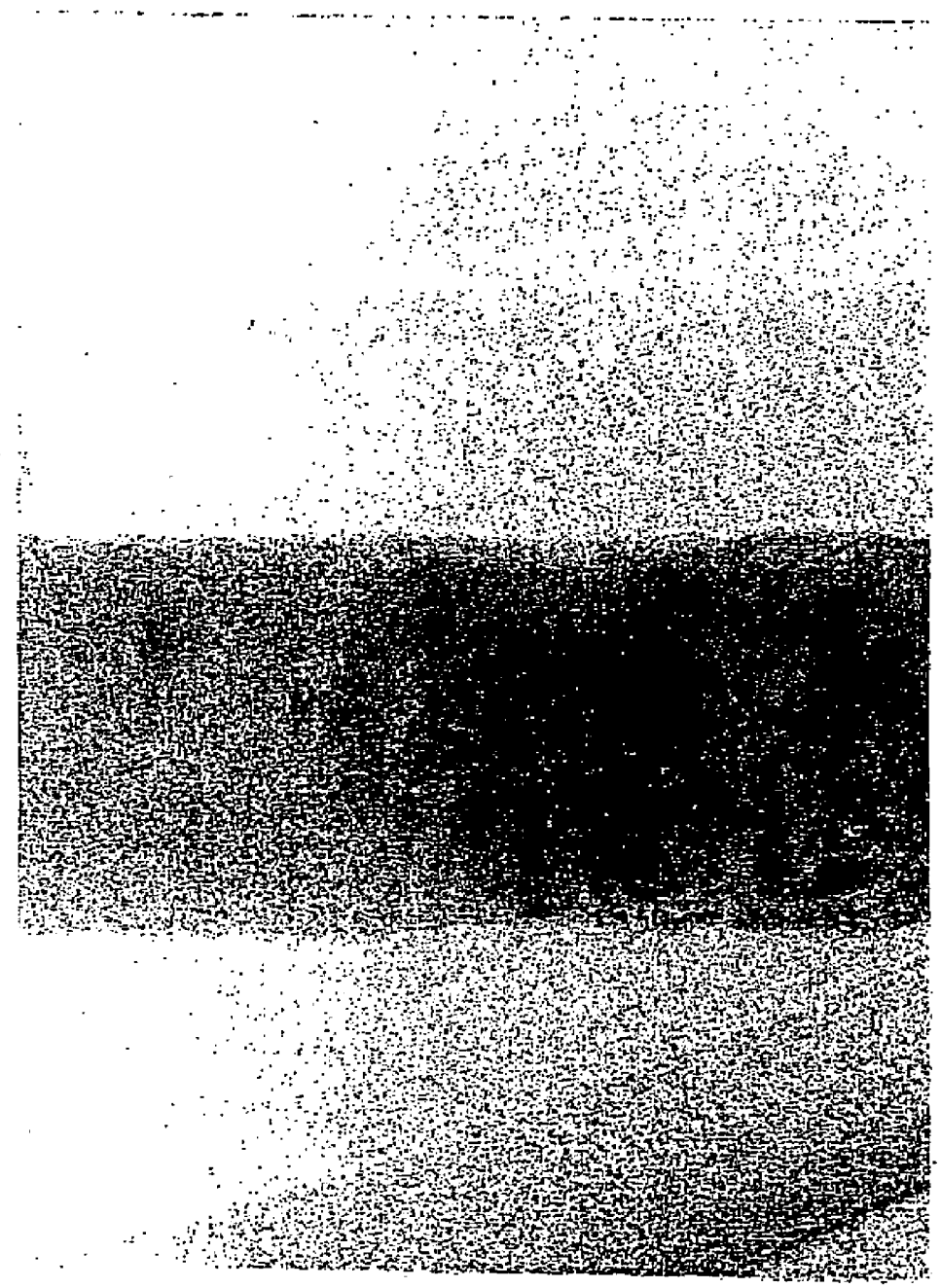
FIG. 22 is a high resolution transmission electron microscope photograph of a high-temperature (2,800° C.) treated product of a carbon nano-fibrous rod cluster constituting fibrous nanocarbon of a columnar structure.
Figure 23:
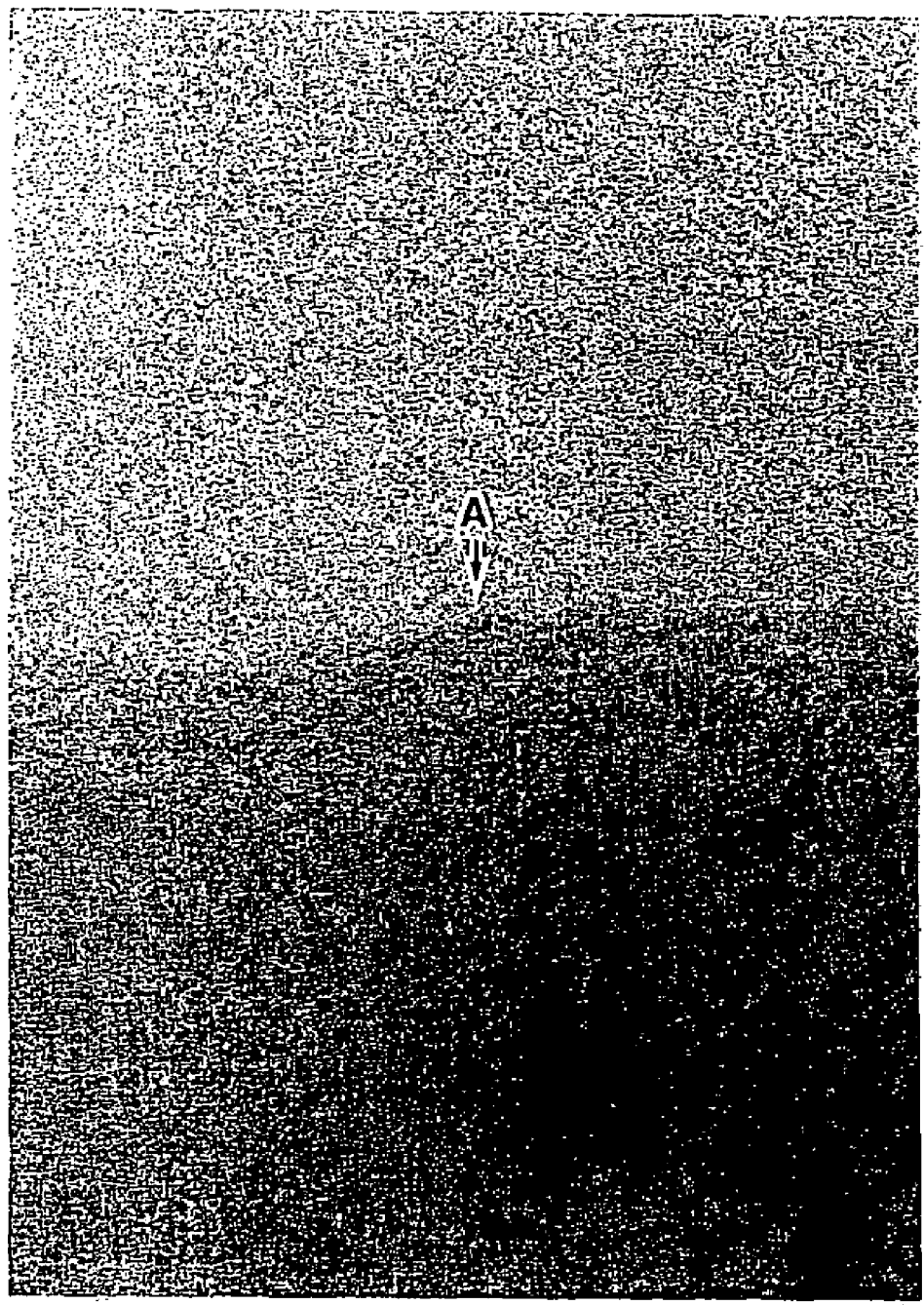
FIG. 23 is a high resolution transmission electron microscope photograph (magnification: ×600,000) of the high-temperature (2,800° C.) treated product at the angle of −30 degrees in FIG. 21.
Figure 24:
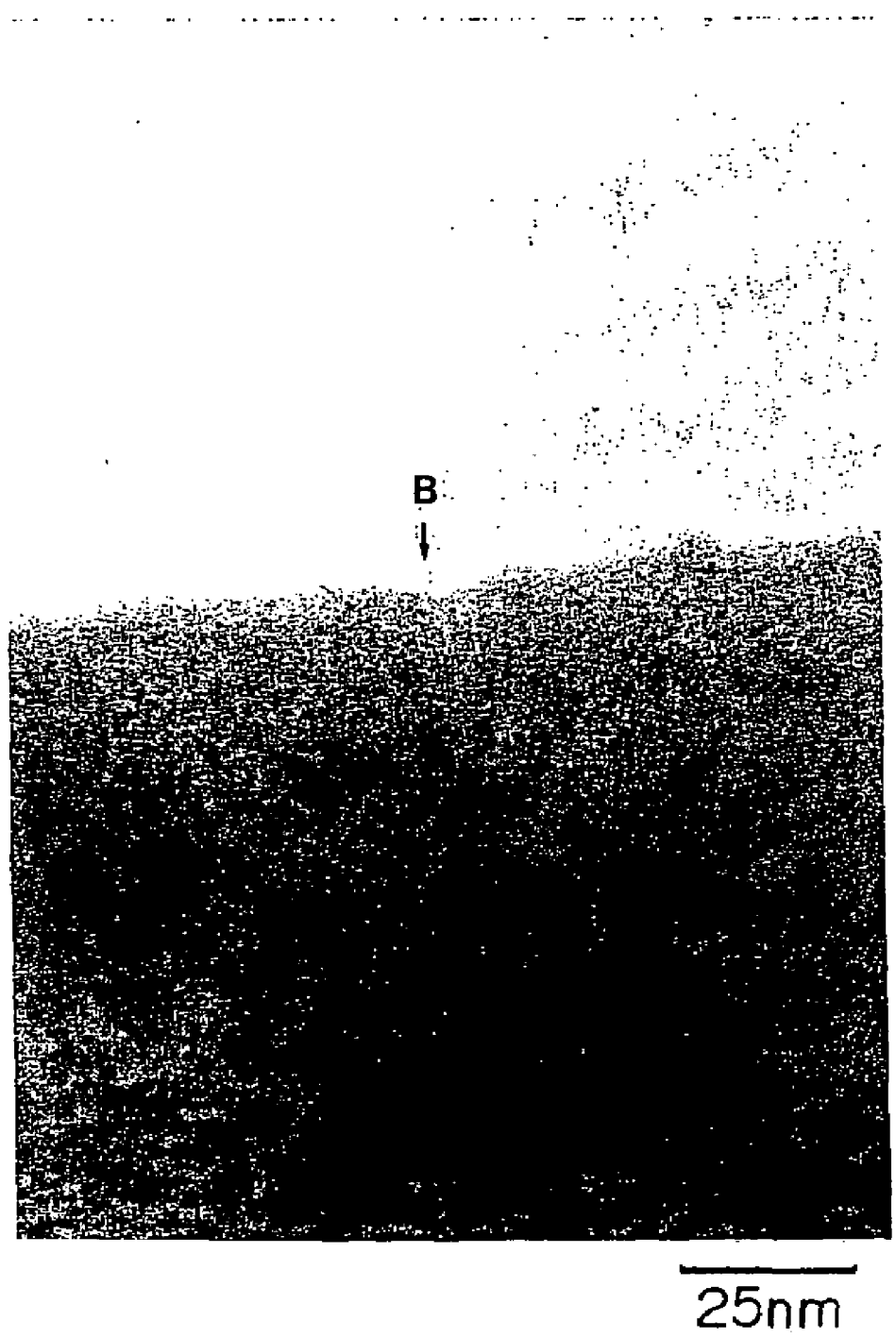
FIG. 24 is a high resolution transmission electron microscope photograph of the high-temperature (2,800° C.) treated product at the angle of 0 degree in FIG. 21.
Figure 25:
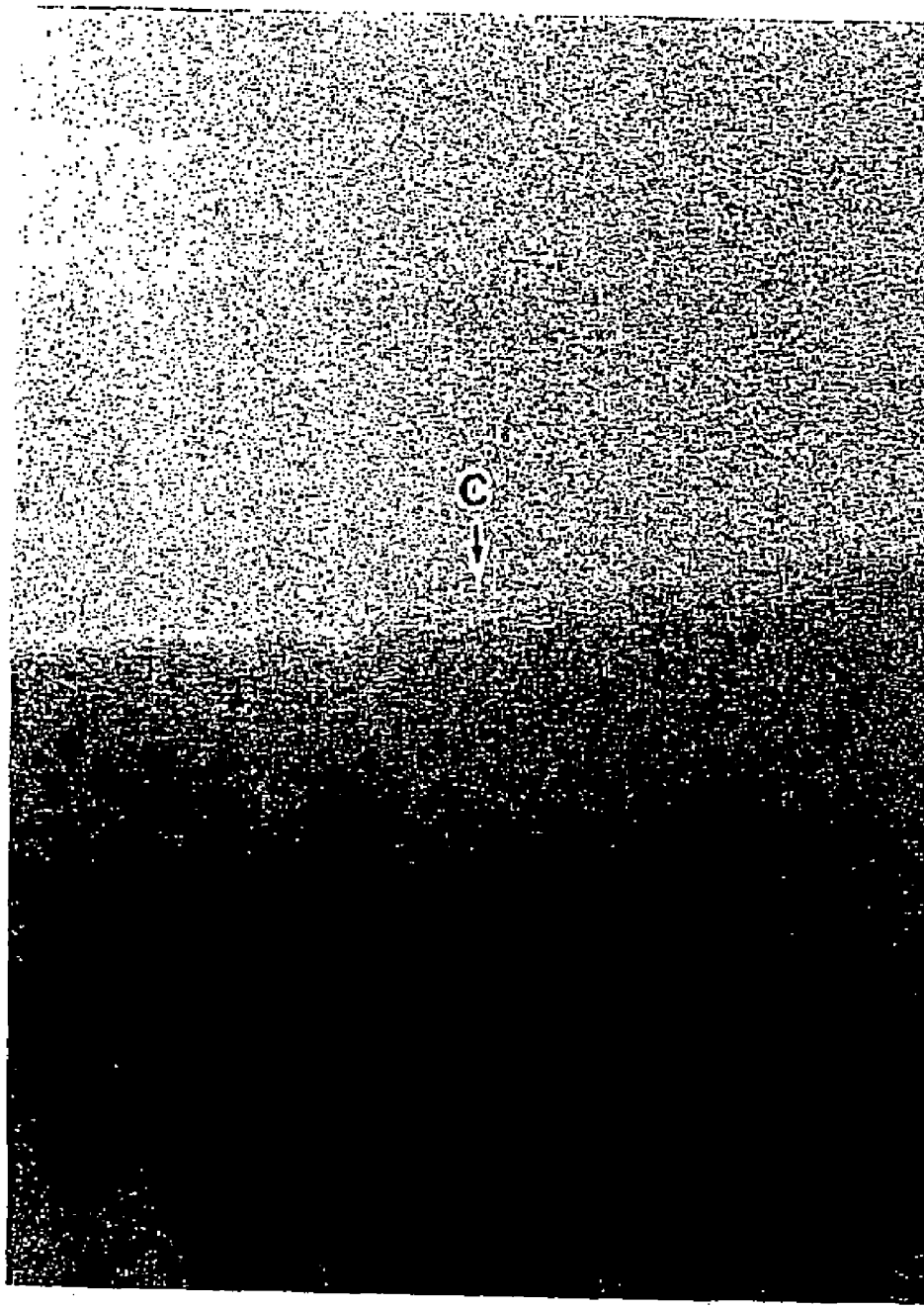
FIG. 25 is a high resolution transmission electron microscope photograph of the high-temperature (2,800° C.) treated product at the angle of +30 degrees in FIG. 21.
Figure 26:
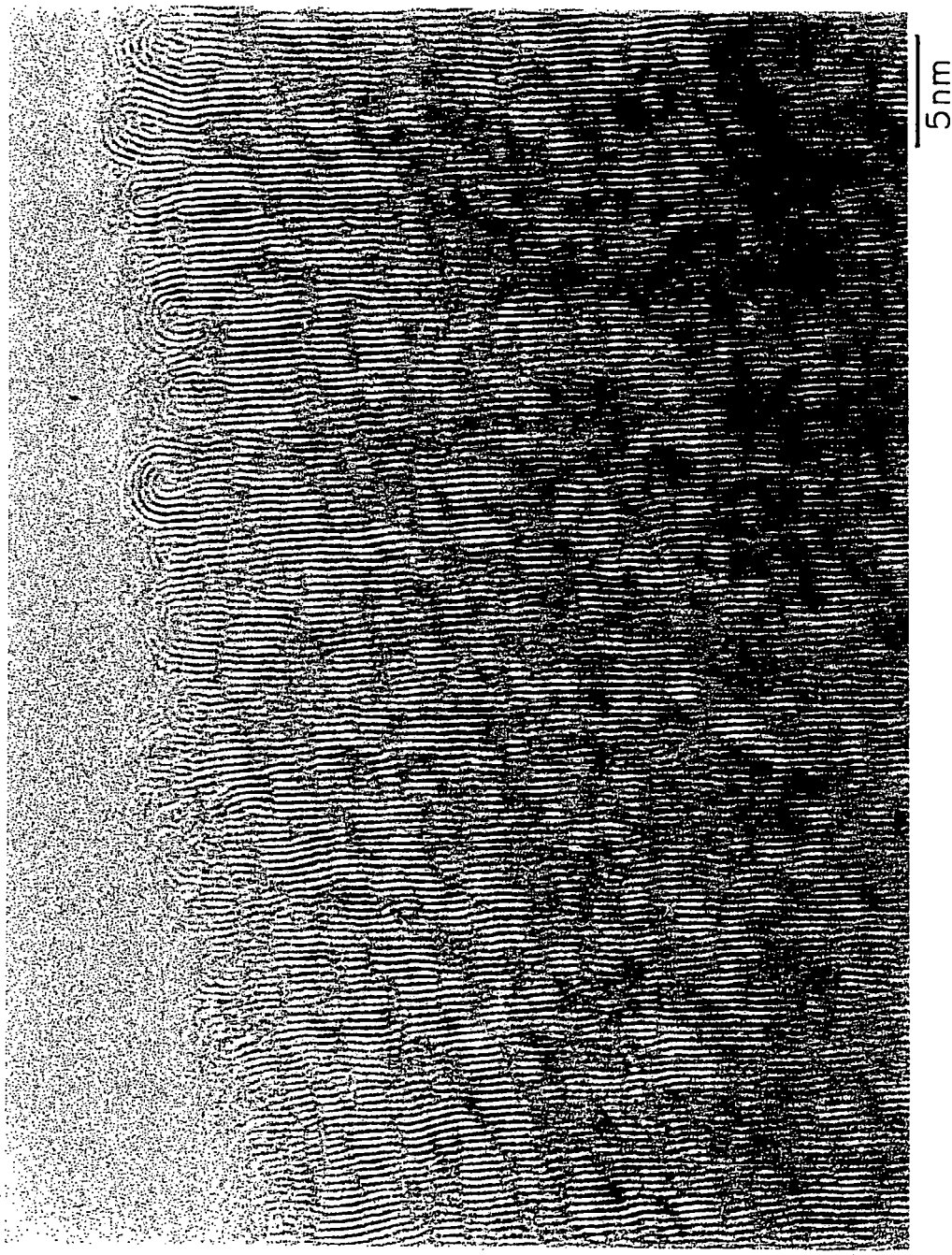
FIG. 26 is a high resolution transmission electron microscope photograph of the high-temperature (2,800° C.) treated product at the angle of −30 degrees in FIG. 23.
Figure 27:
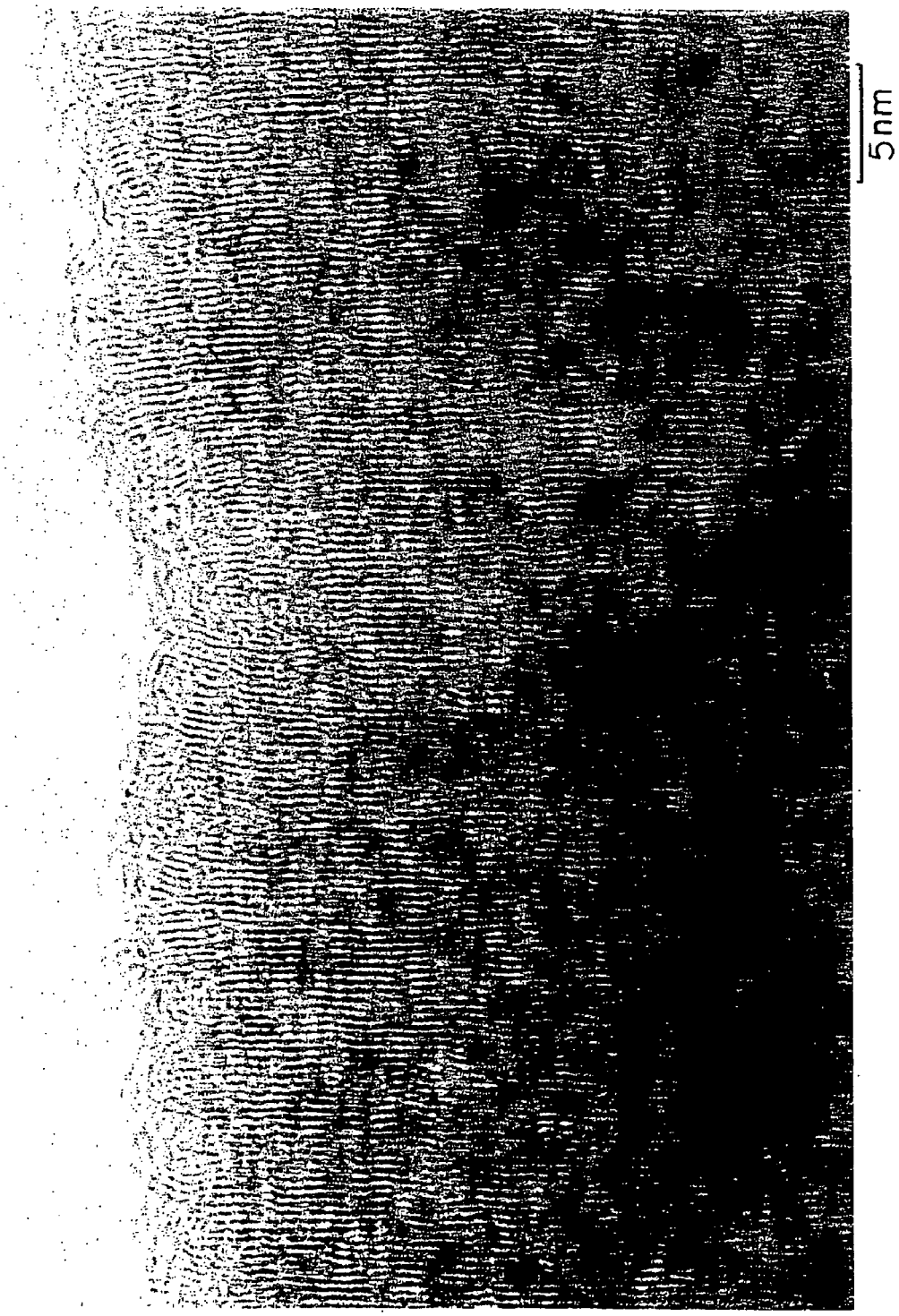
FIG. 27 is a high resolution transmission electron microscope photograph of the high-temperature (2,800° C.) treated product at the angle of 0 degree in FIG. 24.
Figure 28:
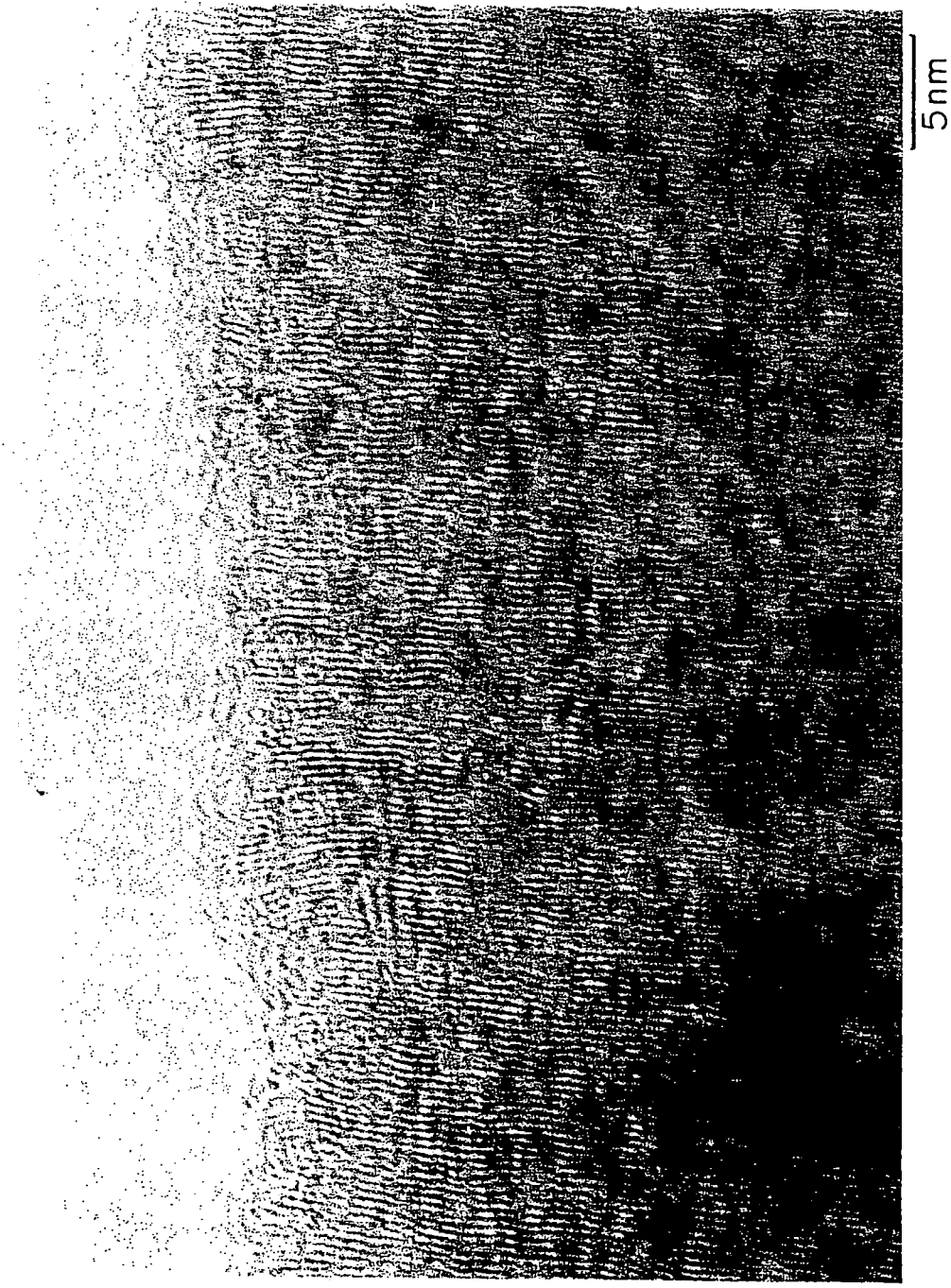
FIG. 28 is a high resolution transmission electron microscope photograph of the high-temperature (2,800° C.) treated product at the angle of +30 degrees in FIG. 25.

FIGS. 23 to 25 are photographs (×600,000 magnification) of the fibrous nanocarbon 15 shown in FIG. 22 (×150,000 magnification), the photographs being taken with the angle of the transmission electron beam of the high resolution transmission electron microscope being varied (−30 degrees (FIG. 23), 0 degree (FIG. 24), +30 degrees (FIG. 25)). FIGS. 26 to 28 are enlarged photographs (×3,200,000 magnification) of FIGS. 23 to 25, FIG. 26 representing −30 degrees, FIG. 27 representing 0 degree, and FIG. 28 representing +30 degrees.

These drawings have confirmed that when the angle is changed, the position of the looped end at the front end portion looks changed. As a result, it has been confirmed that the looped end face is formed two-dimensionally by joining of the ends of the carbon nano-fibrous rods 12 composed of the hexagonal carbon layers 11. It has also been found that a 6- to 8-layered structure forms an aggregate unit, and one such unit constitutes the carbon nano-fibrous rod 12.

FIGS. 29(a) to 29(c) are high resolution scanning tunneling electron microscope (STM) photographs of three types of fibrous nanocarbons 15 before and after high-temperature heat treatment. The edge planes (10-planes) comprising the hexagonal carbon layer 11 (i.e., 100-plane, 110-plane), theoretically, cannot be observed under a scanning tunneling electron microscope, and thus the edge plane cannot be observed at a high magnification. However, the carbon nano-fibrous rod 12 can be observed from all photographs of the three types of fibrous nanocarbons 15 before heat treatment. Furthermore, a three-dimensional close-packed stack of the carbon nano-fibrous rods 12 can be confirmed to constitute the fibrous nanocarbon 15.

FIGS. 30(a) to 30(c) are high resolution transmission electron microscope photographs of the carbon nano-fibrous rod cluster 13A in the as-prepared condition (prepared at 600° C. using an iron catalyst) constituting the fibrous nanocarbon 15 of the columnar structure, and structures after treatment at high temperatures of 2,000° C. and 2,800° C.

Figure 31:
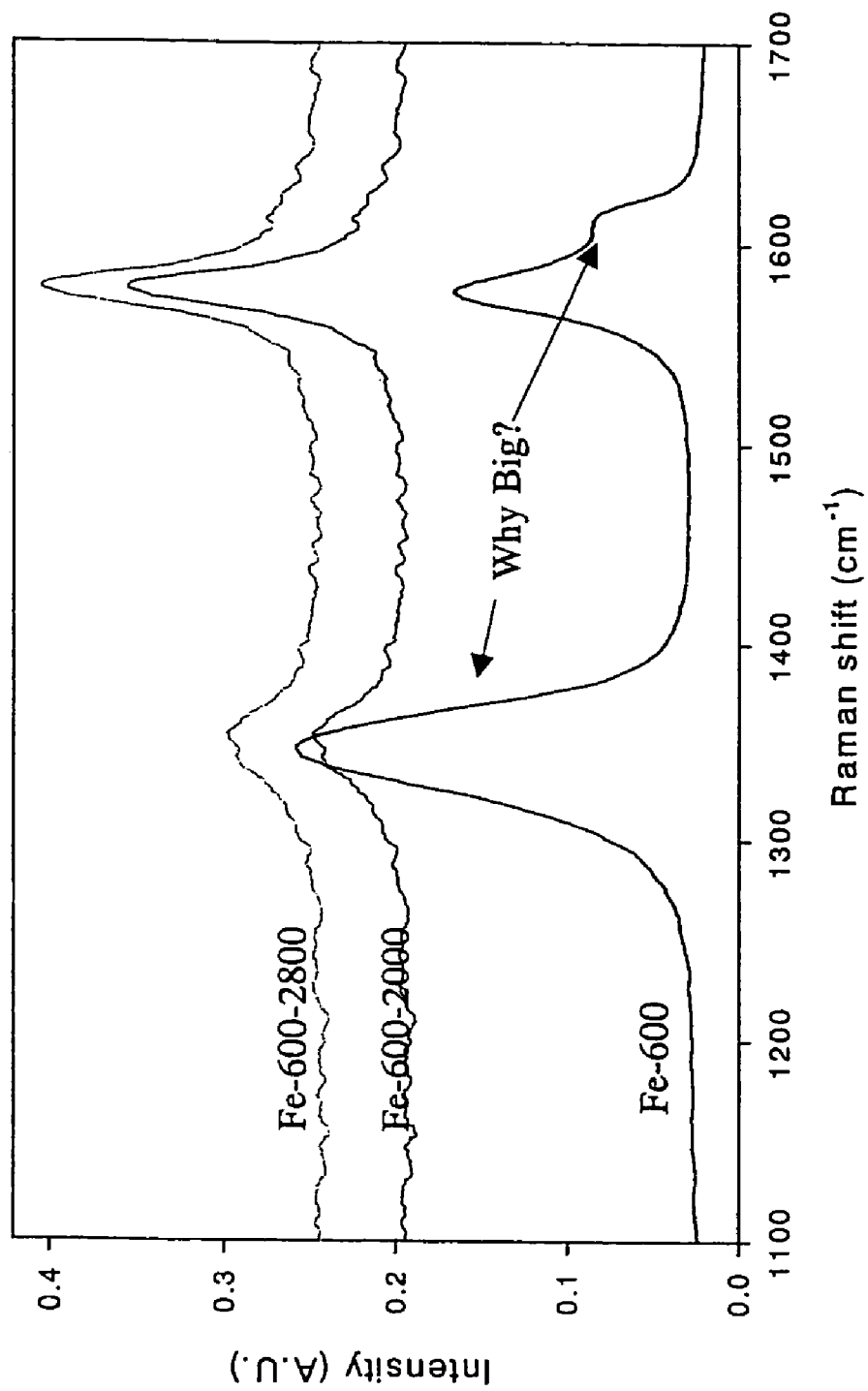
FIG. 31 is Raman scattering spectrum profiles before and after heat treatment of fibrous nanocarbon composed of the carbon nano-fibrous rod cluster of a columnar structure.

FIG. 31 shows the Raman scattering spectra, before and after heat treatment, of the fibrous nanocarbon 15 comprising the carbon nano-fibrous rod cluster 13A of the columnar structure. Recent studies have demonstrated that a peak at 1,350 cm$^{-1}$ in the Raman scattering spectrum of carbon represents, with high sensitivity, not only the quantitative determination of amorphous carbon, but also the quantitative determination of the edge plane (10-plane) of the hexagonal carbon layer 11.

As shown in the aforementioned Table 1, the fibrous nanocarbon 15 of the columnar structure before graphitization and that after graphitization are not very different. However, the transmission electron microscope photographs of FIGS. 31(a) to 31(c) and the Raman spectra of FIG. 32 can confirm that the peak in the vicinity of 1,350 cm$^{-1}$ is markedly decreased as a result of heat treatment at 2,000° C. or higher.

This clearly reveals that the heat treatment at 2,000° C. or higher has converted all of the edge planes (10-planes) of the hexagonal carbon layers 11 of the carbon nano-fibrous rod cluster 13A, which constitutes the fibrous nanocarbon 15 of the columnar structure, into dome-shaped basal planes (002-planes) three-dimensionally as a result of joining of the ends. Based on these results, the fibrous nanocarbon 15 of the columnar structure before heat treatment was confirmed to contain large amounts of edge planes (10-planes) of the hexagonal carbon layers 11 which are scarcely present in ordinary highly graphitized carbons other than HOPG.

As described above, the fibrous nanocarbon 15 made up of the carbon nano-fibrous rods 12 according to the present invention has a high degree of graphitization when taking a columnar structure or a tubular structure. Thus, it is preferred as a high conductivity (heat, electricity) filler, and can be expected to find application making use of its high degree of graphitization, such as an electrode material of a lithium secondary battery, an electromagnetic wave shielding material, or a catalyst carrier for fuel cells or organic reactions. Since it has a large surface area when taking a feather structure, moreover, it can be expected to be used as an electrode material for supercapacitors, an occluding material for methane and hydrogen, a desulfurizing material for SOx, or a denitrating material for NOx.

<Method and Apparatus for Producing Fibrous Nanocarbon>

Figure 32:
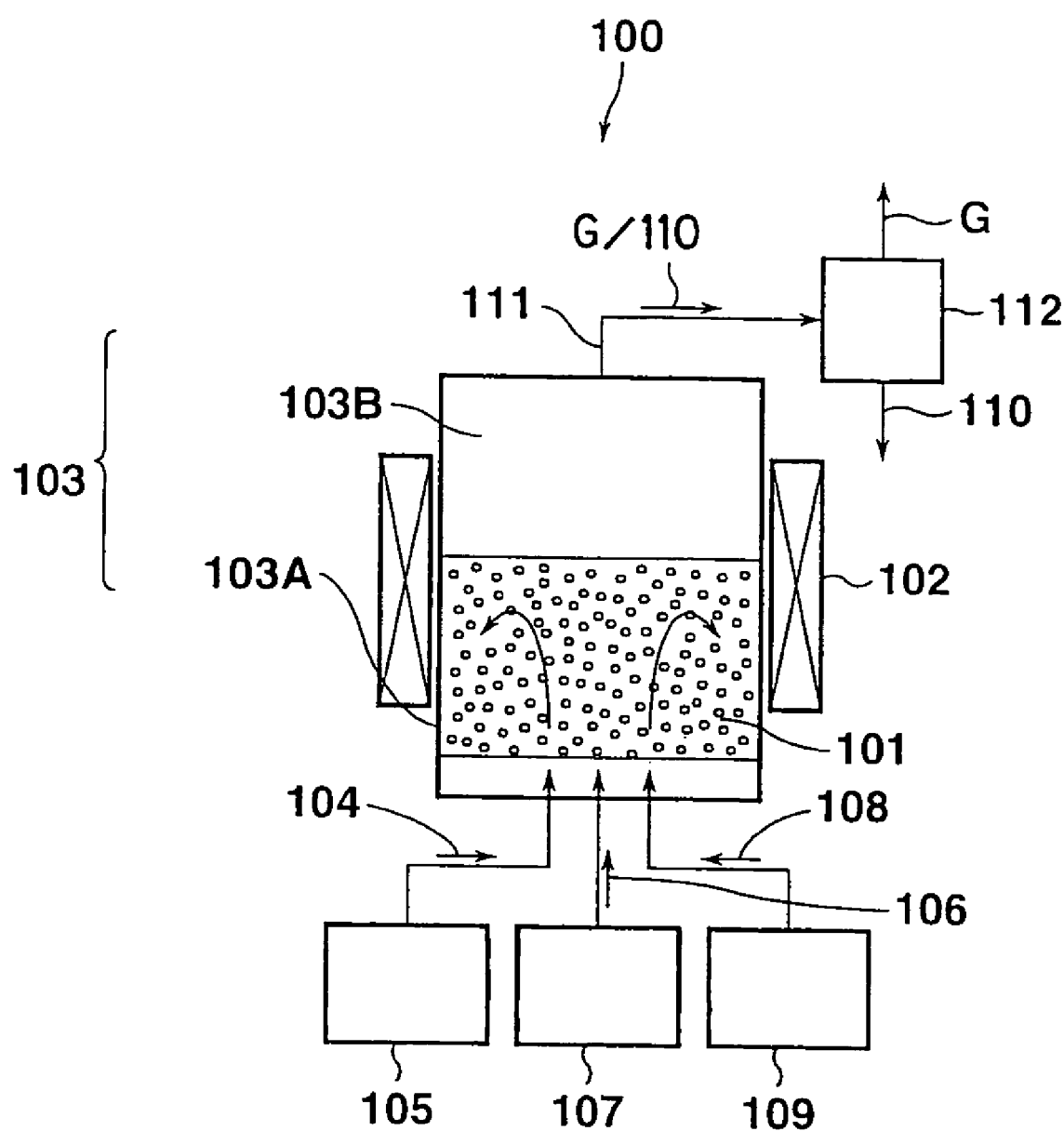
FIG. 32 is a schematic view of a first embodiment of an apparatus for producing a carbon nano-fibrous rod according to the present invention.

FIG. 32 is a schematic view of a first embodiment of an apparatus for producing fibrous nanocarbon.

As shown in FIG. 32, an apparatus 100 for producing fibrous nanocarbon according to the present invention is an apparatus for producing fibrous nanocarbon 15 by reacting a carbon material 106 in a high temperature fluidized bed with the use of a catalyst. This apparatus 100 comprises a fluidized bed reactor 103 charged with a dual-purpose catalyst/fluid material 101, which comprises a catalyst-supporting carrier bound via a binder, for forming a fluidized bed, and also equipped with a heating means 102 for heating the interior; a first gas supply means 105 for supplying a reducing gas (H$_2$, or an inert gas containing H$_2$, or CO) 104 into the fluidized bed reactor 103; a carbon material supply means 107 for supplying the carbon material 106, which is brought into contact with the dual-purpose catalyst/fluid material 101 for generating the fibrous nanocarbon 15, in a gaseous state into the fluidized bed reactor 103; a second gas supply means 109 for supplying a carbon-free inert gas 108 into the fluidized bed reactor 103; and a discharge line 111 for discharging a gas G and scattered particles 110 containing the resulting fibrous nanocarbon 15 from the fluidized bed reactor 103.

The fluidized bed reactor 103 is formed from a fluidized bed portion 103A forming a fluidized bed, and a free board portion 103B in communication with an upper part of the fluidized bed portion 103A. The type of reaction of the fluidized bed includes a bubble fluidized bed type, and a jet fluidized bed type. Either type may be used for the present invention. The free board portion 103B preferably has a larger channel sectional area than that of the fluidized bed portion 103A.

In the present embodiment, a particle recovery means 112 for recovering the scattered particles 110 is interposed in the gas discharge line 111. As the recovery means 112, a means for catching or recovering particles, such as a cyclone or a filter, can be named, for example. The cyclone separates the scattered particles 110 contained in the gas G by a centrifugal force, and the separated scattered particles 110 containing the fibrous nanocarbon 15 can be recovered from the bottom or the like of the cyclone.

In the present embodiment, an ordinary fluid material, such as silica sand or alumina, is not used, but the dual-purpose catalyst/fluid material 101 is used, as the fluid material forming the fluidized bed. In the present embodiment, the dual-purpose catalyst/fluid material 101 forms the fluidized bed, and the carbon material 106 is supplied to produce the fibrous nanocarbon 15. Then, as will be described later, the fluid material 101 is finely divided or treated in other manner to eliminate its function of the fluid material so that the fibrous nanocarbon 15 growing on the catalyst can be easily recovered.

As a result, when the fibrous nanocarbon 15 is to be produced, the dual-purpose catalyst/fluid material 101 (catalyst) is present uniformly in the fluidized bed reactor 103. Thus, the efficiency of contact of the catalyst with the carbon material 106 is satisfactory, and a uniform reaction can be performed. In recovering the fibrous nanocarbon 15 growing on the catalyst, the dual-purpose catalyst/fluid material 101 is divided into fine pieces until converted into its constitutional units or its aggregate units. By this procedure, the efficiency of separation of the fibrous nanocarbon 15 growing on each catalyst can be increased, and the fibrous nanocarbon 15 with uniform properties can be easily obtained.

FIGS. 33(a) to 33(e) are schematic views of the production of a dual-purpose catalyst/fluid material 101, and a process for producing fibrous nanocarbon 15 from a carbon material 106 with the use of the fluid material 101.

The method for producing the fibrous nanocarbon 15 according to the present invention uses, as a fluid material, the dual-purpose catalyst/fluid material 101 having a carrier 122, which supports a metal catalyst 121 thereon, bound via a binder 123. The method includes (1) a first gas supply step of supplying a reducing gas 104, (2) a carbon material supply step of supplying the carbon material 106 in a gaseous state to produce a carbon nano-fibrous rod 15 in the presence of the catalyst 121 of the dual-purpose catalyst/fluid material 101, and (3) a second gas supply step of supplying a carbon-free inert gas 108 to eliminate the fluidizing function of the dual-purpose catalyst/fluid material 101.

Figure 33:
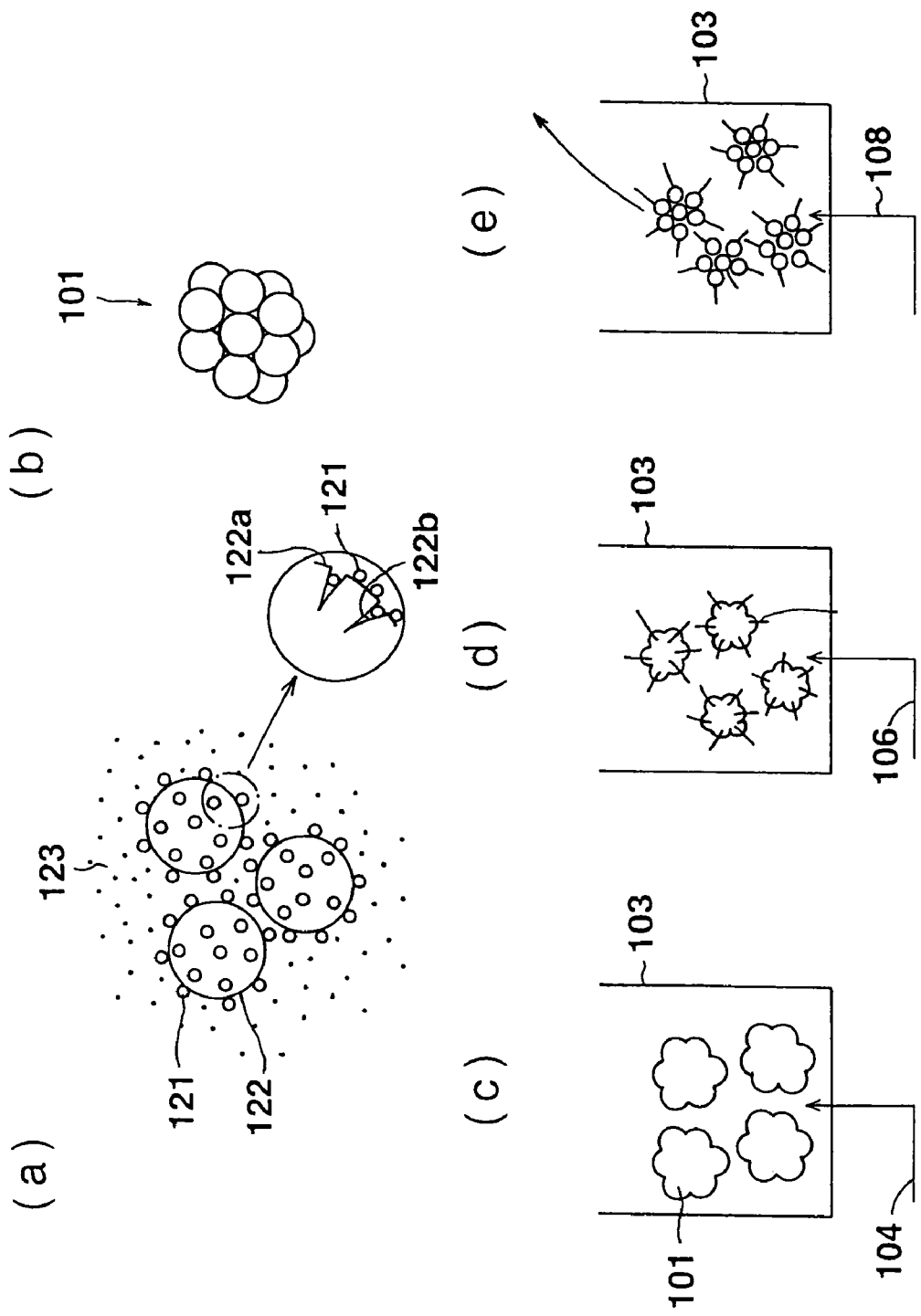
FIGS. 33(a) to 33(e) are schematic views of a method for producing the carbon nano-fibrous rod according to the present invention.

The dual-purpose catalyst/fluid material 101 according to the present invention, as shown in FIGS. 33(a) and 33(b), comprises the carrier 122 supporting the catalyst 121 bound by the binder 123. In FIGS. 33(*c*) to 33(*e*), the dual-purpose catalyst/fluid material 101 is shown by its contour alone.

In the dual-purpose catalyst/fluid material 101, if the catalyst 121 is supported in a finer state on the carrier 122 for its carriage thereon, the fiber diameter of the fibrous nanocarbon 15 can be rendered smaller. Thus, the fine catalyst 121 can be supported on the carrier 122, for example, by controlling conditions, such as the concentration of the nitrate of the catalyst metal, the type of a surface active agent added, and drying conditions.

During the finely dividing step for the catalyst 121 with the use of a reducing gas 104 to be described later, the smaller the particle diameter in the initial stage, the higher the degree of fine division becomes. Thus, the tiny particle size of the catalyst 121 for support on the carrier 122 is important.

For example, if the particle diameter of the catalyst 121 supported initially is 1,000 nm, the fine division gives rise to a particle diameter of 10 nm. If the particle diameter of the catalyst 121 supported initially is 100 nm, the fine division results in a particle diameter of 1 nm.

Then, as shown in FIG. 33(*c*), the resulting dual-purpose catalyst/fluid material 101 is filled into the fluidized bed reactor 103, and $H_2$ or an inert gas containing $H_2$, as the reducing gas 104, is supplied from first gas supply means 105. The supply of the reducing gas 104, such as $H_2$, "metallizes" or converts the catalyst 121 supported on the carrier 122 from the form of nitrate into a metal, and enables the catalyst 121 to perform its function of a catalyst.

Then, as shown in FIG. 33(*d*), the carbon material 106 is supplied in a gaseous state to grow the fibrous nanocarbon 15 on the catalyst 121. At this time, the inert gas 108 is separately introduced into the fluidized bed reactor 103 under predetermined flow conditions.

The carbon material 106 may be any compound containing carbon. Examples are alkanes such as methane, ethane, propane, and hexane; unsaturated organic compounds such as ethylene, propylene, and acetylene; and aromatic compounds such as benzene and toluene, petroleum and coal (including coal-converted gas). However, the present invention is not limited to these materials.

The above-mentioned fibrous nanocarbon 15 forms and grows, starting on the catalyst 121 of the dual-purpose catalyst/fluid material 101. To obtain thinner fibrous nanocarbon 15, therefore, it suffices to render fine the catalyst 121 supported on the carrier 122, in metallizing the catalyst 121 by the reducing action of the reducing gas 104 in the atmosphere, such as hydrogen ($H_2$) or carbon monoxide (CO), in at least one of the first gas supply step, the carbon supply step, and the fibrous nanocarbon generation step.

For example, when the particle diameter of the catalyst 121 in the initial stage is on the order of 100 nm, the catalyst can be broken by fine division to a size on the order of 1 nm. Accordingly, the fiber diameter and the fiber structure of the resulting fibrous nanocarbon 15 can be controlled by regulating various conditions, such as the reducing gas 104 and temperature, in each of the above steps (the first gas supply step, the carbon supply step, and the fibrous nanocarbon generation step).

Then, upon completion of the reaction, the inert gas 108 containing no carbon is supplied, as shown in FIG. 33(*e*), and the interior of the fluidized bed reactor 103 is raised to a higher temperature than the reaction temperature by heating means 102. By this measure, the binder 123 forming the dual-purpose catalyst/fluid material 101 is decomposed by pyrolysis or the like, to decrease the particle diameter of the fluid material 101 and finely divide the fluid material 101, thereby eliminating its function as a fluid material.

The fluid material deprived of its fluid function changes into an agglomerate or binding product of the carrier 122, and takes a finely divided form. This finely divided material is discharged outside, as scattered particles 110, together with the gas G, through the discharge line 111 via the free board portion 103B of the fluidized bed reactor 103, and is recovered by the particle recovery means 112 (see FIG. 32). Then, fibrous nanocarbon 15 is separated from the recovered scattered particles 110, whereby fibrous nanocarbon 15 as a product can be obtained. In the fluidized bed reactor 103, the fibrous nanocarbon 15 generated on the catalyst 121 is separated.

The fibrous nanocarbon 15 can be separated from the catalyst 121 or the carrier 122, for example, by eliminating the catalyst 121 or the carrier 122 at the root portion from which the fibrous nanocarbon 15 grows. An example of this separation is shown in FIG. 34.

Figure 34:
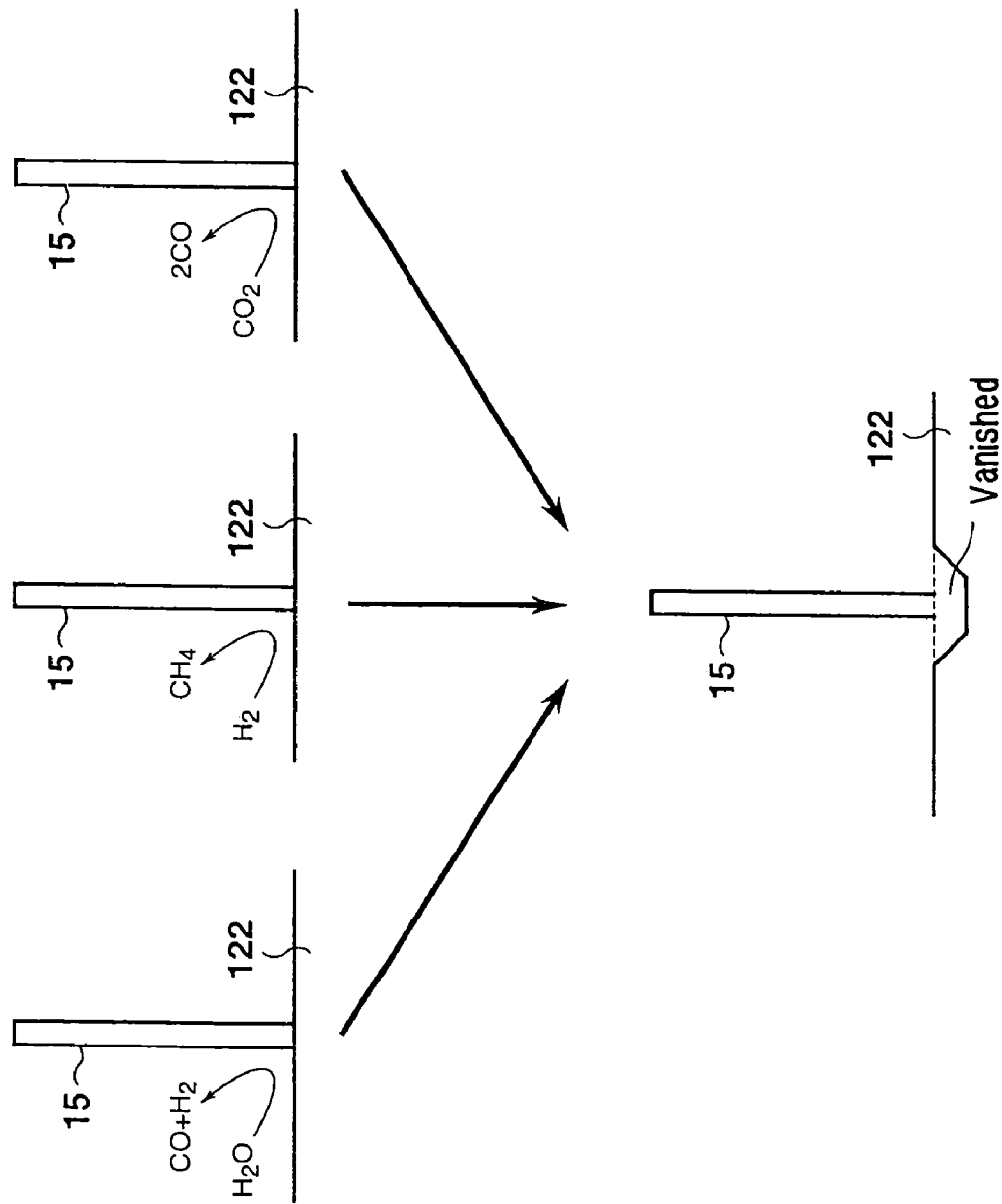
FIG. 34 shows an example of separation of fibrous nanocarbon.

As shown in FIG. 34, the carrier 122 or the like at the root portion of the fibrous nanocarbon 15 is eliminated by gasifying the carrier 122 or the like at the root portion of the fibrous nanocarbon 15 with $H_2$, or supplying steam ($H_2O$) or $CO_2$ as a gasifying agent, or by controlling the temperature for promotion of gasification. By this procedure, the fibrous nanocarbon 15 growing from the catalyst 121 can be separated from the carrier 122, or the unused catalyst 121 remaining on the carrier 122. Such separation can be carried out at least either after recovery from the fluidized bed reactor 103, or during the production within the fluidized bed reactor 103.

The dual-purpose catalyst/fluid material 101 has an average particle diameter of 0.2 to 20 nm so as to be able to perform a satisfactory flowing function within the fluidized bed reactor 103. This is because by setting the average particle diameter of the dual-purpose catalyst/fluid material 101 in the above range, the dual-purpose catalyst/fluid material 101 can be stirred vigorously within the fluidized bed reactor 103, with the result that a uniform site of reaction can be formed.

The dual-purpose catalyst/fluid material 101 can be prepared by a known granulation method (for example, a self-sufficient granulation method such as rotating pan type granulation, rotating drum type granulation, or fluidized bed type granulation, or a forced granulation method such as compression type granulation or extrusion type granulation).

Figure 35:
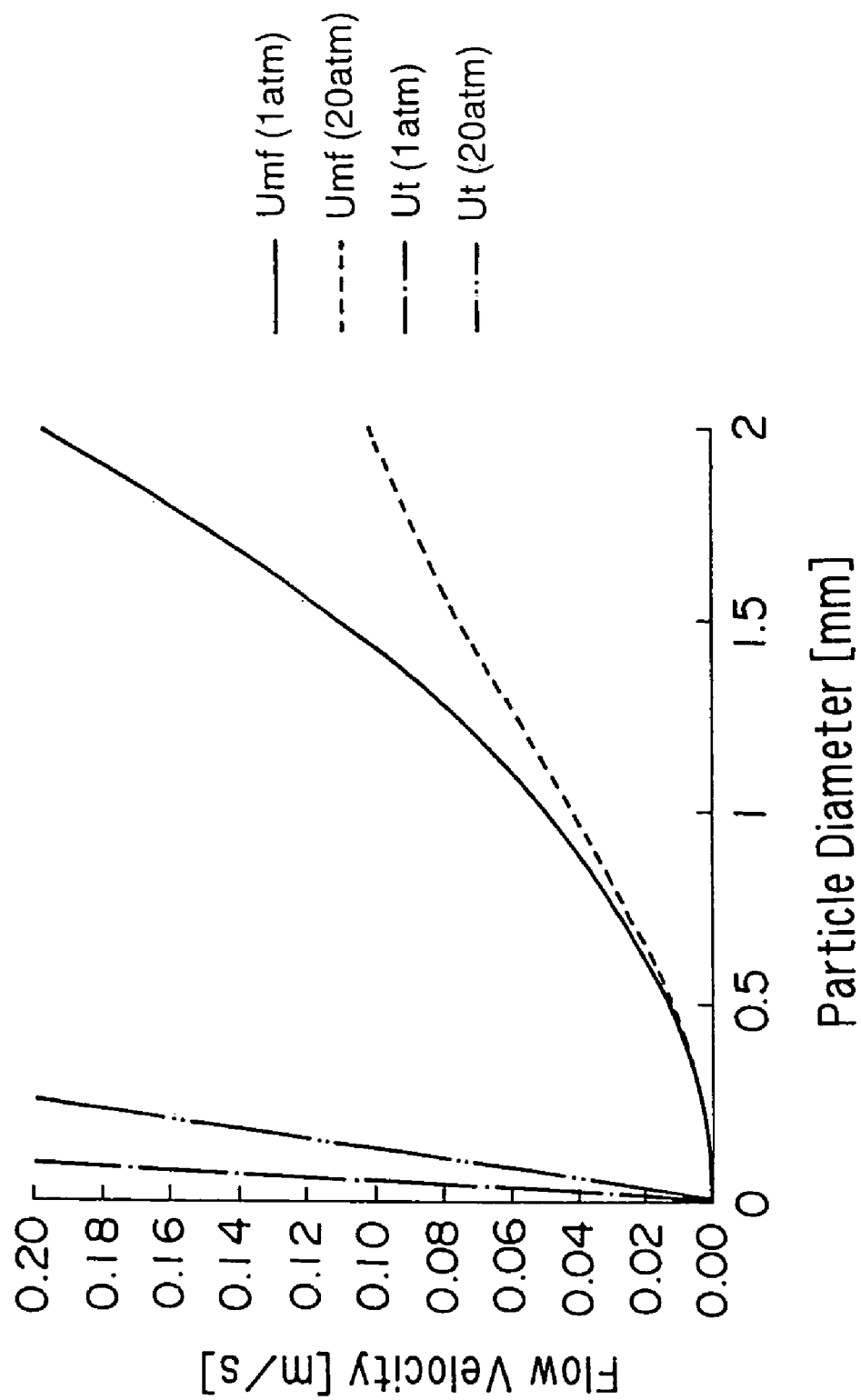
FIG. 35 shows the relationship between particle diameter and flow velocity.
Figure 36:
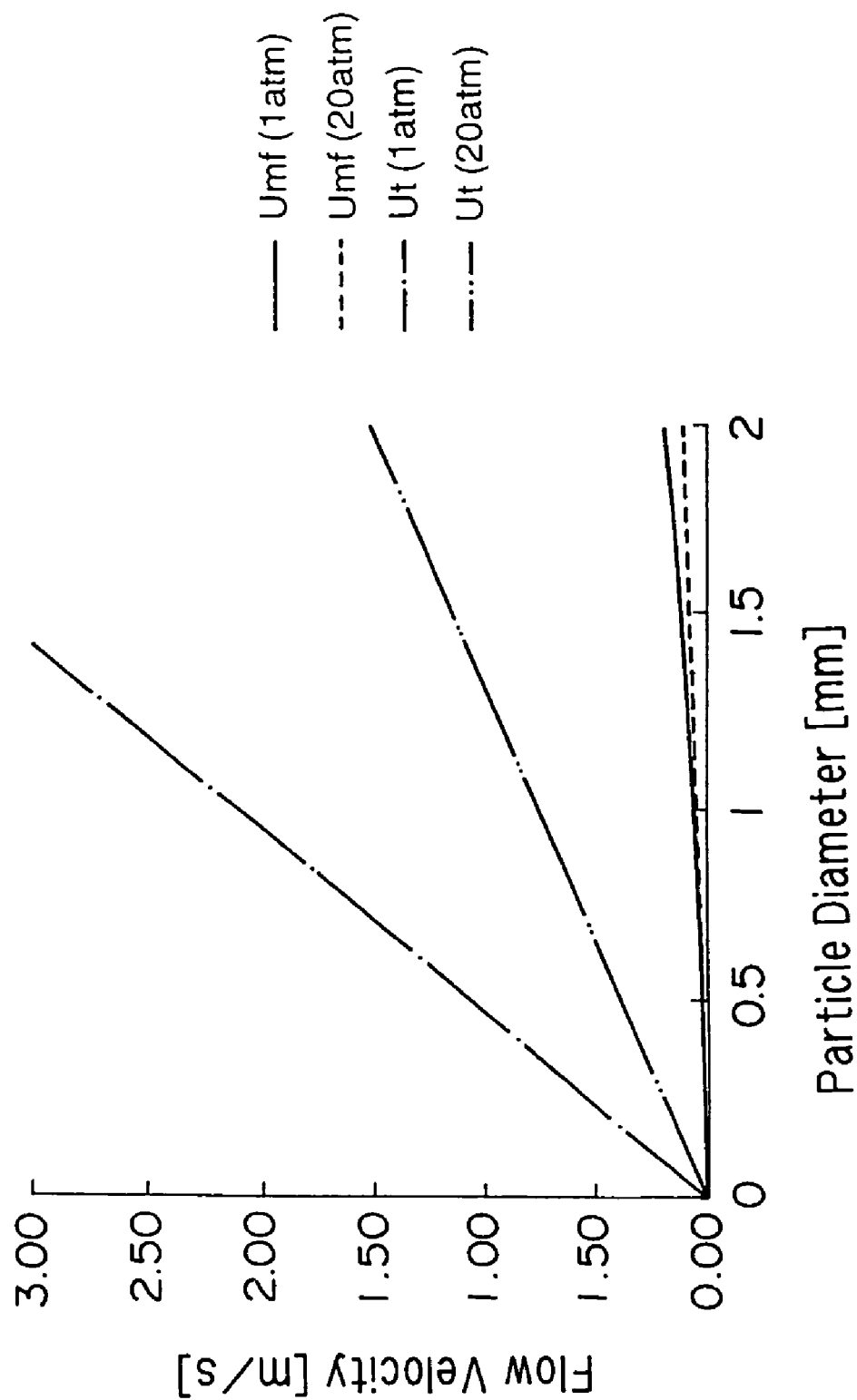
FIG. 36 shows the relationship between the particle diameter and the flow velocity.

The flow velocity within the fluidized bed reactor 103 is preferably 0.02 to 0.2 m/s, if the particle diameter of the dual-purpose catalyst/fluid material 101 is 0.2 mm. This is because, as shown in FIGS. 35 and 36, if the flow velocity is less than 0.02 m/s, the fluidization of the dual-purpose catalyst/fluid material 101 does not occur, and the dual-purpose catalyst/fluid material 101 does not function as a fluidized bed. If the flow velocity exceeds 0.2 m/s, the fluid material 101 scatters outside of the fluidized bed reactor 103, and the reaction time cannot be controlled. These events are undesirable.

The superficial velocity of the fluidized bed may be set by selecting different optimum values from within the range of 2 to 8 times the fluidization start velocity (Umf) of a fluid medium used, depending on the conditions such as the raw material, additives, etc. used. That is, the superficial velocity is set at a gas flow velocity of 2 to 8 times as high as the fluidization start velocity. This superficial velocity is maintained constantly at the selected optimum value, mainly, by controlling the amount of gas supplied from the inert gas supply means.

Within the fluidized bed reactor 103, the temperature of the contact reaction between the catalyst 121 of the dual-purpose catalyst/fluid material 101 and the carbon material 106 is preferably 300 to 1,300° C., and the pressure is preferably 0.1 to 25 atmospheres. This is because if the above temperature and pressure are outside the above ranges, a satisfactory fibrous nanocarbon 15 cannot be produced.

In the reaction, the carbon material 106 is brought into contact with the catalyst 121 of the dual-purpose catalyst/fluid material 101 for a certain period of time in the reducing gas 104 under a hydrogen partial pressure of 0 to 90%, whereby the fibrous nanocarbon 15 is obtained. The supply of $H_2$ in this reaction is intended for promoting the growth of the fibrous nanocarbon 15 on the catalyst 121 of the dual-purpose catalyst/fluid material 101. As a source of $H_2$, the hydrogen in the carbon material 106 can be utilized.

In each of the first reducing gas supply step, the carbon material supply step, and the second gas supply step, the conditions, such as temperature, pressure, time, and gas atmosphere, may be controlled independently of each other. Concretely, when the reduction and fine division of the catalyst 121 are to be performed in the first reducing gas supply step, the temperature may be rendered lower than in the manufacturing conditions for the fibrous nanocarbon 15 in the carbon material supply step.

The dual-purpose catalyst/fluid material 101 is composed of a product formed by supporting the catalyst 121 on the surface of the carrier 122, or an agglomerate of the products, as shown in FIG. 33(a). This carrier 122 has a particle diameter on the order of 40 nm, but this is not restrictive. The agglomerate refers to a material formed from several of the carriers 122 self-agglomerated to an average particle diameter on the order of 100 to 200 nm.

The material for the carrier 122 includes, for example, carbon black (CB), alumina ($Al_2O_3$), silica (Si) silica sand ($SiO_2$), and aluminosilicate. However, these materials are not restrictive, and any material having the function of supporting the catalyst 121 is acceptable.

The above carrier 122 preferably has an average particle diameter of 200 µm or less. The carrier 122 having the catalyst 121 supported on the surface, or the agglomerate of the carriers 122 is formed into a binding product by use of the binder 123, whereby the dual-purpose catalyst/fluid material 101 having an average particle diameter of 0.2 to 20 mm is prepared.

The catalyst 121 includes, for example, Fe, Ni, Co, Cu and Mo, or a mixture of at least two of these metals, but the present invention is not limited to them. For example, if Fe is used as the catalyst 121 and carbon black is used as the carrier 122, it is recommendable to charge the carbon black into an aqueous solution of iron nitrate or iron acetate, thereby supporting Fe on the surface of the carbon black. As a result, the catalyst 121 is supported on the surface 122a or in pores 122b of the carrier 122, as indicated in the enlarged view of FIG. 33(a).

A polymer-based adhesive, an inorganic adhesive, or other material having a binding action, for example, can be used as the above binder 123.

As the polymer-based adhesive, it is preferred to use, for example, a binder comprising a thermosetting polymeric material, such as phenolic resin (maximum operating temperature: ~360° C.), urea resin (maximum operating temperature: ~288° C.), epoxy resin (maximum operating temperature: ~288° C.), or polyimide resin (maximum operating temperature: ~349° C.). This is because, as will be described later, the carbon material 106 is supplied at a high temperature (300° C. or higher) within the fluidized bed reactor 103 to produce fibrous nanocarbon 15, so that refluidization (melting) in the high temperature condition can be suppressed.

$SiO_2$ and $Al_2O_3$, for example, can be used as the inorganic adhesive, but the present invention is not limited to them.

Tars and heavy oil, for example, can be used as other binding materials having a binding action, but the present invention is not limited to them.

In the present invention, as will be shown in the Examples described later, fibrous nanocarbon 15 is produced at a temperature on the order of 480° C., and then the inert gas 108 containing no carbon is supplied. The system is heated in a stroke to about 800° C. by the heating means 102 to decompose the binder 123 thermally and finely divide the dual-purpose catalyst/fluid material 101 until it is restored to the carrier 122.

Thermal decomposition is considered to proceed to some degree under the 480° C. conditions, but actually caulking as well as thermal decomposition takes place under the oxygen-free conditions, and sintering of carbon may proceed. In this case, as stated earlier, it is recommendable to perform gasification with $H_2$ at 800° C. or higher, or burning in an environment where fibrous nanocarbon 15 is not burned.

The tars can be gasified and removed using $H_2$ or CO at a temperature of 800° C. or higher.

Figure 37:
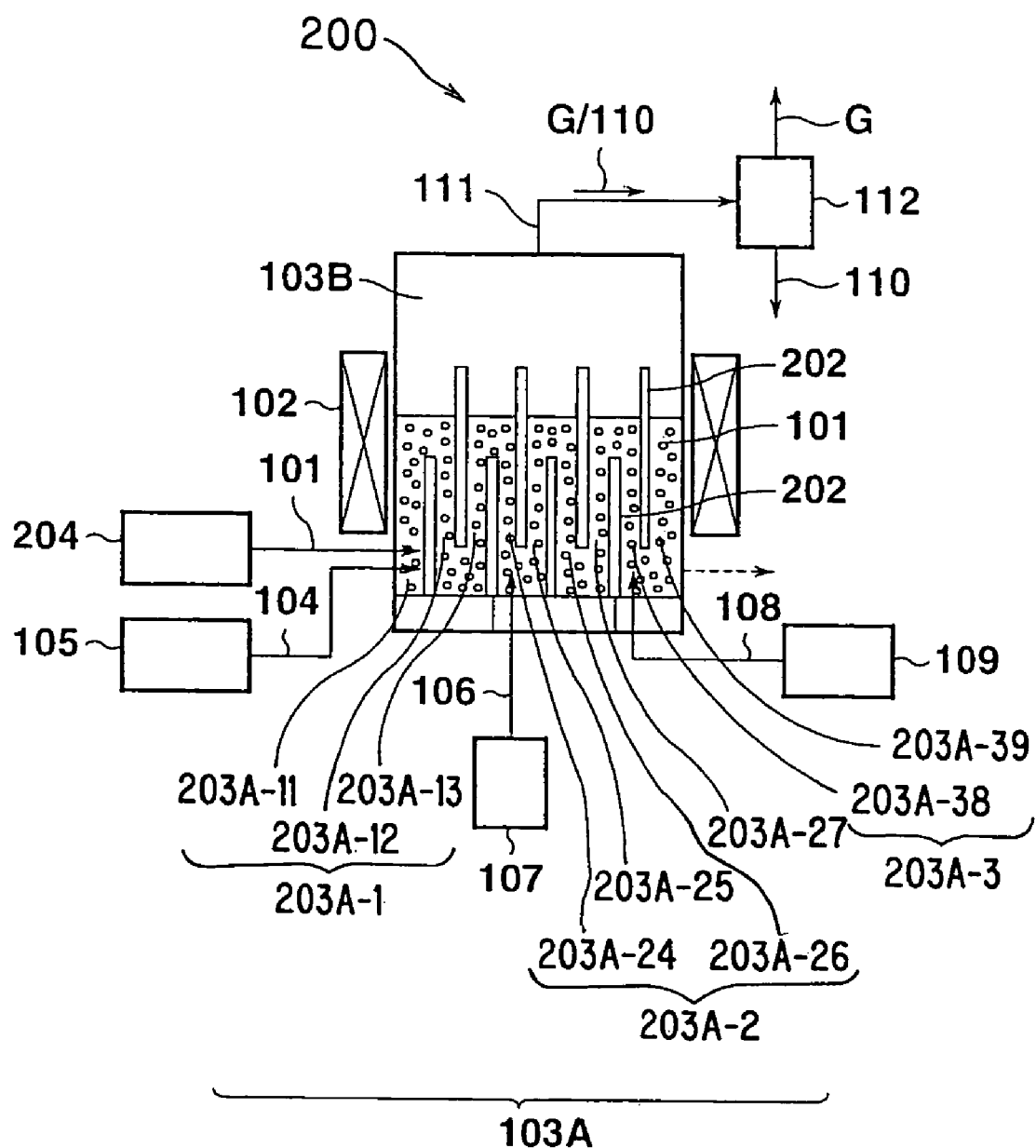
FIG. 37 is a schematic view of a second embodiment of an apparatus for producing a carbon nano-fibrous rod according to the present invention.

FIG. 37 is a diagrammatic view of a second embodiment of the apparatus for producing fibrous nanocarbon. As shown in FIG. 37, an apparatus 200 for producing fibrous nanocarbon according to the present embodiment is the apparatus of FIG. 1 modified so that the fluid material 101 can become fluid continuously. That is, the interior of the fluidized bed portion 103A of the fluidized bed reactor 103 is divided into three parts to form a first flow chamber 203A-1, a second flow chamber 203A-2, and a third flow chamber 203A-3. The first flow chamber 203A-1 is provided with a first gas supply means 105 for supplying a reducing gas 104, the second flow chamber 203A-2 is provided with a carbon material supply means 107 for supplying a carbon material 106, and the third flow chamber 203A-3 is provided with a second gas supply means 109 for supplying a carbon-free inert gas 108.

The same members as those in the first embodiment will be assigned the same numerals as in the first embodiment, and their explanations will be omitted.

In the present embodiment, a plurality of partition plates 202 are provided within the fluidized bed reactor 103 in such a manner as to suspend downward and rise upward alternately in a vertical axis direction, thereby dividing the interior while forming a fluidized bed. In the drawing, a first room 203A-11, a second room 203A-12 and a third room 203A-13 are located in this order from the left to constitute the first flow chamber 201A-1; a fourth room 203A-24, a fifth room 203A-25, a sixth room 203A-26 and a seventh room 203A-27 are located in this order to constitute the second flow chamber 203A-2; and an eighth room 203A-38 and a ninth room 203A-39 are located in this order to constitute the third flow chamber 203A-3. However, the present invention is not limited to this arrangement. The free board portion 103B is common to the first, second and third flow chambers.

In the present embodiment, a fluid material supply means 204 for supplying a dual-purpose catalyst/fluid material 101 to the first flow chamber 203A-1 is provided to supply the dual-purpose catalyst/fluid material 101 successively. By this contrivance, continuous production can be performed.

For example, if the reaction is performed for 9 hours in throughout the fluidized bed reactor 103, the positions of the partition plates 202 and the capacities of the respective chambers are adjusted so that 7 hours of dwelling in the first flow chamber 203A-1, 1 hour of dwelling in the second flow chamber 203A-2, and 1 hour of dwelling in the third flow chamber 203A-3 can be carried out. By so doing, the dual-purpose catalyst/fluid material 101 can be made to dwell in each chamber for an arbitrary period of time.

In the first flow chamber 203A-1, the reducing gas 106 is supplied to perform the catalytic function of the dual-purpose catalyst/fluid material 101. In the second flow chamber 203A-2, the carbon material gas 106 is supplied and brought into contact with the dual-purpose catalyst/fluid material 101 performing the catalytic function to produce fibrous nanocarbon 15 with good efficiency. In the third flow chamber 203A-3, the carbon-free inert gas 108 is supplied and a higher temperature than the reaction temperature is achieved to eliminate the catalytic function of the dual-purpose catalyst/fluid material 101 and finely divide this material 101, thereby scattering it as scattered particles 110 with a particle diameter of 40 to 100 nm, along with a gas G, for the purpose of recovery. The dual-purpose catalyst/fluid material 101, which does not scatter, is separately recovered by a recovery means.

As another example of the present embodiment, it is possible to provide a fluidized bed reactor having a fluidized bed portion constituted from the first flow chamber and the second flow chamber, and a fluidized bed reactor having a fluidized bed portion constituted from the third flow chamber.

Figure 38:
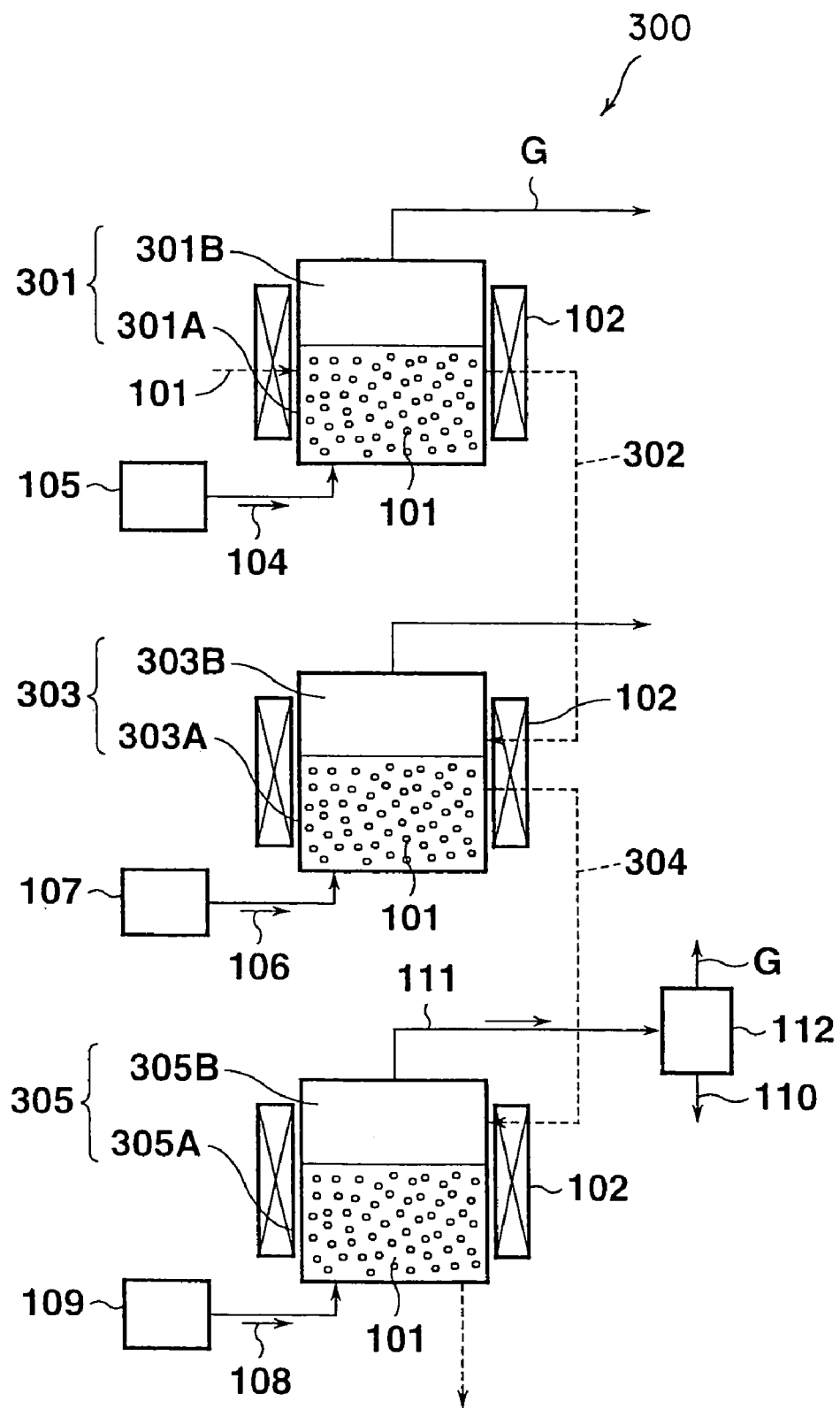
FIG. 38 is a schematic view of a third embodiment of an apparatus for producing a carbon nano-fibrous rod according to the present invention.

FIG. 38 is a schematic view of a third embodiment of the apparatus for producing fibrous nanocarbon. In the present embodiment, as shown in FIG. 38, fluidized bed reactors 103 are configured as having independent functions, thus making continuous production possible.

As shown in FIG. 38, an apparatus 300 for producing fibrous nanocarbon according to the present embodiment is an apparatus for producing fibrous nanocarbon 15 by reacting a carbon material 106 in high temperature fluidized beds with the use of a catalyst. This apparatus 300 comprises a first fluidized bed reactor 301 charged with a dual-purpose catalyst/fluid material 101, equipped with a heating means 102 for heating the interior, and having a first gas supply means 105 for supplying a reducing gas ($H_2$ or CO) 104; a second fluidized bed reactor 303 having a transport means 302 for transporting the dual-purpose catalyst/fluid material 101 from the first fluidized bed reactor 301, and also having a carbon material supply means 107 for supplying the carbon material 106, which is brought into contact with the dual-purpose catalyst/fluid material 101 for generating the fibrous nanocarbon 15, in a gaseous state into the fluidized bed reactor 303; a third fluidized bed reactor 305 having a transport means 304 for transporting a reaction product and the fluid material from the second fluidized bed reactor 303, and also having a second gas supply means 109 for supplying a carbon-free inert gas 108 into the fluidized bed reactor 305; and a discharge line 111 for discharging a gas G and scattered particles 110 from the third fluidized bed reactor 305.

The first fluidized bed reactor 301, the second fluidized bed reactor 303, and the third fluidized bed reactor 305, respectively, have fluidized bed portions 301A, 303A and 305A, and free board portions 301B, 303B and 305B, similar to the first embodiment.

In the first fluidized bed reactor 301, the reducing gas 106 is supplied to perform the catalytic function of the dual-purpose catalyst/fluid material 101. Then, the dual-purpose catalyst/fluid material 101 is supplied to the second fluidized bed reactor 303 by the transport means 302 using airflow transport or the like. In the second fluidized bed reactor 303, the carbon material gas 106 is supplied and brought into contact with the dual-purpose catalyst/fluid material 101 performing the catalytic function to produce fibrous nanocarbon 15 with good efficiency. Then, the dual-purpose catalyst/fluid material 101 is supplied to the third fluidized bed reactor 305 by the transport means 304 using airflow transport or the like. In the third fluidized bed reactor 305, the carbon-free inert gas 108 is supplied and a higher temperature than the reaction temperature is achieved to eliminate the catalytic function of the dual-purpose catalyst/fluid material 101 and finely divide this material 101, thereby scattering it as scattered particles 110 with a particle diameter of 40 to 100 nm, along with a gas G, for the purpose of recovery. By this procedure, fibrous nanocarbon 15 can be produced continuously. The dual-purpose catalyst/fluid material 101, which does not scatter, is separately recovered by a recovery means.

As the transport means 302 and 304, not only means using the above-mentioned airflow transport or the like, but also means relying on feeding transport using a feeder can be named. However, these means are not restrictive, and any means capable of transporting the fluid material 101 or the like can be employed.

The volumes inside the reactors 301, 303 and 305 may be changed according to the dwell time of the fluid material 101 within the reactors 301, 303 and 305. For example, if the average dwell time is set to be 7 hours for the first fluidized bed reactor 301 and 1 hour for each of the second fluidized bed reactor 303 and the third fluidized bed reactor 305, the volume of the first fluidized bed reactor 301 is set at 7 times the volume of each of the second and third fluidized bed reactors 303, 305, whereby the reaction conditions can be adjusted.

Moreover, the first to third fluidized bed reactors 301, 303, 305 can be configured to have the same volume, and 7 of the first fluidized bed reactors 301 can be connected together in series.

Furthermore, a plurality of the first fluidized bed reactors 301 can be provided, where necessary, to adjust the throughput. Similarly, a plurality of the second fluidized bed reactors 303 can be provided, where necessary, to adjust the throughput. Likewise, a plurality of the third fluidized bed reactors 305 can be provided, where necessary, to adjust the throughput.

Figure 39:
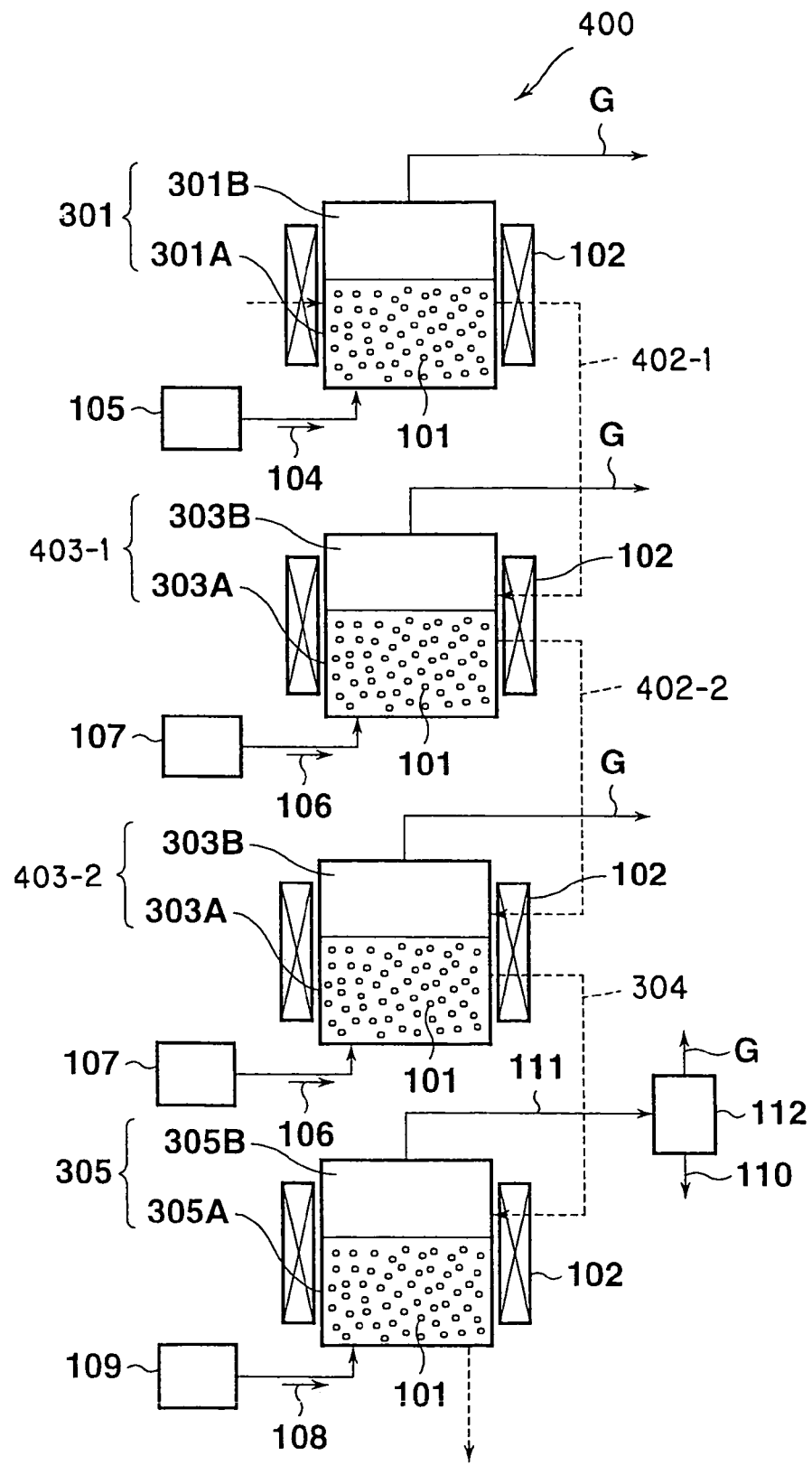
FIG. 39 is a schematic view of a fourth embodiment of an apparatus for producing a carbon nano-fibrous rod according to the present invention.

FIG. 39 is a schematic view of a fourth embodiment of the apparatus for producing fibrous nanocarbon. As shown in FIG. 39, the present embodiment is the third embodiment in which two of the second fluidized bed reactors 303 are provided to permit production under different reaction conditions.

As shown in FIG. 39, an apparatus 400 for producing fibrous nanocarbon according to the present embodiment is an apparatus for producing fibrous nanocarbon 15 by reacting a carbon material 106 in high temperature fluidized beds with the use of a catalyst. This apparatus 400 comprises a first fluidized bed reactor 301 charged with a dual-purpose catalyst/fluid material 101, equipped with a heating means 102 for heating the interior, and having a first gas supply means 105 for supplying a reducing gas ($H_2$ or CO) 104 inside; a first-stage second fluidized bed reactor 403-1 having a transport means 402-1 for transporting the dual-purpose catalyst/fluid material 101 from the first fluidized bed reactor 301, and also having a carbon material supply means 107 for supplying the carbon material 106, which is brought into contact with the dual-purpose catalyst/fluid material 101 for generating the fibrous nanocarbon 15, in a gaseous state into the interior; a second-stage second fluidized bed reactor 403-2 having a transport means 402-2 for transporting the dual-purpose catalyst/fluid material 101 from the first-stage second fluidized bed reactor 403-1, and also having a carbon material supply means 107 for supplying the carbon material 106, which is brought into contact with the dual-purpose catalyst/fluid material 101 for generating the fibrous nanocarbon 15, in a gaseous state into the interior; a third fluidized bed reactor 305 having a transport means 304 for transporting a reaction product and the fluid material from the second-stage second fluidized bed reactor 403-2, and also having a second gas supply means 109 for supplying a carbon-free inert gas 108 into the interior; and a discharge line 111 for discharging a gas G and scattered particles 110 from the third fluidized bed reactor 305.

Figure 40:
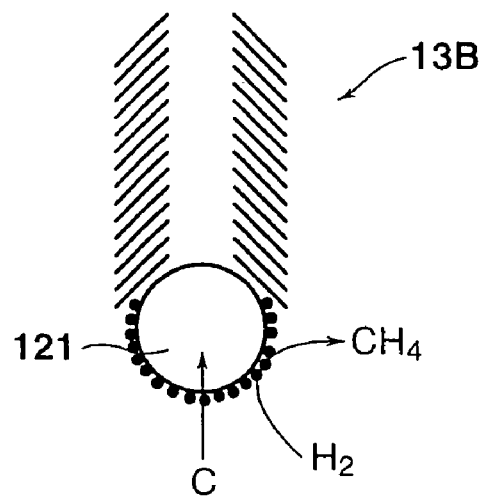
FIG. 40 is a schematic diagram of a carbon nano-fibrous rod.
Figure 41:
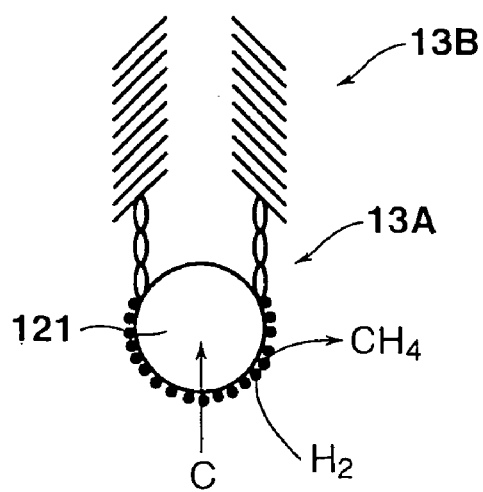
FIG. 41 is a schematic diagram of a carbon nano-fibrous rod.

For example, the temperature conditions of the heating means 102 of the second-stage second fluidized bed reactor 403-2 are changed (for example, the temperature is rendered 100° C. higher) in comparison with the temperature conditions of the heating means 102 of the first-stage second fluidized bed reactor 403-1. By so doing, the reaction temperature is made 480° C. within the first-stage second fluidized bed reactor 403-1, for example, whereby a carbon nano-fibrous rod cluster 13B of a feather structure is grown on the catalyst 121 of the dual-purpose catalyst/fluid material 101 (see FIG. 40). Then, the reaction temperature is made 630° C. within the second-stage second fluidized bed reactor 403-2, whereby a composite comprising a carbon nano-fibrous rod cluster 13A of a tubular structure grown below the carbon nano-fibrous rod cluster 13B of the feather structure can be produced (see FIG. 41).

Figure 42:
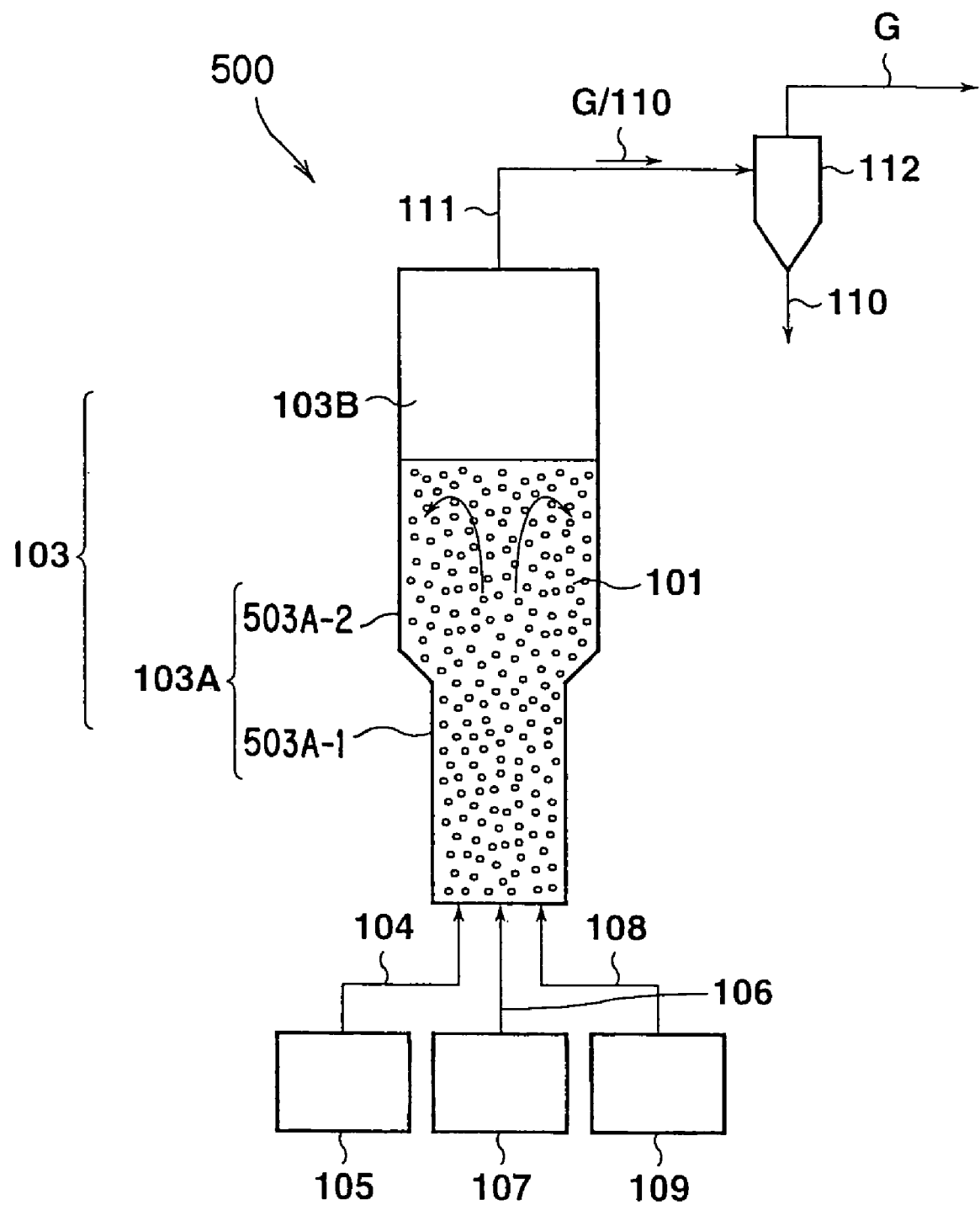
FIG. 42 is a schematic view of a fifth embodiment of an apparatus for producing a carbon nano-fibrous rod according to the present invention.

FIG. 42 is a diagrammatic view of a fifth embodiment of the apparatus for producing fibrous nanocarbon. In an apparatus 500 for producing fibrous nanocarbon according to the present embodiment, as shown in FIG. 42, a fluidized bed portion 103A of a fluidized bed reactor 103 is constructed of a high-velocity side fluidized bed portion 503A-1 and a low-velocity side fluidized bed portion 503A-2. In a second gas supply step after production of fibrous nanocarbon 15, a dual-purpose catalyst/fluid material 101 is vigorously stirred within the high-velocity side fluidized bed portion 503A-1 to promote the fine division of the fluid material 101 due to wear and the fine division of the fluid material 101 due to a decrease in the binding force of the binder 123.

In particular, if the particle diameter of the dual-purpose catalyst/fluid material 101 is set at 0.5 mm, for example, and the flow velocity in the upper low-velocity side fluidized bed portion 503A-2 of the fluidized bed portion 103A is controlled to a value on the order of 0.1 m/s for prevention of scattering, while the flow velocity in the lower high-velocity side fluidized bed portion 503A-1 of the fluidized bed portion 103A is set to be a value on the order of 0.2 to 1.0 m/s, the dual-purpose catalyst/fluid material 101 is thereby vigorously stirred to achieve the fine division of the fluid material 101 due to wear.

Figure 43:
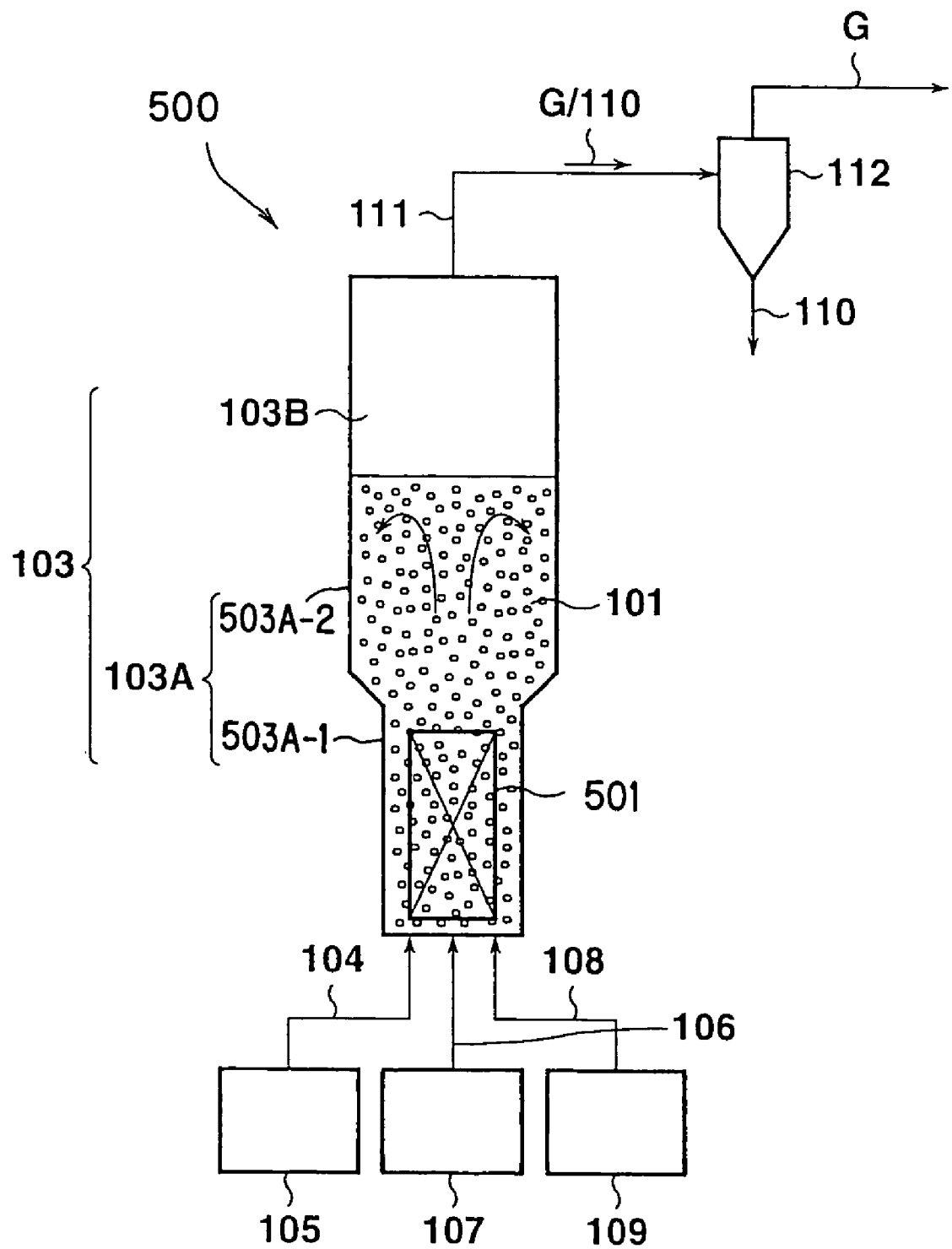
FIG. 43 is a schematic view of the fifth embodiment of an apparatus for producing a carbon nano-fibrous rod according to the present invention.

As shown in FIG. 43, moreover, a collision member 501 can be disposed within the high-velocity side fluidized bed portion 503A-1, so as to cause the dual-purpose catalyst/fluid material 101 to forcibly collide with the collision member 501 to further promote the fine division.

Figure 44:
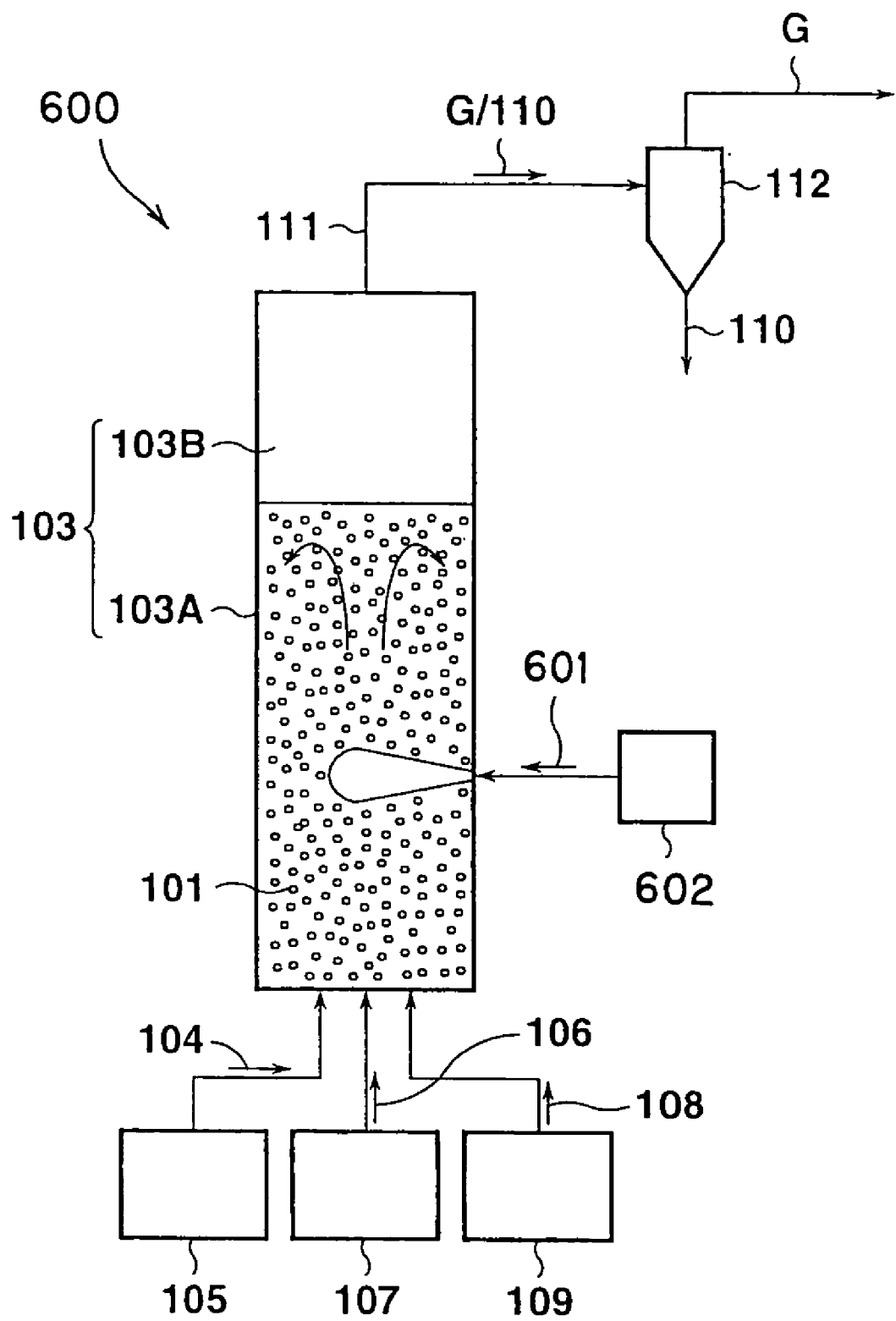
FIG. 44 is a schematic view of a sixth embodiment of an apparatus for producing a carbon nano-fibrous rod according to the present invention.

FIG. 44 is a diagrammatic view of a sixth embodiment of the apparatus for producing fibrous nanocarbon. In an apparatus 600 for producing fibrous nanocarbon according to the present embodiment, as shown in FIG. 44, a high velocity gas blowing means 602 is provided for blowing a high velocity gas 601 into a fluidized bed reactor 103 through a side wall of the reactor 103. In a second gas supply step after production of fibrous nanocarbon 15, a dual-purpose catalyst/fluid material 101 is vigorously stirred by the high velocity gas 601 blown in, thereby promoting the fine division of the fluid material 101 due to wear and due to a decrease in the binding force of the binder 123.

In particular, an $N_2$ gas or an inert gas, as the high velocity gas 601, is blown in from the high velocity gas blowing means 602 at a flow velocity of 10 m/s, and thereby the dual-purpose catalyst/fluid material 101 is vigorously stirred to achieve the fine division of the fluid material 101 due to wear.

Figure 45:
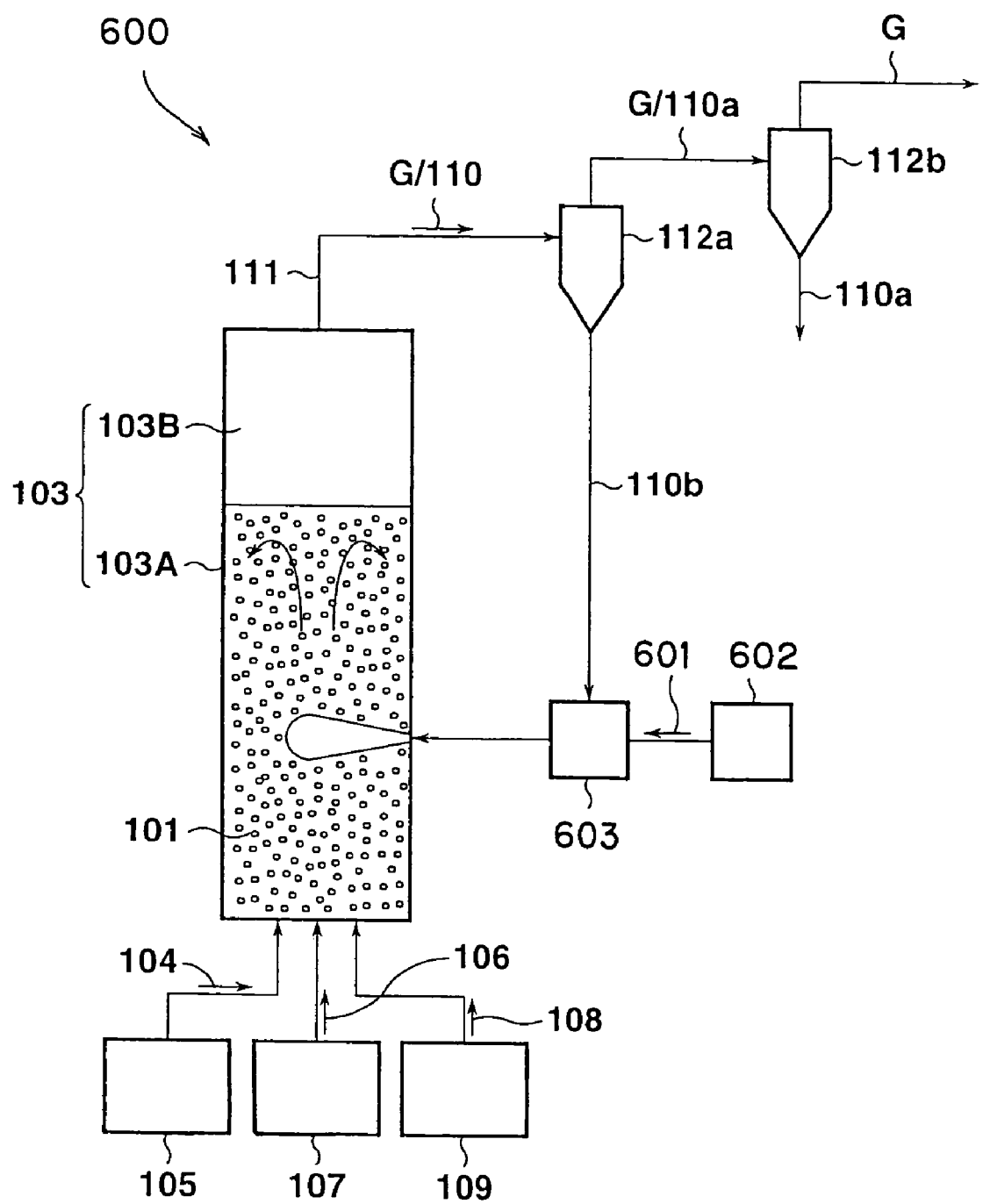
FIG. 45 is a schematic view of the sixth embodiment of an apparatus for producing a carbon nano-fibrous rod according to the present invention.
Figure 49:
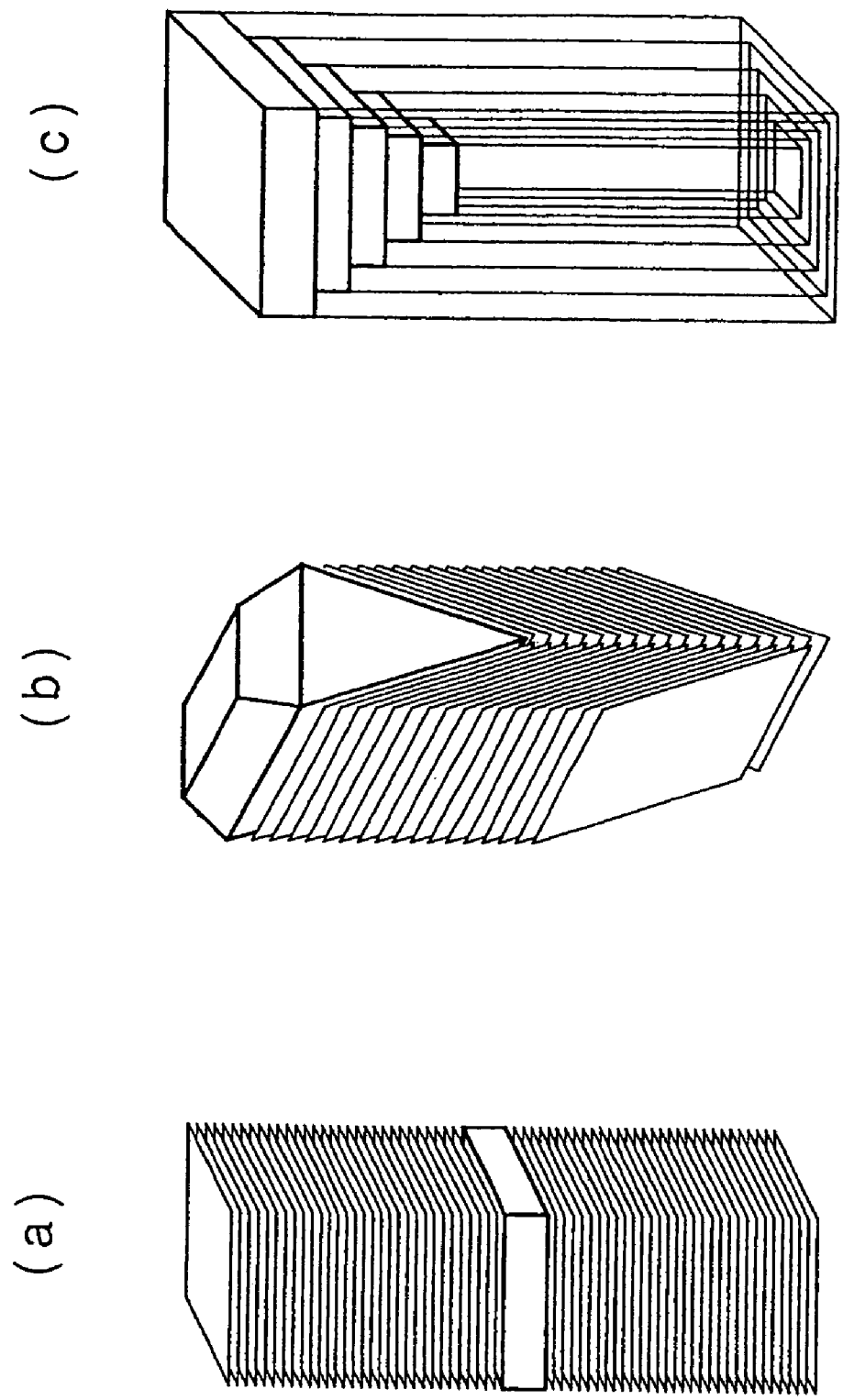
FIGS. 49(a) to 49(c) are model drawings of conventional nanofibers.
Figure 50:
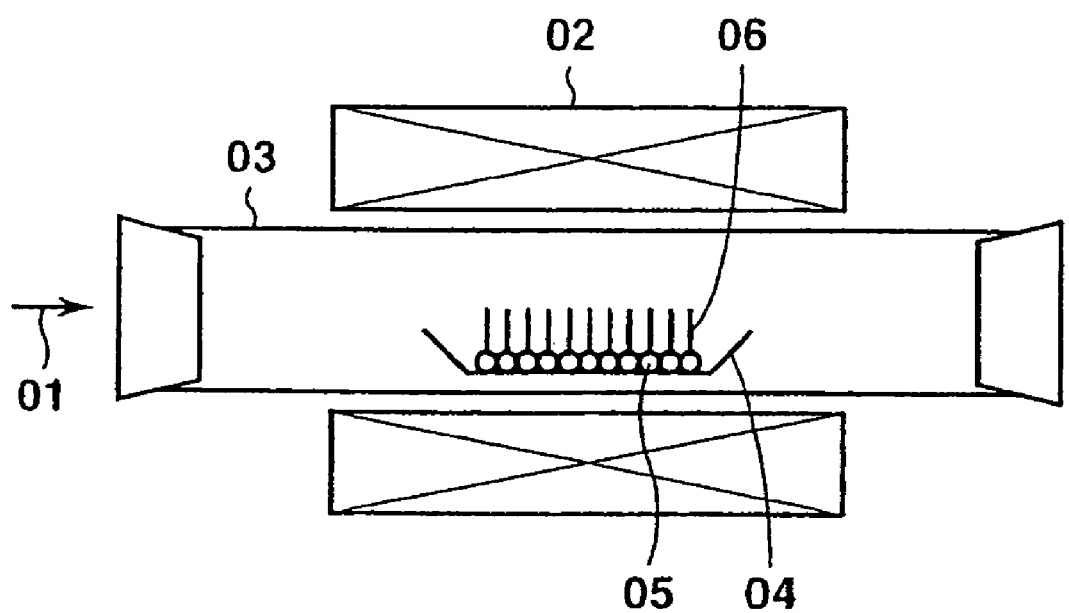
FIG. 50 is an explanation drawing of a conventional basic reactor.
Figure 51:
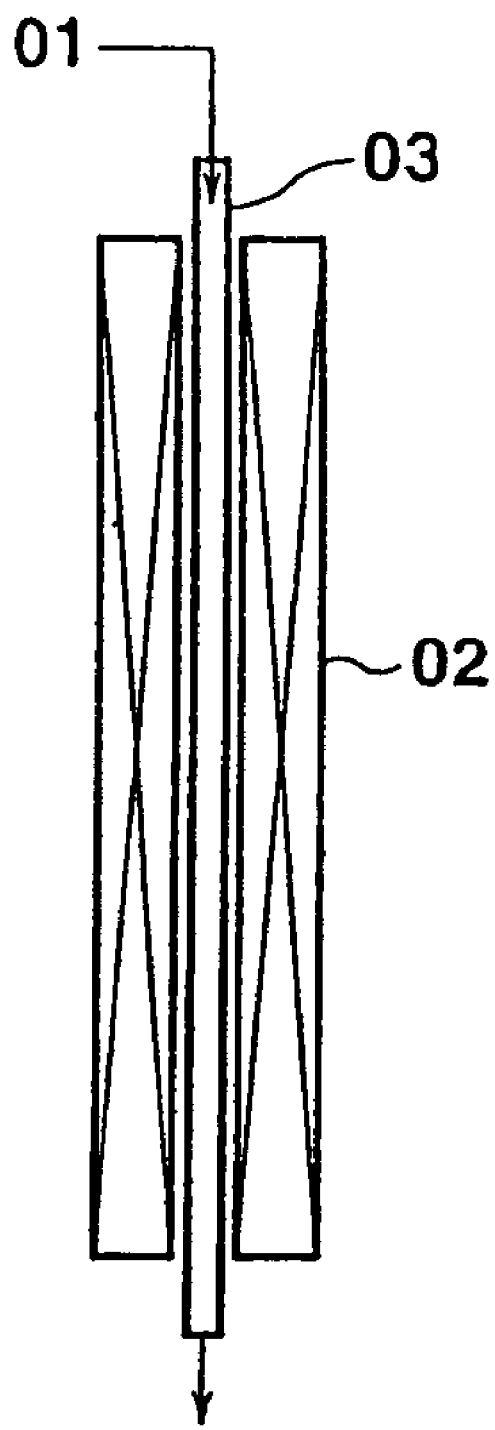
FIG. 51 is an explanation drawing of a conventional vapor phase flow process.

As shown in FIG. 45, moreover, when coarse scattered particles 110b separated by a particle recovery means 112a are supplied back into the fluidized bed reactor 103, these coarse scattered particles 110b are mixed with a high velocity gas 601 in a mixing means 603, and blown into the reactor 103 while entrained in the high velocity gas 601. By this measure, a physical destructive force is increased, making it possible to promote the fine division of the dual-purpose catalyst/fluid material 101 due to wear and due to a decrease in the binding force of the binder 123. At this time, the fine scattered particles 110a containing the fibrous nanocarbon 15 can be separated by a separating means 112b located downstream for purposes of recovery.

That is, the fifth and sixth embodiments are designed to form a high flow velocity zone locally in the dual-purpose catalyst/fluid material 101 within the fluidized bed reactor 103 in the second gas supply step. This procedure results in a mutual collision of the fluid material 101, and a collision between the fluid material 101 and the wall surface of the reactor 103 or the collision member 503. Alternatively, blowing-in of the high velocity gas 601 is carried out. As a result, fine division of the dual-purpose catalyst/fluid material 101 due to wear and breakage is promoted to increase the efficiency of recovery of the fibrous nanocarbon 15.

The resulting fibrous nanocarbon 15 is preferably used for various composite materials, gas adsorbing materials, and bio-materials, such as transparent conductive materials (conductive ink, conductive film, conductive plastic), ITO substitutes, transparent electromagnetic wave shielding materials, antistatic materials (solar cell, mirror, etc.), transparent ultra-violet ray shielding materials (for example, for cosmetic use, for vehicle glass coating use, etc.), high grade electric/heat conductive materials (rolls of printer, facsimile, etc.), high grade electrically conductive and heat dissipating devices, ceramic mixing materials, carbon/carbon composites, conductive materials of batteries, gas adsorbing or occluding materials for methane, etc., hydrogen occluding materials, hydrogen separating materials, separators for butane, capacitor electrode materials, electric demineralization electrode materials, seawater decomposing (electrolytic cell) oxygen electrode materials, battery materials (lithium secondary battery, NaS battery, air secondary battery, and long life alkaline battery conductive materials), FED materials, nano-lithography semiconductors, lead wires, MLUDI (gene search, diagnostic materials), nano-brain wave probes, biocompatible materials, high selectivity catalyst carriers, high activity catalyst carriers, graphite catalyst substitutes, high activity catalyst carriers (for example, for Pt, Pt—Rh), thin film separators, air pollutant (SOx, NOx, ozone) adsorbents, water pollutant adsorbents, electrode materials for demineralization purification, various gas sensors, and conductive paper.

According to the present invention, therefore, the dual-purpose catalyst/fluid material comprising the metal catalyst-supporting carrier bound via the binder is used as a fluid material, and there are provided the first gas supply step of supplying the reducing gas, the carbon material supply step of supplying the carbon material in a gaseous state to produce a carbon nano-fibrous rod in the presence of the catalyst of the dual-purpose catalyst/fluid material, and the second gas supply step of supplying the carbon-free inert gas to eliminate the fluidizing function of the dual-purpose catalyst/fluid material. Thus, the catalyst is uniformly present in the fluidized bed. As a result, the efficiency of contact of the catalyst with the raw material is satisfactory, and a uniform reaction can be performed. In recovering the fibrous nanocarbon growing on the catalyst, the fluid material concurrently serving the catalytic function is divided into fine pieces until converted into its constitutional units or its aggregates. By this procedure, the efficiency of separation of the fibrous nanocarbon growing on each catalyst can be increased, and a catalyst with uniform properties can be easily obtained.

EXAMPLES

Carbon Nano-Fibrous Rod and Fibrous Nanocarbon

Preferred examples of the carbon nano-fibrous rod and fibrous nanocarbon according to the present invention will be described below, but the present invention is in no way limited to these examples:

Example 1

Example 1 is fibrous nanocarbon of a columnar structure.

An iron catalyst was prepared by the precipitation method (Best, R. J., Russell, W. W., J. Amer. Soc. 76, 838 (1954), Sinfelt, J. H., Carter, J. L., and Yates, D. J. C., J. Catal. 24, 283 (1972)) with the use of iron nitrate.

In particular, 29.54 g of iron nitrate ($FeNO_3.9H_2O$: a first class grade chemical, Wako Pure Chemical Industries) was added to 200 ml of pure water in order to prepare 4 g of an iron catalyst, and the mixture was slowly stirred to prepare a solution. To the solution, ammonium hydrogen carbonate ($NH_4HCO_3$, a first class grade chemical, Junsei Yakuhin Kogyo) was added with stirring until a precipitate ($FeCO_3.xH_2O$) was formed. Then, the precipitate was filtered off, and purified with pure water until ammonium hydrogen carbonate vanished. The purified precipitate was vacuum dried (for 8 hours at 80° C.), and then heat-treated (for 5 hours at 450° C.) in an air atmosphere with the use of a horizontal Tanmann-furnace to obtain $Fe_2O_3$.

The resulting $Fe_2O_3$ was placed on an alumina boat (length 10 mm, width 2.5 mm, depth 1.5 mm (external values)), and was reduced (for 48 hours at 480° C.) in an alumina tube (internal diameter 10 cm), with a gas mixture of hydrogen and helium (hydrogen partial pressure: 10%) being flowed therethrough at 100 sccm, thereby obtaining 4.02 g of an iron catalyst.

Then, 50 mg of the iron catalyst prepared by the above-described method was placed on a quartz boat (length 10 mm, width 2.5 mm, depth 1.5 mm (external values)), and was reduced (for 2 hours at 500° C.) in a quartz tube (internal diameter 4.5 cm), with a gas mixture of hydrogen and helium (hydrogen partial pressure: 20%) being flowed therethrough at 100 sccm. Then, the reaction was performed (for 60 minutes at 580° C.), with a gas mixture of carbon monoxide and hydrogen (hydrogen partial pressure: 20%) being flowed at 100 sccm. By so doing, fibrous nanocarbon was produced in a predetermined amount (1,252 mg).

Example 2

The present example is an example in which the fibrous nanocarbon of Example 1 was heat-treated at a high temperature.

That is, the fibrous nonocarbon prepared in Example 1 was heated-treated for 10 minutes at 2,000° C. and 2,800° C. in an argon atmosphere.

Example 3

The present example is fibrous nanocarbon of a feather structure.

A nickel catalyst was prepared by the precipitation method of Example 1 with the use of nickel nitrate.

In particular, 19.82 g of nickel nitrate ($NiNO_3.xH_2O$: a first class grade chemical, Wako Pure Chemical Industries) was added to 200 ml of pure water in order to prepare 4 g of a nickel catalyst, and the mixture was slowly stirred to prepare a solution. To the solution, ammonium hydrogen carbonate ($NH_4HCO_3$, a first class grade chemical, Junsei Yakuhin Kogyo) was added with stirring until a precipitate ($NiCO_3.xH_2O$) was formed. Then, the precipitate was filtered off, and purified with pure water until ammonium hydrogen carbonate vanished. The purified precipitate was vacuum dried (for 8 hours at 80° C.), and then heat-treated (for 5 hours at 450° C.) in an air atmosphere with the use of a horizontal Tanmann-furnace to obtain nickel oxide.

The resulting nickel oxide was placed on an alumina boat (length 10 mm, width 2.5 mm, depth 1.5 mm (external values)), and was reduced (for 48 hours at 480° C.) in an alumina tube (internal diameter 10 cm), with a gas mixture of hydrogen and helium (hydrogen partial pressure: 10%) being flowed therethrough at 100 sccm, thereby obtaining 4.01 g of an iron catalyst.

Then, 50 mg of the nickel catalyst prepared by the above-described method was placed on a quartz boat (length 10 mm, width 2.5 mm, depth 1.5 mm (external values)), and was reduced (for 2 hours at 500° C.) in a quartz tube (internal diameter 4.5 cm), with a gas mixture of hydrogen and helium (hydrogen partial pressure: 20%) being flowed therethrough at 100 sccm. Then, the reaction was performed (for 60 minutes at 580° C.), with a gas mixture of ethylene and hydrogen (hydrogen partial pressure: 20%) being flowed at 100 sccm. By so doing, fibrous nanocarbon was produced in a predetermined amount (60 mg).

Example 4

The present example is an example in which the fibrous nanocarbon of Example 3 was heat-treated at a high temperature.

That is, the fibrous nonocarbon prepared in Example 3 was heated-treated for 10 minutes at 2,000° C. and 2,800° C. in an argon atmosphere.

Example 5

The present example is fibrous nanocarbon of a tubular structure.

A iron-nickel alloy catalyst was prepared by the precipitation method of Example 1 with the use of iron nitrate and nickel nitrate.

In particular, 11.90 g of nickel nitrate ($NiNO_3.xH_2O$: a first class grade chemical, Wako Pure Chemical Industries) and 11.80 g of iron nitrate ($FeNO_3.9H_2O$: a first class grade chemical, Wako Pure Chemical Industries) were added to 200 ml of pure water in order to prepare 4 g of an iron-nickel catalyst, and the mixture was slowly stirred to prepare a solution. To the solution, ammonium hydrogen carbonate ($NH_4HCO_3$, a first class grade chemical, Junsei Yakuhin Kogyo) was added with stirring until a precipitate ($NiCO_3.xH_2O$) was formed. Then, the precipitate was filtered off, and purified with pure water until ammonium hydrogen carbonate vanished. Then, the precipitate was filtered off, and purified with pure water until ammonium hydrogen carbonate vanished. The purified precipitate was vacuum dried (for 8 hours at 80° C.), and then heat-treated (for 5 hours at 450° C.) in an air atmosphere with the use of a horizontal Tanmann-furnace to obtain iron-nickel oxide.

The resulting iron-nickel oxide was placed on an alumina boat (length 10 mm, width 2.5 mm, depth 1.5 mm (external values)), and was reduced (for 48 hours at 480° C.) in an alumina tube (internal diameter 10 cm), with a gas mixture of hydrogen and helium (hydrogen partial pressure: 10%) being flowed therethrough at 100 sccm, thereby obtaining 4.05 g of an iron-nickel catalyst.

Then, 50 mg of the iron-nickel catalyst prepared by the above-described method was placed on a quartz boat (length 10 mm, width 2.5 mm, depth 1.5 mm (external values)), and was reduced (for 2 hours at 500° C.) in a quartz tube (internal diameter 4.5 cm), with a gas mixture of hydrogen and helium (hydrogen partial pressure: 20%) being flowed therethrough at 100 sccm. Then, the reaction was performed (for 60 minutes at 630° C.), with a gas mixture of carbon monoxide and hydrogen (hydrogen partial pressure: 80%) being flowed at 200 sccm. By so doing, fibrous nanocarbon was produced in a predetermined amount (432 mg).

Example 6

The present example is an example in which the fibrous nanocarbon of Example 5 was heat-treated at a high temperature.

In particular, the fibrous nonocarbon prepared in Example 5 was heated-treated for 10 minutes at 2,000° C. and 2,800° C. in an argon atmosphere.

Measurement of X-Ray Diffraction

The fibrous nanocarbons (150 mg) obtained in Examples 1 to 6 were each mixed with 15 mg of standard silicon, and diffraction at angles of 5° to 90° was performed (CuKα rays, 40 kV, 30 mA, stepwise method) using a wide angle X-ray diffractometer (a product of Rigaku), whereby diffraction patterns were obtained.

From the resulting X-ray patterns, the interplanar distance ($d_{002}$), the size of the stack ($Lc_{002}$), and the size of the crystallite ($La_{110}$) were calculated by the Gakushin method. The results are shown in the aforementioned Table 1.

Observation by Electric Field Scanning Transmission Electron Microscope

To investigate the fiber diameter and structure of the fibrous nanocarbon obtained in each of Examples 1 to 4, the fibrous nanocarbon was observed under an electric field scanning transmission electron microscope (JEM-2010F).

In particular, a trace amount of the fibrous nanocarbon obtained in each of Examples 1 to 4 was placed in n-butanol, and completely dispersed by ultrasonic dispersion until a pale transparent color appeared. One or two drops of the resulting dispersion were added to a fine net sample cell, and the sample cell was dried for a day in air at the ordinary temperature, and then observed.

The results are shown in FIGS. 6(a), 6(b) (Examples 1, 2) and FIGS. 18(a) to 18(c) (Examples 3, 4). FIGS. 6(a) and 6(b) are enlarged (to 8 times) photographs of images observed at 400,000× magnification. FIGS. 18(a) and 18(b) are photographs of images observed at 400,000× magnification, and FIG. 18(c) is a photograph further enlarged 8 times (3,200,000× magnification).

Observation by Scanning Tunneling Electron Microscope

The fibrous nanocarbon obtained in each of Examples 1 to 6 was observed under a scanning tunneling electron microscope (Nanoscope III (DI, U.S.A.).

In particular, a trace amount of the fibrous nanocarbon obtained in each of Examples 1 to 6 was placed in ethanol, and completely dispersed ultrasonically. One drop of the resulting dispersion were added to HOPG, dried for 8 hours in air, and observed (tunneling voltage 1V, tunneling current 3.0 nA).

The results are shown in FIGS. 30(a) to 30(c) (Examples 1, 2), FIG. 7(b) (Example 2), FIGS. 15(a) to 15(c) (Examples 1 to 6), and FIGS. 29(a) to 29(c) (Examples 1 to 6). FIG. 30(a) is a photograph in which the fibrous nanocarbon of Example 1 was observed. FIGS. 30(b) and 30(c) are photographs in which the fibrous nanocarbon of Example 2 was observed. FIG. 7(b) is a photograph in which the fibrous nanocarbon was observed at an angle different from the angle in FIG. 30(c). FIGS. 15(a) to 15(c) are photographs of the fibrous nanocarbons observed at low magnification. FIGS. 29(a) to 29(c) are photographs of the fibrous nanocarbons observed at high magnification.

Comparative Examples are provided below.

Comparative Example 1

The iron catalyst (50 mg) prepared by the precipitation method of the aforementioned Example 1 was placed on a quartz boat (length 10 mm, width 2.5 mm, depth 1.5 mm (external values)), and was reduced for 0.3 hour at 500° C. in a quartz tube (internal diameter 4.5 cm), with a gas mixture of hydrogen and helium (hydrogen partial pressure: 20%) being flowed therethrough at 100 sccm. Then, the reaction was performed for 60 minutes at a temperature of 580° C., with a gas mixture of carbon monoxide and hydrogen (hydrogen partial pressure: 20%) being flowed at 100 sccm. However, fibrous nanocarbon was not produced.

Comparative Example 2

The iron catalyst (50 mg) prepared by the precipitation method of the aforementioned Example 1 was placed on a quartz boat (length 10 mm, width 2.5 mm, depth 1.5 mm (external values)), and was reduced for 2 hours at 500° C. in a quartz tube (internal diameter 4.5 cm), with a gas mixture of hydrogen and helium (hydrogen partial pressure: 20%) being flowed therethrough at 100 sccm. Then, the reaction was performed for 60 minutes at a temperature of 580° C., with a carbon monoxide gas being flowed at 100 sccm. However, fibrous nanocarbon was not produced.

Comparative Example 3

The nickel catalyst (50 mg) prepared by the precipitation method of the aforementioned Example 1 was placed on a quartz boat (length 10 mm, width 2.5 mm, depth 1.5 mm (external values)), and was reduced for 2 hours at 500° C. in a quartz tube (internal diameter 4.5 cm), with a gas mixture of hydrogen and helium (hydrogen partial pressure: 20%) being flowed therethrough at 100 sccm. Then, the reaction was performed for 60 minutes at a temperature of 580° C., with a gas mixture of carbon monoxide and hydrogen (hydrogen partial pressure: 20%) being flowed at 100 sccm. However, fibrous nanocarbon was not produced.

Comparative Example 4

The nickel catalyst (50 mg) prepared by the precipitation method of the aforementioned Example 1 was placed on a quartz boat (length 10 mm, width 2.5 mm, depth 1.5 mm (external values)), and was reduced for 2 hours at 450° C. in a quartz tube (internal diameter 4.5 cm), with a gas mixture of hydrogen and helium (hydrogen partial pressure: 20%) being flowed therethrough at 100 sccm. Then, the reaction was performed for 60 minutes at a temperature of 580° C., with a gas mixture of carbon monoxide and hydrogen (hydrogen partial pressure: 20%) being flowed at 100 sccm. However, fibrous nanocarbon was not produced.

Comparative Example 5

The nickel catalyst (50 mg) prepared by the precipitation method of the aforementioned Example 1 was placed on a quartz boat (length 10 mm, width 2.5 mm, depth 1.5 mm (external values)), and was reduced for 2 hours at 500° C. in a quartz tube (internal diameter 4.5 cm), with a gas mixture of hydrogen and helium (hydrogen partial pressure: 20%) being flowed therethrough at 100 sccm. Then, the reaction was performed for 60 minutes at a temperature of 680° C., with a gas mixture of carbon monoxide and hydrogen (hydrogen partial pressure: 20%) being flowed at 100 sccm. However, fibrous nanocarbon was not produced.

Comparative Example 6

The iron-nickel catalyst (50 mg) prepared by the method of the aforementioned Example 5 was placed on a quartz boat (length 10 mm, width 2.5 mm, depth 1.5 mm (external values)), and was reduced for 2 hours at 500° C. in a quartz tube (internal diameter 4.5 cm), with a gas mixture of hydrogen and helium (hydrogen partial pressure: 20%) being flowed therethrough at 100 sccm. Then, the reaction was performed for 60 minutes at a temperature of 700° C., with a gas mixture of carbon monoxide and hydrogen (hydrogen partial pressure: 20%) being flowed at 200 sccm. As a result, nanocarbon was obtained in a predetermined amount (20 mg). When the nanocarbon was observed under a transmission electron microscope, however, a fibrous structure was not seen.

Method and Apparatus for Producing Fibrous Nanocarbon

Preferred examples of the method and apparatus for producing fibrous nanocarbon according to the present invention will be described below, but the present invention is in no way limited to these examples.

Example 1

Fe—Ni (2/8) was used as a catalyst, and carbon black ("MS-3050B" (trade name), MITSUBISHI GAS CHEMICAL (BET=43 $m^2/g$, particle diameter=40 nm)) was used as a carrier. The catalyst (5%) was supported on the carrier. A polymer-based adhesive (maximum operating temperature: ~360° C.) formed from a phenolic resin was used as a binder to granulate a dual-purpose catalyst/fluid material.

Using this dual-purpose catalyst/fluid material, fibrous nanocarbon was produced by means of the apparatus of the first embodiment shown in FIG. 32.

$H_2$/He (20/80) was used for the activation of the catalyst by the first gas supply, and pretreatment was performed for 7 hours. Then, ethylene ($C_2H_4$) was used as a carbon material, and $C_2H_4/H_2$ (4/1) was supplied. Under these conditions, the reaction was carried out for 1 hour within a fluidized bed reactor at 480° C. to produce fibrous nanocarbon. After production of fibrous nanocarbon, the temperature was raised in an atmosphere of $H_2$/He (20/80) to decompose the binder thermally, converting the dual-purpose catalyst/fluid material into fine particles, and scattering them for recovery by recovery means.

Microphotographs of the resulting fibrous nanocarbon are shown in FIGS. 46(a) and 46(b). FIG. 46(a) is the photograph at ×10,000 magnification, the scale being 1 µm. FIG. 46(b) is the photograph at ×100,000 magnification, the scale being 1 nm.

Example 2

Fibrous nanocarbon was produced by the same procedure as that in Example 1, except that Ni—Mo (2/8) was used as the catalyst, titanium oxide ($TiO_2$) was used as the carrier, and the reaction temperature was 560° C.

Photomicrographs of the resulting fibrous nanocarbon are shown in FIGS. 47(a) and 47(b). FIG. 47(a) is the photograph at ×10,000 magnification, the scale being 1 µm. FIG. 47(b) is the photograph at ×50,000 magnification, the scale being 100 nm.

Example 3

Fibrous nanocarbon was produced by the same procedure as that in Example 1, except that Fe—Ni (8/2) was used as the catalyst.

Photomicrographs of the resulting fibrous nanocarbon are shown in FIGS. 48(a) and 48(b). FIG. 48(a) is the photograph at ×10,000 magnification, the scale being 1 µm. FIG. 48(b) is the photograph at ×100,000 magnification, the scale being 1 nm.

The carbon nano-fibrous rod and fibrous nanocarbon according to the present invention have a high degree of graphitization and a large surface area. Thus, they are preferred for use as highly functional materials (resin, metal, ceramic and carbon reinforcements, heat dissipators, catalyst carriers, gas adsorbents, and bio-composites). They can show high potential, particularly, for use in the occlusion, adsorption and desorption of hydrogen, the occlusion, adsorption and desorption of lithium, catalytic action, and adsorption of nitrogen oxides.

The invention claimed is:

1. A fibrous nanocarbon comprising a plurality of carbon nano-fibrous rods gathered together, wherein each carbon nano-fibrous rod has a central axis and axial end portions, and comprises 2-12 hexagonal carbon layers extending in one direction, and
   wherein said hexagonal carbon layers have an axial width (D) of 2.5±0.5 nm, and a length (L) of 17±0.5 nm, and
   wherein said plurality of carbon nano-fibrous rods are stacked in a stacking direction and the length of each of the hexagonal carbon layers is larger than a dimension of the stacked hexagonal carbon layers the dimension being in the stacking direction of the hexagonal carbon layers.

2. The fibrous nanocarbon according to claim 1, wherein said 2 to 12 hexagonal carbon layers are stacked in said carbon nano-fibrous rods.

3. The fibrous nanocarbon according to claim 1, wherein said carbon nano-fibrous rods are stacked in a three-dimensionally close-packed state.

4. The fibrous nanocarbon according to claim 1, wherein said plurality of the carbon nano-fibrous rods are stacked in the stacking direction with said central axes thereof being parallel to each other, to constitute a carbon nano-fibrous rod cluster.

5. The fibrous nanocarbon according to claim 4, wherein said carbon nano-fibrous rods are three-dimensionally stacked so as to form nano-gaps between said carbon nano-fibrous rods.

6. The fibrous nanocarbon according to claim 4, wherein said carbon nano-fibrous rods constituting said carbon nano-fibrous rod cluster are arranged at an arrangement angle of larger than 0 degree but smaller than 20 degrees with respect to an axis perpendicular to a fiber axis extending in said stacking direction, thereby forming a columnar shape.

7. The fibrous nanocarbon according to claim 6, wherein in said carbon nano-fibrous rods an interplanar distance ($d_{002}$) between said 2-12 hexagonal carbon layers is less than 0.500 nm under heat treatment conditions at 700° C. or lower.

8. The fibrous nanocarbon according to claim 6, wherein a fiber width of an aggregate of said carbon nano-fibrous rods is 8 to 500 nm, and a fiber aspect ratio (fiber length/fiber width) of said aggregate is 10 or more.

9. The fibrous nanocarbon according to claim 6, wherein said carbon nano-fibrous rod cluster has a polygonal cross sectional structure in a direction perpendicular to said fiber axis.

10. The fibrous nanocarbon according to claim 6, wherein said axial end portions of said carbon nano-fibrous rods on a surface of said fibrous nanocarbon are two-dimensionally loop-shaped and three-dimensionally dome-shaped under heat treatment at 1,600° C. or higher.

11. The fibrous nanocarbon according to claim 4, wherein said carbon nano-fibrous rods constituting said carbon nano-fibrous rod cluster are arranged at an arrangement angle of larger than 20 degrees but smaller than 80 degrees with respect to an axis perpendicular to a fiber axis extending in said stacking direction, thereby forming a feather shape.

12. The fibrous nanocarbon according to claim 11, wherein said carbon nano-fibrous rod cluster has a herringbone structure.

13. The fibrous nanocarbon according to claim 1, wherein said carbon nano-fibrous rods are joined in series at said axial end portions to constitute a tubular carbon nano-fibrous rod cluster.

14. The fibrous nanocarbon according to claim 13, wherein said axial end portions of said carbon nano-fibrous rods are joined by heat treatment.

15. The fibrous nanocarbon according to claim 13, wherein said carbon nano-fibrous rods constituting said carbon nano-fibrous rod cluster are arranged at an arrangement angle of 80 degrees to 88 degrees with respect to an axis perpendicular to a fiber axis extending in said stacking direction, thereby forming a tubular shape.

16. The fibrous nanocarbon according to claim 15, wherein a fiber width of an aggregate of said carbon nano-fibrous rods is 8 to 80 nm, and a fiber aspect ratio (fiber length/fiber width) of said aggregate is 30 or more.

17. A method for producing fibrous nanocarbon comprising an aggregate of carbon nano-fibrous rods by reacting a carbon material in a high temperature fluidized bed with a catalyst, said method comprising using, as a fluid material, a dual-purpose catalyst/fluid material comprising a metal catalyst and a catalyst-supporting carrier bound via a binder; and performing a first gas supply step of supplying a reducing gas, a carbon material supply step of supplying the carbon material in a gaseous state to produce a carbon nano-fibrous rod comprising 2 to 12 hexagonal carbon layers extending in one direction, in a presence of the metal catalyst of the dual-purpose catalyst/fluid material, and a second gas supply step of supplying a carbon-free inert gas and heating the dual-purpose catalyst/fluid material by a heating means to a higher temperature than a reaction temperature for reaction between the dual-purpose catalyst/fluid material and the carbon material so as to eliminate a fluidizing function of the dual-purpose catalyst/fluid material;

wherein said hexagonal carbon layers each have an axial width (D) of 2.5±0.5 nm, and a length (L) of 17±15 nm, and wherein said plurality of carbon nano-fibrous rods are stacked in a stacking direction and the length of each of the hexagonal carbon layers is larger than a dimension of the stacked hexagonal carbon layers the dimension being in the stacking direction of the hexagonal carbon layers.

18. The method for producing fibrous nanocarbon according to claim 17, wherein an average particle diameter of the dual-purpose catalyst/fluid material is 0.2 to 20 mm.

19. The method for producing fibrous nanocarbon according to claim 17, wherein the dual-purpose catalyst/fluid material comprises a product formed by supporting the metal catalyst on a surface of the carrier, or an agglomerate of the carrier.

20. The method for producing fibrous nanocarbon according to claim 17, wherein the carrier of the dual-purpose catalyst/fluid material is any one of carbon black, alumina, silica, silica sand, and aluminosilicate.

21. The method for producing fibrous nanocarbon according to claim 17, wherein the metal catalyst of the dual-purpose catalyst/fluid material is any one of Fe, Ni, Co, Cu and Mo, or is a mixture of at least two of these metals.

22. The method for producing fibrous nanocarbon according to claim 17, wherein a flow velocity in the fluidized bed is 0.02 to 2 m/s.

23. The method for producing fibrous nanocarbon according to claim 17, further comprising controlling a plurality of conditions in each of said first gas supply step, said carbon material supply step, and said second gas supply step independently of one another.

24. The method for producing fibrous nanocarbon according to claim 23, wherein said conditions are a temperature, a pressure, a time, and a gas atmosphere.

25. The method for producing fibrous nanocarbon according to claim 17, wherein in said carbon material supply step the metal catalyst of the dual-purpose catalyst/fluid material and the carbon material are brought into contact with each other at a temperature of 300 to 1,300° C. in a gas mixture of hydrogen and an inert gas (hydrogen partial pressure 0 to 90%) at a pressure of 0.1 to 25 atmospheres, thereby producing the fibrous nanocarbon.

26. The method for producing fibrous nanocarbon according to claim 17, further comprising metallizing and finely dividing the metal catalyst of the dual-purpose catalyst/fluid material by a reducing action of the reducing gas in at least one of said first gas supply step and said carbon material supply step.

27. The method for producing fibrous nanocarbon according to claim 26, further comprising finely dividing the metal catalyst of the dual-purpose catalyst/fluid material while controlling a particle diameter of the metal catalyst, thereby controlling a diameter of the fibrous nanocarbon.

28. The method for producing fibrous nanocarbon according to claim 17, wherein said second gas supply step forms a high velocity flow zone in the fluidized bed to promote fine division and wear of the dual-purpose catalyst/fluid material by a collision between particles of the dual-purpose catalyst/fluid material, or a collision between the particles and a wall surface of the fluidized bed.

29. The method for producing fibrous nanocarbon according to claim 28, wherein the high velocity flow zone in the fluidized bed is formed in a lower portion of the fluidized bed.

30. The method for producing fibrous nanocarbon according to claim 28, wherein the high velocity flow zone is formed by flowing a high velocity gas into the fluidized bed.

31. The method for producing fibrous nanocarbon according to claim 30, further comprising supplying particles, which have scattered from the fluidized bed, back into the fluidized bed while entraining the particles in the high velocity gas.

32. The method for producing fibrous nanocarbon according to claim 17, further comprising separating the fibrous nanocarbon from the carrier or the catalyst of the dual-purpose catalyst/fluid material.

33. The method for producing fibrous nanocarbon according to claim 17, wherein the fibrous nanocarbon is produced with an apparatus comprising:
   a first fluidized bed reactor charged with the dual-purpose catalyst/fluid material and provided with heating means for heating an interior of the first fluidized bed reactor;
   first gas supply means for supplying the reducing gas into the first fluidized bed reactor;
   carbon material supply means for supplying the carbon material in a gaseous state into said first fluidized bed reactor to produce the fibrous nanocarbon comprising an aggregate of carbon nano-fibrous rods, which each comprise 2 to 12 hexagonal layers extending in one direction;
   second gas supply means for supplying the carbon-free gas into the first fluidized bed reactor; and
   a discharge line for discharging a first gas and particles scattered from the first fluidized bed reactor.

34. The method for producing fibrous nanocarbon according to claim 33, wherein the apparatus further comprises a recovery means for recovering the scattered particles provided in the discharge line.

35. The method for producing fibrous nanocarbon according to claim 33, wherein a fluidized bed portion of the first fluidized bed reactor has a high velocity flow portion and a low velocity flow portion.

36. The method for producing fibrous nanocarbon according to claim 35, wherein the high velocity flow portion includes a collision portion.

37. The method for producing fibrous nanocarbon according to claim 33, further comprising blowing a gas at a high velocity into the fluidized bed reactor with a high velocity gas blowing means.

38. The method for producing fibrous nanocarbon according to claim 37, wherein when the gas is blown at a high velocity, recovered particles are entrained in the gas.

39. The method for producing fibrous nanocarbon according to claim 33, wherein in said apparatus
   a first flow chamber, a second flow chamber, and a third flow chamber, adapted to allow the fluid material to flow, are disposed within the fluidized bed reactor,
   the first gas supply means is connected to the first flow chamber;
   the carbon material supply means is connected to said second flow chamber; and
   said second gas supply means is connected to said third flow chamber.

40. The method for producing fibrous nanocarbon according to claim 33, wherein the apparatus further comprises:
   a first flow chamber and a second flow chamber adapted to allow the fluid material to flow, the first and second flow chambers being disposed within the fluidized bed reactor;
   a second fluidized bed reactor different from the fluidized bed reactor is provided as a third flow chamber; and
   a transport means for transporting the fluid material from the second flow chamber to the third flow chamber; wherein
   the first gas supply means is connected to the first flow chamber,
   the carbon material supply means is connected to the second flow chamber, and
   the second gas supply means is connected to the third flow chamber.

41. The method for producing fibrous nanocarbon according to claim 33, wherein the dual-purpose catalyst/fluid material has an average particle diameter of 0.2 to 20 mm.

42. The method for producing fibrous nanocarbon according to claim 33, wherein the dual-purpose catalyst/fluid material comprises a product formed by supporting the catalyst on a surface of the carrier, or an agglomerate of the carrier.

43. The method for producing fibrous nanocarbon according to claim 33, wherein the carrier of the dual-purpose catalyst/fluid material is any one of carbon black, alumina, silica, silica sand, and aluminosilicate.

44. The method for producing fibrous nanocarbon according to claim 33, wherein the metal catalyst of the dual-purpose catalyst/fluid material is at least one of Fe, Ni, Co, Cu and Mo.

45. The method for producing fibrous nanocarbon according to claim 33, wherein a flow velocity in the fluidized bed reactor is 0.02 to 2 m/s.

46. The method for producing fibrous nanocarbon according to claim 33, wherein the metal catalyst of the dual-purpose catalyst/fluid material and the carbon material are brought into contact with each other for a certain period of time at a temperature of 300 to 1,300° C. in a gas mixture of hydrogen and an inert gas (hydrogen partial pressure 0 to 90%) at a pressure of 0.1 to 25 atmospheres, so as to produce the fibrous nanocarbon.

47. A method for producing fibrous nanocarbon according to claim 17, wherein the fibrous nanocarbon is produced with an apparatus comprising:
   a first fluidized bed reactor having an interior charged with the dual-purpose catalyst/fluid material, a heating means for heating the interior, and a first gas supply means for supplying the reducing gas into the first fluidized bed reactor;
   a second fluidized bed reactor having a transport means for transporting the fluid material from the first fluidized bed reactor, and a carbon material supply means for supplying the carbon material in a gaseous state into the second fluidized bed reactor to produce a fibrous nanocarbon comprising an aggregate of carbon nano-fibrous rods which each comprise 2-12 hexagonal carbon layers extending in on direction;
   a third fluidized bed reactor having a transport means for transporting the fluid material and a reaction product from said second fluidized bed reactor, and having second gas supply means for supplying the carbon-free gas into said third fluidized bed reactor; and
   a discharge line for discharging a gas and particles scattered from said third fluidized bed reactor.

48. The method for producing fibrous nanocarbon according to claim 47, wherein the apparatus includes a plurality of the first fluidized bed reactors.

49. The method for producing fibrous nanocarbon according to claim 47, wherein the apparatus includes a plurality of the second fluidized bed reactors.

50. The method for producing fibrous nanocarbon according to claim 47, wherein the apparatus includes a plurality of the third fluidized bed reactors.

51. The method for producing fibrous nanocarbon according to claim 47, wherein the dual-purpose catalyst/fluid material has an average particle diameter of 0.2 to 20 mm.

52. The method for producing fibrous nanocarbon according to claim 47, wherein the dual-purpose catalyst/fluid material comprises a product formed by supporting the catalyst on a surface of the carrier, or an agglomerate of the carrier.

53. The method for producing fibrous nanocarbon according to claim 47, wherein the carrier of the dual-purpose catalyst/fluid material is any one of carbon black, alumina, silica, silica sand, and aluminosilicate.

54. The method for producing fibrous nanocarbon according to claim 47, wherein the metal catalyst of the dual-purpose catalyst/fluid material is any one of Fe, Ni, Co, Cu and Mo, or is a mixture of at least two of these metals.

55. The method for producing fibrous nanocarbon according to claim 47, wherein a flow velocity in the fluidized bed reactors is 0.02 to 2 m/s.

56. The method for producing fibrous nanocarbon according to claim 47, wherein the metal catalyst of the dual-purpose catalyst/fluid material and the carbon material are brought into contact with each other for a certain period of time at a temperature of 300 to 1,300° C. in a gas mixture of hydrogen and an inert gas (hydrogen partial pressure 0 to 90%) at a pressure of 0.1 to 25 atmospheres, so as to produce the fibrous nanocarbon.

* * * * *